(12) United States Patent
Garthwaite et al.

(10) Patent No.: US 7,404,182 B1
(45) Date of Patent: Jul. 22, 2008

(54) DEFERRING AND COMBINING WRITE BARRIERS FOR A GARBAGE-COLLECTED HEAP

(75) Inventors: Alexander T. Garthwaite, Beverly, MA (US); Steven K. Heller, Acton, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 814 days.

(21) Appl. No.: 10/679,183

(22) Filed: Oct. 3, 2003

(51) Int. Cl.
G06F 9/44 (2006.01)
G06F 17/30 (2006.01)

(52) U.S. Cl. ..................... 717/140; 707/206

(58) Field of Classification Search ......... 717/140–141; 707/205–206, 103 R–103 Z; 718/104; 711/6
See application file for complete search history.

(56) References Cited

U.S. PATENT DOCUMENTS

| | | |
|---|---|---|
| 4,724,521 A | 2/1988 | Carron et al. |
| 4,797,810 A | 1/1989 | McEntee et al. |
| 4,912,629 A | 3/1990 | Shuler, Jr. |
| 4,989,134 A | 1/1991 | Shaw |
| 5,088,036 A | 2/1992 | Ellis et al. |
| 5,333,318 A | 7/1994 | Wolf |
| 5,392,432 A | 2/1995 | Engelstad et al. |
| 5,485,613 A | 1/1996 | Engelstad et al. |
| 5,560,003 A | 9/1996 | Nilson et al. |
| 5,687,370 A | 11/1997 | Garst et al. |
| 5,801,943 A | 9/1998 | Nasburg |
| 5,845,278 A | 12/1998 | Kirsch et al. |
| 5,845,298 A | 12/1998 | O'Connor et al. |
| 5,857,210 A | 1/1999 | Tremblay et al. |
| 5,873,104 A | 2/1999 | Tremblay et al. |
| 5,873,105 A | 2/1999 | Tremblay et al. |
| 5,900,001 A | 5/1999 | Wolczko et al. |

(Continued)

FOREIGN PATENT DOCUMENTS

EP    0 940755    9/1999

(Continued)

OTHER PUBLICATIONS

Richard L. Hudson et al. "Cycles to Recycle: Garbage Collection on the IA-64" Oct. 2000, ACM Press, ISMM'00, vol. 36, Issue 1, pp. 101-110.*

(Continued)

Primary Examiner—Wei Y. Zhen
Assistant Examiner—Anna Deng
(74) Attorney, Agent, or Firm—Osha·Liang LLP

(57) ABSTRACT

The present invention provides a technique for reducing the number of write barriers without compromising garbage collector performance or correctness. To that end, a compiler defers emitting write barriers until it reaches a subsequent instruction in the mutator code. At this point, the compiler may elide repeated or unnecessary write-barrier code so as to emit only those write barriers that provide useful information to the garbage collector. By eliminating write-barrier code in this manner, the amount of write-barrier overhead in the mutator can be minimized, consequently enabling the mutator to execute faster and more efficiently. Further, collocating write barriers after the predetermined instruction also enables the compiler to generate object code having better cache performance and more efficient use of guard code than is possible using conventional write-barrier implementations.

36 Claims, 32 Drawing Sheets

U.S. PATENT DOCUMENTS

| | | | |
|---|---|---|---|
| 5,903,900 A | 5/1999 | Knippel et al. | |
| 5,930,807 A | 7/1999 | Ebrahim et al. | |
| 5,953,736 A * | 9/1999 | O'Connor et al. | 711/6 |
| 5,960,087 A | 9/1999 | Tribble et al. | |
| 5,999,974 A | 12/1999 | Ratcliff et al. | |
| 6,021,415 A | 2/2000 | Cannon et al. | |
| 6,047,125 A | 4/2000 | Agesen et al. | |
| 6,049,390 A | 4/2000 | Notredame et al. | |
| 6,049,810 A | 4/2000 | Schwartz et al. | |
| 6,065,020 A | 5/2000 | Dussud | |
| 6,098,089 A | 8/2000 | O'Connor et al. | |
| 6,148,309 A | 11/2000 | Azagury et al. | |
| 6,148,310 A | 11/2000 | Azagury et al. | |
| 6,173,294 B1 | 1/2001 | Azagury et al. | |
| 6,185,581 B1 | 2/2001 | Garthwaite | |
| 6,226,653 B1 | 5/2001 | Alpern et al. | |
| 6,243,720 B1 | 6/2001 | Munter et al. | |
| 6,260,120 B1 | 7/2001 | Blumenau et al. | |
| 6,289,358 B1 | 9/2001 | Mattis et al. | |
| 6,308,185 B1 | 10/2001 | Grarup et al. | |
| 6,308,319 B1 * | 10/2001 | Bush et al. | 717/141 |
| 6,314,436 B1 | 11/2001 | Houldsworth | |
| 6,321,240 B1 | 11/2001 | Chilimbi et al. | |
| 6,341,293 B1 * | 1/2002 | Hennessey | 707/206 |
| 6,353,838 B2 | 3/2002 | Sauntry et al. | |
| 6,381,738 B1 | 4/2002 | Choi et al. | |
| 6,393,439 B1 | 5/2002 | Houldsworth et al. | |
| 6,415,302 B1 | 7/2002 | Garthwaite et al. | |
| 6,424,977 B1 | 7/2002 | Garthwaite | |
| 6,434,576 B1 | 8/2002 | Garthwaite | |
| 6,434,577 B1 | 8/2002 | Garthwaite | |
| 6,442,661 B1 | 8/2002 | Dreszer | |
| 6,449,626 B1 | 9/2002 | Garthwaite et al. | |
| 6,496,871 B1 | 12/2002 | Jagannathan et al. | |
| 6,510,440 B1 * | 1/2003 | Alpern et al. | 707/206 |
| 6,529,919 B1 | 3/2003 | Agesen et al. | |
| 6,567,905 B2 | 5/2003 | Otis | |
| 6,640,278 B1 | 10/2003 | Nolan et al. | |
| 6,757,890 B1 | 6/2004 | Wallman | |
| 6,769,004 B2 | 7/2004 | Barrett | |
| 6,820,101 B2 | 11/2004 | Wallman | |
| 6,826,583 B1 | 11/2004 | Flood et al. | |
| 6,868,488 B2 | 3/2005 | Garthwaite | |
| 6,892,212 B2 | 5/2005 | Shuf et al. | |
| 6,928,460 B2 | 8/2005 | Nagarajan et al. | |
| 6,931,423 B2 | 8/2005 | Sexton et al. | |
| 7,013,454 B2 * | 3/2006 | Bush et al. | 717/124 |
| 7,089,272 B1 | 8/2006 | Garthwaite et al. | |
| 2002/0032719 A1 | 3/2002 | Thomas et al. | |
| 2002/0087590 A1 * | 7/2002 | Bacon et al. | 707/206 |
| 2002/0095453 A1 | 7/2002 | Steensgaarad | |
| 2002/0107880 A1 * | 8/2002 | Bacon | 707/206 |
| 2002/0133533 A1 | 9/2002 | Czjkowski et al. | |
| 2002/0138506 A1 | 9/2002 | Shuf et al. | |
| 2002/0138507 A1 * | 9/2002 | Shuf et al. | 707/206 |
| 2003/0005027 A1 * | 1/2003 | Borman et al. | 709/104 |
| 2003/0069905 A1 * | 4/2003 | Dussud | 707/206 |
| 2003/0088658 A1 | 5/2003 | Davies et al. | |
| 2003/0200392 A1 | 10/2003 | Wright et al. | |
| 2003/0217027 A1 | 11/2003 | Farber et al. | |
| 2004/0010586 A1 | 1/2004 | Burton et al. | |
| 2004/0039759 A1 | 2/2004 | Detlefs et al. | |
| 2004/0215914 A1 | 10/2004 | Dussud | |

FOREIGN PATENT DOCUMENTS

| | | | |
|---|---|---|---|
| EP | 0 969 377 | | 1/2000 |
| WO | WO-0188713 | | 11/2001 |

OTHER PUBLICATIONS

Yoav Ossia et al. "A parallel, Incremental and Concurrent GC for Servers", May 2002, ACM Press, PLDI'02 vol. 37 Issue 5, pp. 129-140.*

Stephen M Blackburn et al. "Ulterior Reference Counting: Fast Garbage Collection without a Long Wait" Oct. 2003, ACM Press, OOPSLA '03, vol. 38, Issue 11, pp. 344-358.*

U.S. Appl. No. 10/287,851, filed Nov. 5, 2002, Garthwaite et al.

Printezis, et al., "Visualising the Train Garbage Collector", ISMM '02, 2002, pp. 50-63, Berlin, Germany.

Jones, Richard, et al., Garbage Collection: Algorithms for Automatic Dynamic Memory Management, 1996, pp. 1-319, John Willfey & Sons Ltd., England.

Oriented Language, Object Systems Laboratory, Dec. 1993, 1-14, Dept. Of Comp. Sci., Amherst, MA.

Appel, Andrew W., Simple Generational Garbage Collection and Fast Allocation, Mar. 1988, revised Sep. 1988, Department of Computer Science, Princeton University, Princeton, New Jersey, 1-16.

Hosking, et al., "Remembered Sets Can Also Play Cards," OOPSLA/ECOOP Workshop on Garbage Collection in Object-Oriented Systems, Oct. 1993, 1-8.

Sobalvarro, Patrick G., A Lifetime-Based Garbage Collector for LISP Systems on General-Purpose Computers, Sep. 1988, pp. 1-59, Massachusetts Institute of Technology.

Pirinen, Pekka P., Barrier Techniques for Incremental Tracing, ISMM '98, Oct. 1998, Vancouver, B.C., 20-25.

Withington, P.T., How Real Is "Real-Time" GC?, Oct. 6, 1991, OOPSLA '91, GC Workshop, 1-8.

Hudson, Richard L., et al., Sapphire: Copying GC Without Stopping the World, Concurrency and Computation: Practice and Experience Special Issue: Java Grand/ISCOPE, 2001, 48-57.

Muchnick, Steven S., Advanced Compiler Design Implementaion, 1997, Chapters 7, 8, and 12, Morgan Kaufmann Publishers, 169-266 and 329-375.

Appel, et al., "Real-Time Concurrent Collection on Stock Multiprocessors", ACM SIGPLAN Notices, 1988, 1-24.

Appleby, Karen, Garbage Collection for Prolog Based on WAM, vol. 31, No. 6, Communications of the ACM, Jun. 1, 1988, 719-741.

Arora, et al. "Thread Scheduling for Multiprogrammed Multiprocessors", Proceedings of the 10th Annual ACM Symposium on Parallel Algorithms and Architectures, Jun. 1998, 1-11.

Bacon, et al., "Java without the Coffee Breaks: A Nonintrusive Multiprocessor Garbage Collector", SIGPLAN Conference on Programming Language Design and Implementation, Jun. 2001, Snowbird, UT, 1-12.

Baker, "List Processing in Real Time on a Serial Computer", Communications of the ACM, vol. 21, No. 4, Apr. 1978, 280-294.

Barrett, et al., "Using Lifetime Predictors to Improve Memory Allocation Performance", SIGPLAN'93 Conference on Programming Language Design and Implementation, Jun. 1993, 187-196, ACM Press, Albuquerque, NM.

Blackburn & McKinley, "In or Out? Putting Write Barriers in Their Place", ISMM '03, Jun. 20, 2002, Berlin, Germany, 175-184.

Brooks, "Trading Data Space for Reduced Time and Code Space in Real-Time Garbage Collection on Stock Hardware", ACM Software Engineering Symposium on Practical Software Development Environments, 1984, 256-262.

Chilimbi, et al., "Using Generational Garbage Collection to Implement Cache-Conscious Data Placement", International Symposium on Memory Management, Oct. 1998, 37-48.

Clark, An Efficient List-Moving Algorithm Using Constant Workspace, vol. 19 No. 6, Communications of the ACM, Jun. 1976, 352-354.

Clarke, et al., "Compacting Garbage Collection can be Fast and Simple", Software-Practice and Experience, vol. 26, No. 2, Feb. 1996, 177-194.

Courts, "Improving Locality of Reference in a Garbage-Collecting Memory Management System", Communications of the ACM, vol. 31, No. 9, Sep. 1988, 1128-1138.

Flood, et al., "Parallel Garbage Collection for Shared Memory Multiprocessors", USENIX JVM Conference, Apr. 2001, 1-10.
Journal of Parallel and Distributed Computing, Aug. 1996, 5-20.
Grarup, et al., "Incremental Mature Garbage Collection", M.Sc. Thesis @ http://www.daimi.aau.dk/jacobse/Papers, Aug. 1993, 1-192.
Hanson, "Fast Allocation and Deallocation of Memory Based on Object Lifetimes", Software Practice and Experience, Jan. 1990, 20(1), pp. 5-12.
Harris, "Dynamic Adaptive Pre-Tenuring", Proceedings of the Int'l Symposium on Memory Management, Oct. 2000, 127-136.
Herlihy, et al., "Lock-Free Garbage Collection for Multiprocessors", ACM SPAA, 1991, 229-236.
Holzle, Urs, "A Fast Write Barrier for Generational Garbage Collectors", Workshop on Garbage Collection in Object Oriented Systems, OOPSLA '93, Oct. 1993, 1-6.
Hudson, et al., "Adaptive Garbage Collection for Modula-3 and Small Talk", OOPSLA ECOOP '90 Workshop on Garbage Collection in Object-Oriented Systems, Oct. 27, 1990, 1-5.
Hudson, et al., "A Language—Independent Garbage Collector Toolkit", Coins Technical Report, University of Massachusetts, Amherst, MA, Sep. 1991, 1-23.
Hudson, et al., "Incremental Collection of Mature Objects", Proceedings of the Int'l Workshop on Memory Management, 1992, Springer-Verlag, 388-403.
Hudson, et al., "Training Distributed Garbage: The DMOS Collector", University of St. Andrews Tech Report, 1997, 1-26.
Hudson, et al., "Garbage Collecting the World: One Car at a Time", ACM SIGPLAN Notices, vol. 32, No. 10, Oct. 1997, 162-175.
Jones and Lins, "Garbage Collection: Algorithms for Automatic Dynamic Memory Management", 1996, 165-179, John Wiley and Sons, NY.
Lieberman, et al., "A Real-Time Garbage Collector Based on the Lifetimes of Objects", Communications of the ACM, 1983, 26(6), 419-429.
Liskov, et al., "Partitioned Garbage Collection of a Large Stable Heap", Proceedings of the 5th International Workshop on Object Orientation in Operating Systems, (IWOOOS '96), 117-121.
Moon, "Garbage Collection in a Large Lisp System", ACM Symposium on LISP and Functional Programming, Aug. 1984, 235-246, Austin, TX.
Moss, et al., PMOS: A Complete and Coarse-Grained Incremental Garbage Collector for Persistent Object Stores, Proceedings of the 7th Int'l Workshop on Persistent Object Systems, 1996, 1-13, Cape May, NJ.
Munro, et al., "Incremental Garbage Collection of a Persistent Object Store using PMOS", 8th International Workshop on Persistent Object Systems, 1998, 1-13, Tiburon, California.
Nettles, Scott, "Real-Time Replication Garbage Collection", Proceedings of the ACM SIGPLAN 1993 Conference on Programming Language Design and Implementation, 1993, 217-226.
Padopoulos, "Hood: A User-Level Thread Library for Multiprogramming Multiprocessors," University of Texas, Aug. 1998, 1-71, Austin.
Roy, et al., "Garbage Collection in Object-Oriented Databases Using Transactional Cyclic Reference Counting", The International Journal on Very Large Databases, vol. 7, Issue 3, 1998, 179-193.
Seligmann, et al., "Incremental Mature Garbage Collection, European Conference on Object-Oriented Programming", 1995, 235-252.
Shuf, et al., "Exploiting Prolific Types for Memory Management and Optimizations," Proceedings of the 29th Annual ACM Symposium on the Principles of Programming Languages, 2002, 295-306.
Stamos, "Static Grouping of Small Objects to Enhance Performance of a Paged Virtual Memory",ACM Transactions on Computer Systems, vol. 2, No. 2, May 1984, 155-180.
Ungar, "Generation Scavenging: A Non-Disruptive High Performance Storage Reclamation Algorithm", ACM SIGPLAN Notices, Apr. 1984, 19(5), 157-167.
Ungar, et al., "Tenuring Policies for Generation-Based Storage Reclamation", ACM SIGPLAN Notices, 1988, 23(11)1-17.
Venners, "Garbage Collection," Chapter 9 of Inside the Java Virtual Machine, www.artima.com, Date Unknown, 1-18.
Wilson, "Uniprocessor Garbage Collection Techniques", Proceedings of Int'l Workshop on Memory Management, 1992, V. 637, 1-34.

Wilson, "Uniprocessor Garbage Collection Techniques", Technical Report, University of Texas, 1994, 1-67.
Zee, et al., "Write Barrier Removal by Static Analysis", OOPSLA '02, Nov. 2002, 1-20.
Seidl, "Segregating Heap Objects by Reference Behavior and Lifetime", Proceedings of 8th Int 'l Conference on Architectural Support for Programming Languages and Operating Systems, Oct. 1998, San Jose, CA, 12-23.
Zorn, Benjamin, "Barrier Methods for Garbage Collection", Technical Report, CU-CS—494-90, University of Colorado, Nov. 1990, Boulder, Colorado, 1-37.
Azagury, et al., "Combining Card Marking With Remembered Sets: How to Save Scanning Time", ACM SIGPLAN Notices, Oct. 1998, V. 34(3), ACM Press, Vancouver, Canada, 10-19.
Cheney, "A Nonrecursive List Compacting Algorithm," Communications of the ACM, vol. 13, No. 11, Nov. 1970, 677-678.
Cheng, et al., "Generational Stack Collection and Profile-Driven Pretenuring", Proceedings of the ACM SIGPLAN 1998, Conference on Programming Language Design and Implementation, Jun. 1998, 162-173, ACM Press, Montreal, Canada.
Hosking, et al., "A Comparative Performance Evaluation of Write Barrier Implementations", ACM Conference on Object-Oriented Systems, Languages and Applications, Oct. 1992, V. 27(10), ACM Press, Vancouver, Canada, 92-108.
Lam, et al., "Object Type Directed Garbage Collection to Improve Locality", Proceedings of the International Workshop on Memory Management, Sep. 1992, 404-425, St. Malo, France.
Wilson, et al., "Effective Static-Graph Reorganization to Improve Locality in Garbage Collected Systems", Proceedings of ACM SIGPLAN Conference on Programming Language Design and Implementation, Jun. 1991, Canada, 177-191.
Richard Hudson, et al., Adaptive Garbage Collection for Modula-3 and Smalltalk, Oct. 27, 1990, pp. 1-5, Object Oriented Systems Laboratory, Department of Computer and Information Science, University of Massachusetts, Amherst, Massachusetts.
Patrick G. Sobalvarro, A Lifetime-Based Garbage Collector for LISP Systems on General-Purpose Computers, Sep. 1988, pp. 1-59, Department of Electrical Engineering and Computer Science at the Massachusetts Institute of Technology.
Urs Holzle, A Fast Write Barrier for Generational Garbage Collectors, Oct. 1993, pp. 1-6, Computer Systems Laboratory, Stanford University, California.
Benjamin Zorn, Barrier Methods for Garbage Collection, Nov. 1990, pp. 1-37, Department of Computer Science, University of Colorado at Boulder, Boulder, Colorado.
Alexander T. Garthwaite et al., Specializing Write-Barriers for Objects in a Garbage Collected Heap, U.S. Appl. No. 10/464,371, filed Jun. 18, 2003.
Appel, "Simple Generational Garbage Collection and Fast Allocation", Software Practice and Experience, 19(2), 1989, 171-183.
Appleby, Karen, "Garbage Collection for Prolog Based on WAM, vol. 31, Issue 6", Communication of the ACM, Jun. 1, 1998, 719-741.
Baker, "List Processing in Real Time on a Serial Computer", Communications of the ACM 21, Apr. 1978, 280-294.
Barrett, et al., "Using Lifetime Predictors to Improve Memory Allocation Performance", SIGPLAN'93 Conference on Programming Languages Design and Implementation vol. 28(6) of Notices, Jun. 1993, 187-196, ACM Press, Albuquerque, NM.
Brooks, "Trading Data Space for Reduced Time and Code Space in Real-Time Garbage Collection on Stock Hardware", Proceedings of the 1984 Acm Symposium on Lisp and Funcional Programming, Aug. 1984, 108-113, Austin, TX.
Clark, "An Efficient List-Moving Algorithm Using Constant Workspace, vol. 19 No. 6", Communications of the ACM, Jun. 1976, 352-354.
Clark, et al., "Compacting Garbage Collection can be Fast and Simple", Software-Practice and Experience, vol. 26, No. 2, Feb. 1996, 177-194.
Courts, "Improving Locality of Reference in a Garbage-Collecting Memory Management System", Communications of the ACM, vol. 31, No. 9, Sep. 1988, 1128-1138.

Goldstein, et al., "Lazy Threads: Implementing a Fast Parallel Call, vol. 37, No. 1", Journal of Parallel and Distributed Computing, Aug. 1996, 5-20.

Hanson, "Fast Allocation and Deallocation of Memory Based on Object Lifetimes", Software Practice and Experience, Jan. 1990, 20(1):5-12.

Harris, "Dynamic Adaptive Pre-Tenuring", In Proceedings of the Int'l Symposium on Memory Management, Oct. 2000, 127-136.

Herlihy, et al., "Lock-Free Garbage Collection for Multiprocessors", ACM SPAA, 1991, 229-236.

Hosking, et al., "Protection Traps and Alternatives for Memory Management of an Object-Oriented Language", Object Systems Laboratory, Dec. 1993, 1-14, Dept. of Comp. Sci., Amherst, MA.

Hudson, et al., "Incremental Collection of Mature Objects", Proceedings of The Int'l Workshop on Memory Managment, 1992, pp. 1-16, Springer-Verlag.

Hudson, et al., "Training Distributed Garbage: The DMOS Collector", University of St. Andrews Tech Report, 1997, 1-26.

Hudson, et al., "Garbage Collecting the World: One Car at a Time", ACM SIGPLAN Notices 32, 1997, 162-175.

Jones and Lins, "Garbage Collection: Algorithms for Automatic Dynamic Memory Management", 1996, 165-179, John Wiley and Sons, NY.

Liskov, et al., "Partitioned Garbage Collection of a Large Stable Heap", Proceedings of IWOOOS, 1996, 117-121.

Moon, "Garbage Collection in a Large Lisp System", Conference Record of the 1984 ACM Symposium on Lisp and Functional Programming, Aug. 1984, 235-246, Austin, TX.

Moss, et al., "A Complete and Coarse-Grained Incremental Garbage Collection for Persisten Object Strores", Proceedings 7th Int'l Workshop on Persisten Object System, 1996, 1-13, Cape May, NJ.

Munro, et al., "Incremental Garbage Collection of a Persistent Object Store using PMOS", 3rd Int'l Workshop on Persistence and Java, 1998, 78-91, Tiburon, California.

Padopoulos, "Hood: A User-Level Thread Library for Multiprogramming Multiprocessors, Thesis: The Uni. of TX", University of Texas, Aug. 1998, 1-71, Austin.

Roy, et al., "Garbage Collection in Object-Oriented Databases Using Transactional Cyclic Reference Counting", VLDB Journal—The International Journal on Very Large Da Bases, vol. 7, Issue 3, 1998, 179-193.

Stamos, "Static Grouping of Small Objects to Enhance Performance of a Paged Virtual Memory", ACM Transactions on Computer Systems, vol. 2, No. 2, May 1984, 155-180.

Ungar, et al., "Tenuring Policies for Generation-Based Storage Reclamation", ACM SIGPLAN Notices, 1988, 23(11)1-17.

Zorn, "Segregating Heap Objects by Reference Behavior and Lifetime", In 8th Int'l Conference Architectural Support for Programming Languages and Operating Systems, Oct. 1998, 12-32, San Jose, CA.

Zorn, Benjamin, "Barrier Methods for Garbage Collection", Dept. of Computer Science, Uni. of Colorado, Nov. 1990, 1-37, Boulder.

Cheney, "A Nonrecursive List Compacting Algorithm, vol. 13, No. 11", Communications of the ACM, Nov. 1970, 677-678, Uni. Math. Lab., Cambridge, European Patent Office.

Cheng, et al., "Generational Stack Collection and Profile-Driven Pretenuring", SIGPLAN'98 Conference on Programming Languages Design and Implementation, Jun. 1998, 162-173, ACM Press, Montreal, Canada.

Lam, et al., "Object Type Directed Garbage Collection to Improve Locality", Proceedings of the International Workshop on Memory Management, Sep. 1992, 404-425, St. Malo, France.

Jones and Lins, "Garbage Collection: Algorithms for Automatic Dynamic Memory Management", 1996, pp. 150-152, John Wiley and Sons, NY.

* cited by examiner

```
1   /* Mature object O is modified by a write operation */
2   /* Register_1 stores object O's starting address*/
3   /* Register_2 stores a value that will modify object O*/
4   /* Register_3 stores the base address of a card table*/
5   /* Register_4 is a "working" register*/
6   /* Log_card_size is a base_2 log of the card size*/
7   /* C is the offset of a reference field modified in object O*/
8   /* Mutator code begins */
            ⋮
N      /* A mutator instruction modifies a reference in the Object O */
N+1       STW Register_2, (Register_1 + C)
N +2   /* Write-barrier code corresponding to the reference modification */
N +3      ADD Register_1, C, Register_4
N +4      SRL Register_4, log_card_size, Register_4
N +5      STB 0, (Register_3 + Register_4)
N +6   /* Mutator code continues */
            ⋮
```

FIG. 7

(Prior Art)

/* Method m */ — 1300

•
•
•

/* o.f=a; */ — 1310
STW register_a, (register_o +2)

•
•
•

/* o.g=b; */ — 1320
STW register_b, (register_o +3)

•
•
•

/*DEFERRED WRITE BARRIER*/
WRITE BARRIER
—1330

FIG. 13

```
                    /* Method m */    ╱─ 2100
                         •
                         •
                         •
        /* Instantiate four objects a, b, c and d */
                                          ╱─ 2110
            CALL newInstance_object  ╱─ 2120
            CALL newInstance_object  ╱─ 2130
            CALL newInstance_object  ╱─ 2140
            CALL newInstance_object ╱
                         •
                         •
                         •
                  /* a.x=q; */
            STW q, (register_a +offset_x)  ╱─ 2150

/* b.x=r; */
            STW r, (register_b+offset_x)   ╱─ 2160
                         •
                         •
                         •
    /* Emit deferred write barrier for a.x modification */  ─ 2175
            WRITE BARRIER FOR A.X MODIFICATION   ╱

/* Spill contents of register_b */  ╱─── 2195
                STW register_b, slot_b /* Instantiate two new objects e and f */
                CALL newInstance_object  ─── 2165
                CALL newInstance_object  ─── 2170
                         •
                         •
                         •
                  /* b.y=p; */     ╱─ 2180
            STW p, (slot_b +offset_y)
                         •
                         •
                         •
        /*Emit deferred write barriers for object b */  ─ 2185
            WRITE BARRIER FOR B.X MODIFICATION  ╱─ 2190
            WRITE BARRIER FOR B.Y MODIFICATION ╱
```

FIG. 21

/* Method m */ — 2300

⋮

/* o.f=a; */ — 2310
STW a, (register_o +offset_f)

⋮

/* o.g=b; */ — 2320
STW b, (register_o +offset_g)

⋮

/* o.h=c; */ — 2330
STW c, (register_o +offset_h)

⋮

/* Guard code protecting deferred write barriers   */
/* corresponding to reference modifications made */
/* to the object o                                 */

2340 { SUBCC register_o, register_1, 0
       BNEG END

2350 { WRITE BARRIER FOR o.f MODIFICATION
       WRITE BARRIER FOR o.g MODIFICATION
       WRITE BARRIER FOR o.h MODIFICATION

END:

FIG. 23

DEFERRING AND COMBINING WRITE BARRIERS FOR A GARBAGE-COLLECTED HEAP

FIELD OF THE INVENTION

The present invention is directed to memory management. It particularly concerns what has come to be known as "garbage collection."

BACKGROUND OF THE INVENTION

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs can be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 100 depicted in FIG. 1, for example. Data, and instructions for operating on them, that a microprocessor 110 uses may reside in on-board cache memory or be received from further cache memory 120, possibly through the mediation of a cache controller 130. That controller 130 can in turn receive such data from system read/write memory ("RAM") 140 through a RAM controller 150 or from various peripheral devices through a system bus 160. Additionally, instructions and data may be received from other computer systems via a communication interface 180. The memory space made available to an application program may be "virtual" in the sense that it may actually be considerably larger than RAM 140 provides. So the RAM contents will be swapped to and from a system disk 170.

Additionally, the actual physical operations performed to access some of the most-recently visited parts of the process's address space often will actually be performed in the cache 120 or in a cache on board microprocessor 110 rather than on the RAM 140, with which those caches swap data and instructions just as RAM 140 and system disk 170 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

The use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation. Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak." Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference."

A way of reducing the likelihood of such leaks and related errors is to provide memory-space reclamation in a more automatic manner. Techniques used by systems that reclaim memory space automatically are commonly referred to as garbage collection. Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable. As used herein, a call stack is a data structure corresponding to a process or thread (i.e., an application), whereby the call stack comprises a sequence of frames that store state information, such as register contents and program counter values, associated with nested routines within the process or thread.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a root set, e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 200. The compiler object code is typically stored on a medium such as FIG. 1's system disk 170 or some other machine-readable medium, and it is loaded into RAM 140 to configure the computer system to act as a compiler. In some cases, though, the compiler object code's persistent storage may instead be provided in a server system remote from the machine that performs the compiling. The electrical signals that carry the digital data by which the computer systems exchange that code are examples of the kinds of electromagnetic signals by which the computer instructions can be communicated. Others include radio waves, microwaves, and both visible and invisible light.

The input to the compiler is the application source code, and the end product of the compiler process is application object code. This object code defines an application 210, which typically operates on input such as mouse clicks, etc., to generate a display or some other type of output. This object code implements the relationship that the programmer intends to specify by his application source code. In one approach to garbage collection, the compiler 200, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage collection mechanism over a number of computer system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 310 written in a high-level language. A compiler 320 typically converts that code into "class files." These files include routines written in instructions, called "byte codes" 330, for a "virtual machine" that various processors can be configured to emulate. This conversion into byte codes is almost always separated in time from those codes' execution, so FIG. 3 divides the sequence into a "compile-time environment" 300 separate from a "run-time environment" 340, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 350. That process emulates a virtual machine from whose instruction set the byte codes are drawn. As is true of the compiler 320, the virtual-machine process 350 may be specified by code stored on a local disk or some other machine-readable medium from which it is read into FIG. 1's RAM 140 to configure the computer system to implement the garbage collector and otherwise act as a virtual machine. Again, though, that code's persistent storage may instead be provided by a server system remote from the processor that implements the virtual machine, in which case the code would be transmitted, e.g., electrically or optically to the virtual-machine-implementing processor.

In some implementations, much of the virtual machine's action in executing these byte codes is most like what those skilled in the art refer to as "interpreting," so FIG. 3 depicts the virtual machine as including an "interpreter" 360 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 370. The arrangement of FIG. 3 differs from FIG. 2 in that the compiler 320 for converting the human programmer's code does not contribute to providing the garbage collection function; that results largely from the virtual machine 350's operation.

Those skilled in that art will recognize that both of these organizations are merely exemplary, and many modern systems employ hybrid mechanisms, which partake of the characteristics of traditional compilers and traditional interpreters both. The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

Now, some of the functionality that source-language constructs specify can be quite complicated, requiring many machine-language instructions for their implementation. One quite-common example is a source-language instruction that calls for 64-bit arithmetic on a 32-bit machine. More germane to the present invention is the operation of dynamically allocating space to a new object; this may require determining whether enough free memory space is available to contain the new object and reclaiming space if there is not.

In such situations, the compiler may produce "inline" code to accomplish these operations. That is, all object-code instructions for carrying out a given source-code-prescribed operation will be repeated each time the source code calls for the operation. But inlining runs the risk that "code bloat" will result if the operation is invoked at many source-code locations.

The natural way of avoiding this result is instead to provide the operation's implementation as a procedure, i.e., a single code sequence that can be called from any location in the program. In the case of compilers, a collection of procedures for implementing many types of source-code-specified operations is called a runtime system for the language. The compiler and its runtime system are designed together so that the compiler "knows" what runtime-system procedures are available in the target computer system and can cause desired operations simply by including calls to procedures that the target system already contains. To represent this fact, FIG. 3 includes block 380 to show that the compiler's output makes calls to the runtime system as well as to the operating system 390, which consists of procedures that are similarly system resident but are not compiler-dependent.

Although the FIG. 3 arrangement is a popular one, it is by no means universal, and many further implementation types can be expected. Proposals have even been made to implement the virtual machine 350's behavior in a hardware processor, in which case the hardware itself would provide some or all of the garbage-collection function. In short, garbage collectors can be implemented in a wide range of combinations of hardware and/or software.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage collection approaches rely heavily on interleaving garbage collection steps among mutator steps. In one type of garbage collection approach, for instance, the mutator operation of writing a reference is followed immediately by garbage collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage collector-related instructions into the main mutator process but instead interrupt it from time to time to perform garbage collection cycles, in which the garbage collector finds unreachable objects and reclaims their memory space for reuse. Such an approach will be assumed in discussing FIG. 4's depiction of a simple garbage collection operation. Within the memory space allocated to a given application is a part 420 managed by automatic garbage collection. As used hereafter, all dynamically allocated memory associated with a process or thread will be referred to as its heap. During the course of the application's execution, space is allocated for various objects 402, 404, 406, 408, and 410. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 402 is, by a reference in a root set 400. The root set consists of reference values stored in the mutator's threads' call stacks, the central processing unit (CPU) registers, and global variables outside the garbage collected heap. An object is also reachable if it is referred to, as object 406 is, by another reachable object (in this case, object 402). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 400. For the sake of simplicity, FIG. 4 depicts only one reference from the root set 400 into the heap 420. (Those skilled in the art will recognize that there are many ways to identify references, or at least data contents that may be references.) The collector notes that the root set points to object 402, which is therefore reachable, and that reachable object 402 points to object 406, which therefore is also reachable. But those reachable objects point to no other objects, so objects 404, 408, and 410 are all unreachable, and their memory space may be reclaimed.

To avoid excessive heap fragmentation, some garbage collectors additionally relocate reachable objects. FIG. 5 shows a typical approach for this "copying" type of garbage collection. The heap is partitioned into two halves, hereafter called "semi-spaces." For one garbage collection cycle, all objects are allocated in one semi-space 510, leaving the other semi-space 520 free. When the garbage collection cycle occurs, objects identified as reachable are "evacuated" to the other semi-space 520, so all of semi-space 510 is then considered free. Once the garbage collection cycle has occurred, all new objects are allocated in the lower semi-space 520 until yet another garbage collection cycle occurs, at which time the reachable objects are evacuated back to the upper semi-space 510.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

A conceptually simple way of deciding when to perform such a collection operation is simply to have it be triggered when the absence of enough free space prevents an attempted allocation from occurring. The mutator operation would then be interrupted to perform a garbage collection cycle, in which all objects, reachable from the root set are identified, and the space occupied by the other (garbage) objects is placed in a list of free memory blocks. For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, this effect can be reduced by choosing collection times opportunistically. For example, a garbage-collection cycle may be performed at a natural stopping point in the application, such as when the mutator awaits user input.

So it may often be true that the garbage collection operation's effect on performance can depend less on the total collection time than on when collections actually occur. But another factor that often is even more determinative is the duration of any single collection cycle, i.e., how long the mutator must remain quiescent at any one time. In an interactive system, for instance, a user may never notice hundred-millisecond interruptions for garbage collection, whereas most users would find interruptions lasting for two seconds to be annoying. To reduce the collector's adverse affect on mutator operation further, many collectors operate incrementally: they reclaim less than all of the unreachable objects' memory space in any one collection interval.

Most collectors that employ incremental collection operate in "generations" although this is not necessary in principle. Different portions, or generations, of the heap are subject to different collection policies. New objects are allocated in a "young" generation, and older objects are "promoted" from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generations 620, 640, and 660. Assume that generation 640 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 600 but also objects in the other generations 620 and 660, which themselves may contain references to objects in generation 640. So pointers must be traced not only from the basic root set 600 but also from objects within the other generations.

One could perform this tracing by simply inspecting all references in all other generations at the beginning of every collection cycle, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation in the mutator code to record information from which the garbage collector can determine where references were written or may have been written since the last collection interval. For each of a plurality of heap subdivisions that may be collected in different increments, a respective list is kept of where references to objects in that heap subdivision have been found. Each list can then be maintained by taking such a list as it existed at the end of the previous collection interval and updating it by inspecting only locations identified by the write barriers as possibly modified since the last collection interval.

One of the many write-barrier implementations commonly used by workers in this art employs what has been referred to as the "card table." FIG. 6 depicts the various generations as being divided into smaller sections, known for this purpose as "cards." Card tables 610, 630, and 650 associated with respective generations contain an entry for each of their cards. When the mutator writes a reference in a card, it makes an appropriate entry in the card-table location associated with that card (or, say, with the card in which the object containing the reference begins). Most write-barrier implementations simply make a Boolean entry indicating that the write operation has been performed, although some may be more elaborate. For example, assume reference 624 on card 622 is modified ("dirtied") by the mutator, so a Boolean entry in corresponding card-table entry 605 may be set accordingly. The mutator having thus left a record of where new or modified references may be, the collector may scan the card-table to identify those cards in the mature generation that were marked as having been modified since the last collection cycle, and the collector can scan only those identified cards for modified references.

Of course, there are other write-barrier approaches, such as simply having the write barrier add to a list of addresses where references were written. For instance, the list may be stored in a sequential store buffer that is updated by write barriers in the mutator code. When the sequential store buffer is filled, the mutator may be interrupted so a garbage collector can reclaim unused memory based on addresses in the buffer. At the end of such a collection cycle, the buffer is cleared and the mutator resumes until it is interrupted again by the next garbage-collection cycle.

Also, although there is no reason in principle to favor any particular number of generations, and although FIG. 6 shows three, most generational garbage collectors have only two generations, of which one is the young generation and the other is the mature generation. Moreover, although FIG. 6 shows the generations as being of the same size, a more-typical configuration is for the young generation to be considerably smaller. Further, each generation may be dispersed over various address ranges of memory instead of comprising a contiguous block of memory as shown in FIG. 6. Finally, although we assumed for the sake of simplicity that collection during a given interval was limited to only one generation, a more-typical approach is actually to collect the whole young generation at every interval but to collect the mature one less frequently.

Some collectors collect the entire young generation in every interval and may thereafter collect the mature generation collection in the same interval. It may therefore take relatively little time to scan all young-generation objects remaining after young-generation collection to find references into the mature generation. Even when such collectors do use card tables, therefore, they often do not use them for finding young-generation references that refer to mature-generation objects. On the other hand, laboriously scanning the entire mature generation for references to young-generation (or mature-generation) objects would ordinarily take too long, so write barriers are typically used to set card-table entries associated with the mature generation to thereby limit the amount of memory the collector searches for modified mature-generation references.

Write barrier code is often inserted into mutator code in close proximity to a corresponding mutator instruction that modifies a reference. In an imprecise card-marking scheme, the write barrier code marks the card-table entry that corresponds to the card in which the modified object begins. In a precise card-marking scheme, the write barrier marks the card-table entry that corresponds to the card in which the modified field is located. FIG. 7 illustrates an exemplary reference-modifying mutator instruction (line N+1) and its corresponding sequence of write-barrier code (lines N+3 through N+5) for marking a card-table entry in accordance with a precise card-marking scheme.

FIG. 7's line N+1 is an assembly instruction (STW) that stores a word-length value into an object reference field located an offset C from the object's starting address. Lines N+3 through N+5 illustrate the reference-modifying STW instruction's corresponding write-barrier code. In this example, the write barrier adds three instructions not originally present in the mutator code: ADD, Shift Right Logical (SRL) and Store Byte (STB) instructions. Specifically, the instruction at line N+3 stores the address of the modified object field in a "working" register, and the instruction at line N+4 divides this address by the card size to determine how many cards into the mature generation the modified field is located. Here, the card size is assumed to be a power of 2 bytes. Lastly, the instruction at line N+5 marks a card-table entry with a binary "0" corresponding to the card in the mature generation that stores the modified object reference field. As described, each card-table entry is assumed to have a length of one byte.

As seen with regards to FIG. 7, the inclusion of write barriers in the mutator code increases the size of mutator code, e.g., by three instructions per reference-modifying mutator instruction. Further, one or more additional instructions (not shown) may have to be added to the mutator code to store the base memory addresses of the card tables whose entries are marked by the mutator's write-barrier code. Clearly, this added code overhead may significantly increase the mutator's execution time, especially when the mutator code contains a relatively large number of reference-modifying instructions. So adding write barriers to increase the garbage collector's efficiency tends to compromise the mutator's.

SUMMARY OF THE INVENTION

The present invention provides a technique for reducing the number of write barriers without compromising garbage-collector performance or correctness. Conventionally, a compiler emits write-barrier code at a location immediately following a reference-modifying instruction in the mutator code. In contrast, a compiler embodying the invention may defer emitting the instruction's write-barrier code until a subsequent location in the mutator code, i.e., not immediately following the reference-modifying instruction. By deferring write barriers in this manner, the compiler can analyze the deferred write barriers and combine those that, when executed, provide the same information to the garbage collector. Preferably, the compiler emits the remaining, uncombined deferred write barriers at consecutive locations in the mutator code. Because redundant or unnecessary write-barrier code is removed from the mutator code, the inventive technique can minimize the amount of write-barrier overhead in the mutator, thereby enabling the mutator to execute faster and more efficiently.

In an illustrative embodiment, the compiler maintains a list of where, in an allocated region of memory, references are modified by mutator instructions. For every reference-modifying mutator instruction, the compiler creates an entry in the list in lieu of emitting the instruction's corresponding write-barrier code into the mutator code. Each list entry stores at least enough information for the compiler to generate the deferred write-barrier code corresponding to the entry's associated reference-modifying mutator instruction. When the compiler reaches a predetermined location in the mutator code, the compiler generates and emits the mutator's deferred write barriers based on the contents of the list's entries.

Advantageously, at some time before the deferred write barriers are emitted, the compiler may scan the list to remove or combine entries that would result in the compiler generating write-barrier code that, when executed, performs the same garbage-collection operations. Accordingly, the compiler eliminates redundant or unnecessary list entries, then emits deferred write-barrier code corresponding to the remaining list entries. For example, the compiler may combine identical entries in the list since they correspond to the same deferred write-barrier code. The compiler also may combine or remove entries that correspond to mutator instructions that modify references in the same region of memory, such as a card, when the entries' deferred write-barrier code would provide the collector with the same information. In this way, the compiler can reduce the amount of write-barrier code emitted in the mutator without negatively affecting the garbage collector's performance. Preferably, the remaining deferred write barriers (i.e., those that are not combined or elided) are emitted sequentially at a predetermined point in the mutator code, thereby enabling more efficient use of guard code and improving cache performance when the mutator is executed.

At run-time, a garbage-collection interval may interrupt the mutator's execution before the mutator's deferred write barriers have been executed. When this occurs, the garbage collector may refer to a compiler-generated list identifying where unrecorded reference modifications were made in the heap before the mutator's execution was interrupted. According to the illustrative embodiment, the collector may combine or elide redundant or unnecessary entries in the compiler-generated list, then rely on the list's remaining entries to perform its garbage-collection functions.

In general, in one aspect, the invention relates to a method for employing a computer system to compile source code that specifies operation of a mutator, which includes at least one reference-modifying instruction, together with a garbage collector that relies on the mutator's execution of write-barrier code to keep track of at least some reference modifications. The method includes deferring emission of write-barrier code corresponding to at least one reference-modifying instruction in the mutator by recording in a list a separate entry for each reference-modifying instruction whose write barrier emission has been deferred, wherein each list entry stores at least enough information to enable a write barrier to be generated for the entry's corresponding reference-modifying instruction. The method also includes combining or eliding one or more entries in the list if the one or more entries satisfy any elision criterion in a set of at least one elision criterion, each criterion being satisfied if the one or more entries correspond to reference-modifying instructions whose deferred write barriers, if executed, would provide unnecessary or redundant information to the garbage collector. In addition the method includes emitting, at a predetermined point in the mutator, at least one deferred write barrier corresponding to a list entry that was not combined or elided.

In general, in one aspect, the invention relates to a method for reducing the amount of write-barrier code emitted in a mutator containing at least one reference-modifying instruction. The method includes deferring emission of at least one write barrier corresponding to a reference-modifying instruction in the mutator, combining or eliding deferred write barriers that satisfy any elision criterion in a set of at least one elision criterion, and emitting, at a predetermined point in the mutator, the remaining deferred write barriers that have not been combined or elided.

In one or more embodiments of the invention, each elision criterion in the a set of elision criterion determines whether two or more deferred write barriers, if executed, would provide unnecessary or redundant information to a garbage collector. In one or more embodiments of the invention, a criterion in the set of elision criterion determines whether the two or more deferred write barriers correspond to reference-modifying instructions that modify the same memory location. In one or more embodiments of the invention, a criterion in the set of elision criterion determines whether two or more deferred write barriers correspond to reference-modifying instructions that modify reference values located in the same object or card. In one or more embodiments of the invention, a criterion in the set of elision criterion determines whether two or more deferred write barriers correspond to reference-modifying instructions that modify reference values located within a known range of memory addresses.

In general, in one aspect, the invention relates to a method for employing a computer system to compile source code that specifies operation of a mutator, which includes at least one reference-modifying instruction, together with a garbage collector that relies on the mutator's execution of write-barrier code to keep track of at least some reference modifications. The method includes suspending execution of the mutator at a possible safe point in the mutator and locating a list containing a separate entry for each reference-modifying instruction in the mutator that was executed without corresponding write-barrier code before the mutator was suspended, each list entry containing enough information to inform the garbage collector of the same information that the garbage collector would have received if a write barrier had been executed for the entry's corresponding reference-modifying instruction. The method also includes combining or eliding one or more entries in the list if the one or more entries satisfy any elision criterion in a set of at least one elision criterion, each criterion being satisfied if the one or more list entries correspond to reference-modifying instructions whose deferred write barriers, if executed, would provide unnecessary or redundant information to the garbage collector, and performing garbage-collection operations based on the contents of the remaining list entries that are not combined or elided.

In one or more embodiments of the invention, a criterion in the set of elision criterion tests whether two or more entries in the list are identical. In one or more embodiments of the invention, a criterion in the set of elision criterion tests whether two or more entries in the list correspond to reference-modifying instructions that modify reference values located in the same object or card. In one or more embodiments of the invention, a criterion in the set of elision criterion tests whether two or more entries in the list correspond to reference-modifying instructions that modify reference values located within a known range of memory addresses.

In general, in one aspect, the invention relates to a computer system for reducing the amount of write-barrier code emitted in a mutator containing at least one reference-modifying instruction, the computer system including means for deferring emission of at least one write barrier corresponding to a reference-modifying instruction in the mutator, means for combining or eliding deferred write barriers that satisfy any elision criterion in a set of at least one elision criterion, and means for emitting, at a predetermined point in the mutator, the remaining deferred write barriers that have not been combined or elided.

In general, in one aspect, the invention relates to a computer system to compile source code that specifies operation of a mutator, which includes at least one reference-modifying instruction, together with a garbage collector that relies on the mutator's execution of write-barrier code to keep track of at least some reference modifications, the computer system including means for suspending execution of the mutator at a possible safe point in the mutator and means for locating a list containing a separate entry for each reference-modifying instruction in the mutator that was executed without corresponding write-barrier code before the mutator was suspended, each list entry containing enough information to inform the garbage collector of the same information that the garbage collector would have received if a write barrier had been executed for the entry's corresponding reference-modifying instruction. The computer system also includes means for combining or eliding one or more entries in the list if the one or more entries satisfy any elision criterion in a set of at least one elision criterion, each criterion being satisfied if the one or more list entries correspond to reference-modifying instructions whose deferred write barriers, if executed, would provide unnecessary or redundant information to the garbage collector, and means for performing garbage-collection operations based on the contents of the remaining list entries that are not combined or elided.

In general, in one aspect, the invention relates to a computer system for reducing the amount of write-barrier code emitted in a mutator containing at least one reference-modifying instruction, the computer system including a processor and a computer-readable memory, to which the processor is responsive, that stores instructions executable by the processor. The instructions are for deferring emission of at least one write barrier corresponding to a reference-modifying instruction in the mutator, combining or eliding deferred write barriers that satisfy any elision criterion in a set of at least one elision criterion; and emitting, at a predetermined point in the mutator, the remaining deferred write barriers that have not been combined or elided.

In general, in one aspect, the invention relates to a computer system to compile source code that specifies operation of a mutator, which includes at least one reference-modifying instruction, together with a garbage collector that relies on the mutator's execution of write-barrier code to keep track of at least some reference modifications, the computer system including a processor, and a computer-readable memory, to which the processor is responsive, that stores instructions executable by the processor. The instructions are executable by the processor for suspending execution of the mutator at a possible safe point in the mutator, and locating a list containing a separate entry for each reference-modifying instruction in the mutator that was executed without corresponding write-barrier code before the mutator was suspended, each list entry containing enough information to inform the garbage collector of the same information that the garbage collector would have received if a write barrier had been executed for the entry's corresponding reference modifying instruction. The instructions are also executable for combining or eliding one or more entries in the list if the one or more entries satisfy any elision criterion in a set of at least one elision criterion, each criterion being satisfied if the one or more list entries correspond to reference-modifying instructions whose deferred write barriers, if executed, would provide unnecessary or redundant information to the garbage collector, and performing garbage-collection operations based on the contents of the remaining list entries that are not combined or elided.

In general, in one aspect, the invention relates to a computer readable medium comprising program instructions stored therein for execution on a processor for the practice of a method for reducing the amount of write-barrier code emitted in a mutator containing at least one reference-modifying instruction. The method includes deferring emission of at least one write barrier corresponding to a reference modifying instruction in the mutator, combining or eliding deferred write barriers that satisfy any elision criterion in a set of at least one elision criterion, and emitting, at a predetermined point in the mutator, the remaining deferred write barriers that have not been combined or elided.

In general, in one aspect, the invention relates to a computer readable medium comprising program instructions stored therein for execution on a processor for the practice of a method for employing a computer system to compile source code that specifies operation of a mutator, which includes at least one reference-modifying instruction, together with a garbage collector that relies on the mutator's execution of write-barrier code to keep track of at least some reference modifications. The method includes suspending execution of the mutator at a possible safe point in the mutator, and locating a list containing a separate entry for each reference-modifying instruction in the imitator that was executed without corresponding write-barrier code before the mutator was suspended, each list entry containing enough information to inform the garbage collector of the same information that the garbage collector would have received if a write barrier had been executed for the entry's corresponding reference-modifying instruction. The method also includes combining or eliding one or more entries in the list if the one or more entries satisfy any elision criterion in a set of at least one elision criterion, each criterion being satisfied if the one or more list entries correspond to reference-modifying instructions whose deferred write barriers, if executed, would provide unnecessary or redundant information to the garbage collector, and performing garbage-collection operations based on the contents of the remaining list entries that are not combined or elided.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 7, previously discussed, is an exemplary source code listing of a write barrier that may be used in accordance with the present invention;

FIG. 13 is an exemplary method that includes deferred write-barrier code, where the method comprises two instructions that modify object reference fields in the same double-word;

FIG. 21 is an exemplary method that includes deferred write-barrier code, where the method comprises instructions that "spill" the contents of a hardware register into a stack-frame slot;

FIG. 23 is an exemplary method that includes deferred write-barrier code whose execution depends on the result of a guard instruction;

DETAILED DESCRIPTION OF ILLUSTRATIVE EMBODIMENTS

I. Deferring and Combining Write Barriers in Compiled Code

A. Deferring Write Barriers in Compiled Code

Conventionally, a compiler emits a write barrier (i.e., write-barrier code, as shown in FIG. 7) at a location in the mutator code immediately following a reference-modifying mutator instruction. In contrast, a compiler embodying the present invention will not always emit a write barrier immediately following its corresponding reference-modifying instruction. Instead, the compiler may defer emitting the write-barrier code until a subsequent location in the mutator code. To that end, the compiler may maintain a list of reference-modifying instructions whose write barriers have been deferred. At some later point in the mutator code, the compiler may emit write barriers based on information stored in the list. Notably, the deferred write-barrier code may be emitted in accordance with various write-barrier implementations, such as sequential store buffers, precise card-marking, imprecise card-marking, and so forth.

Figure 1:
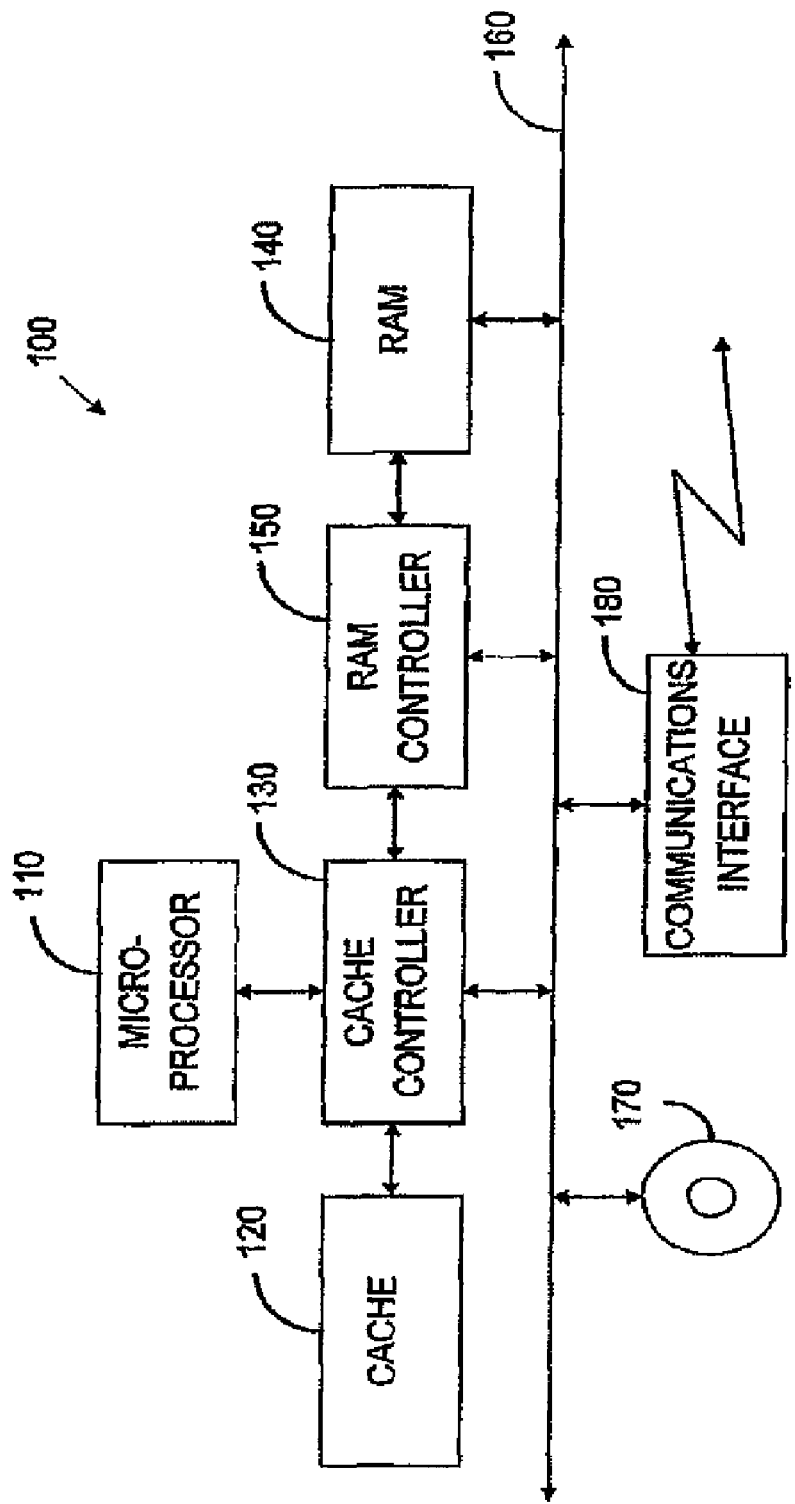
FIG. 1, previously discussed, is a schematic block diagram of a computer system of a type in which the present invention's teachings can be practiced.
Figure 2:
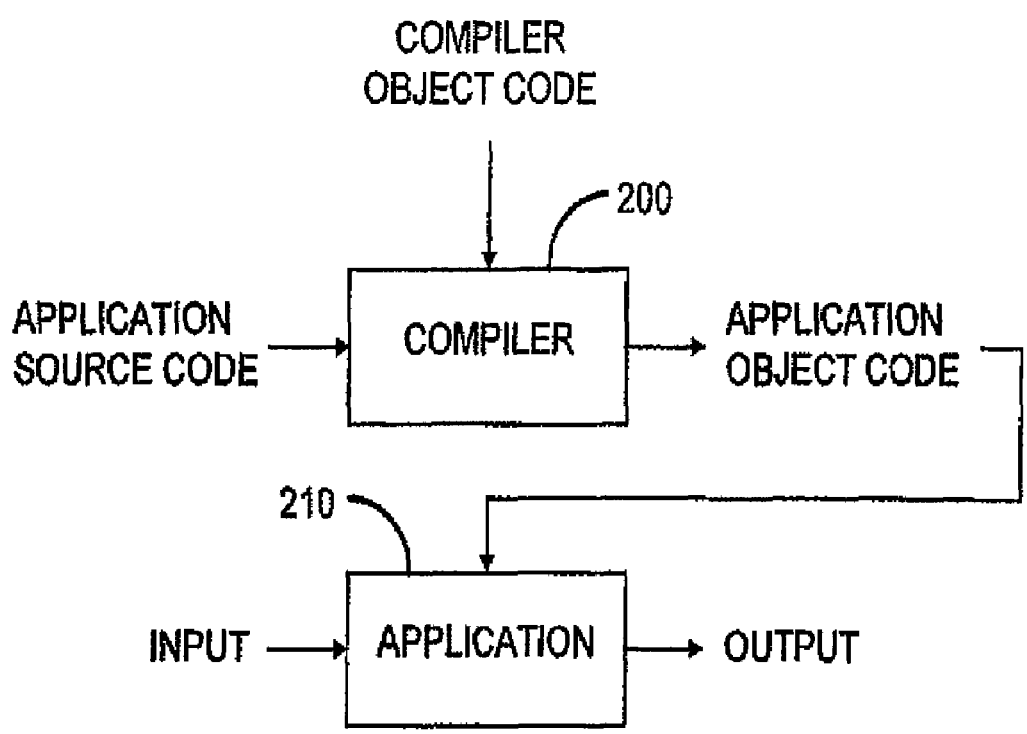
FIG. 2, previously discussed, is a schematic block diagram illustrating a simple source-code compilation operation.
Figure 3:
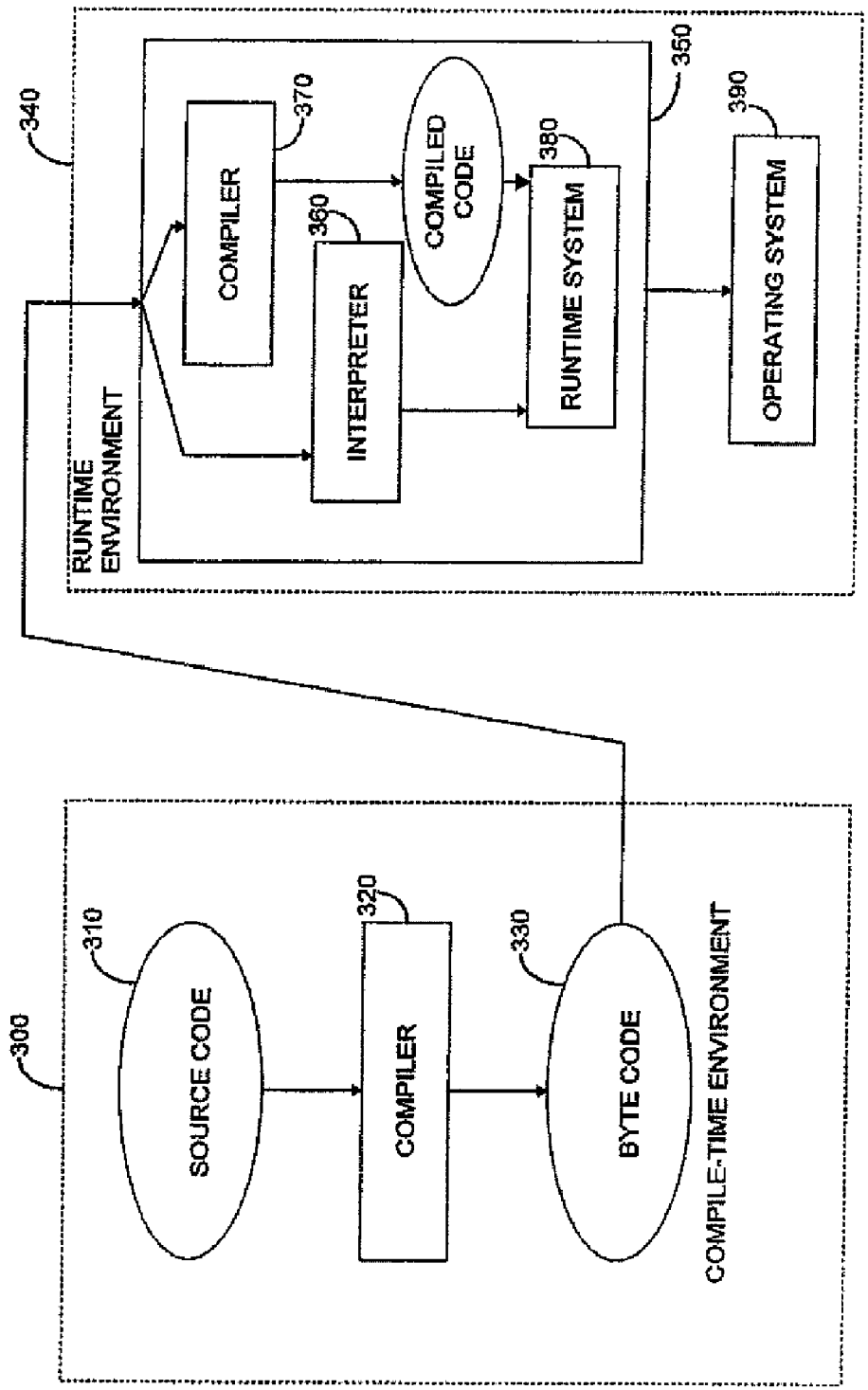
FIG. 3, previously discussed, is a schematic block diagram of a more complex compiler/interpreter organization.
Figure 4:
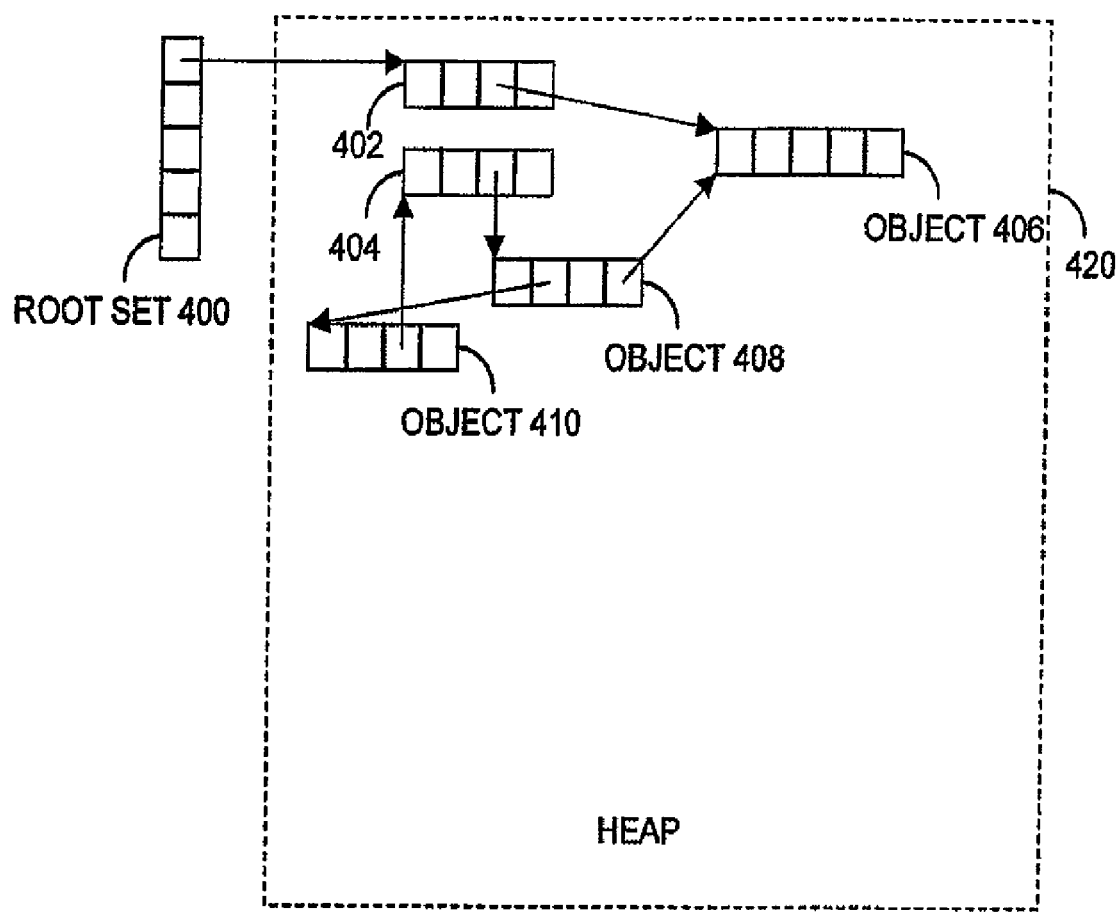
FIG. 4, previously discussed, is a schematic block diagram that illustrates a basic garbage collection mechanism.
Figure 5:
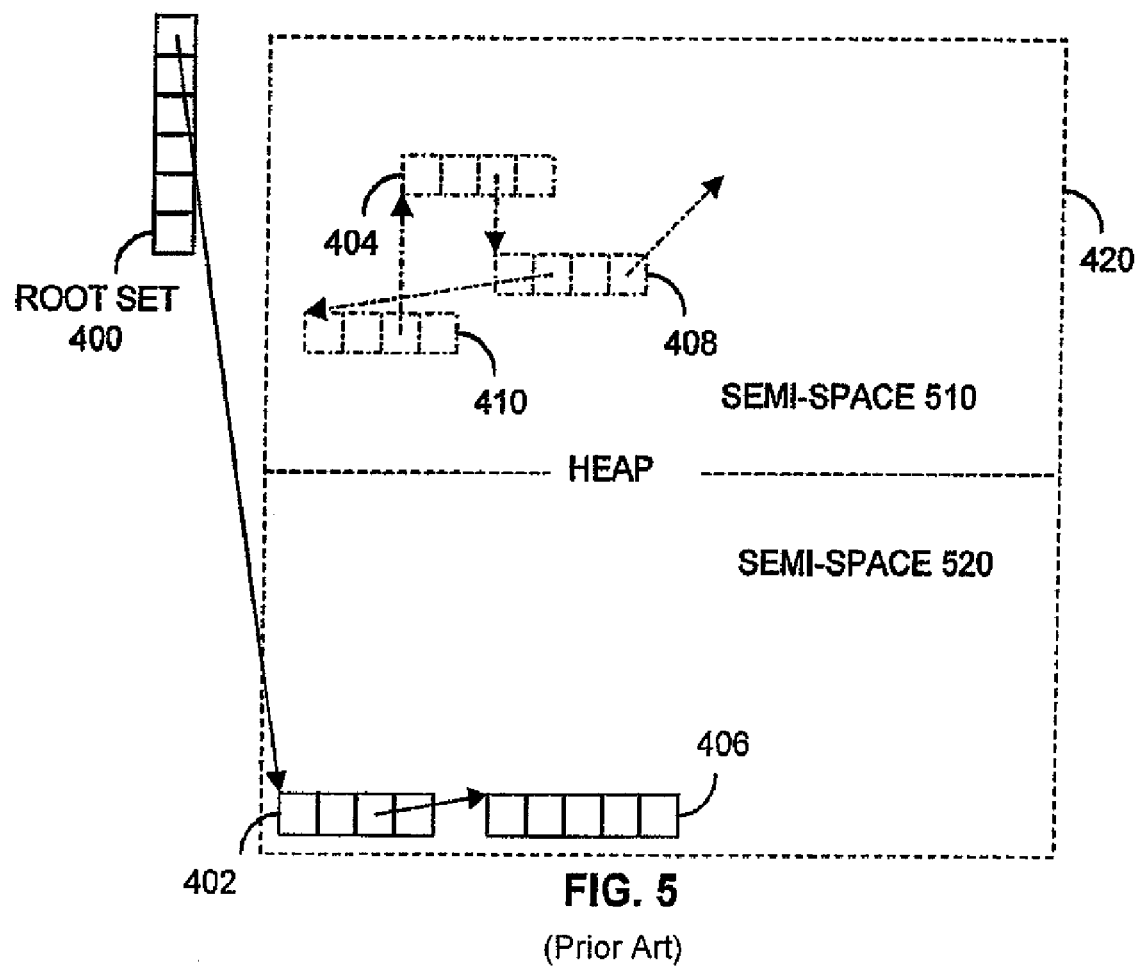
FIG. 5, previously discussed, is a schematic block diagram illustrating an the relocation operation of the garbage collection mechanism of FIG. 7.
Figure 6:
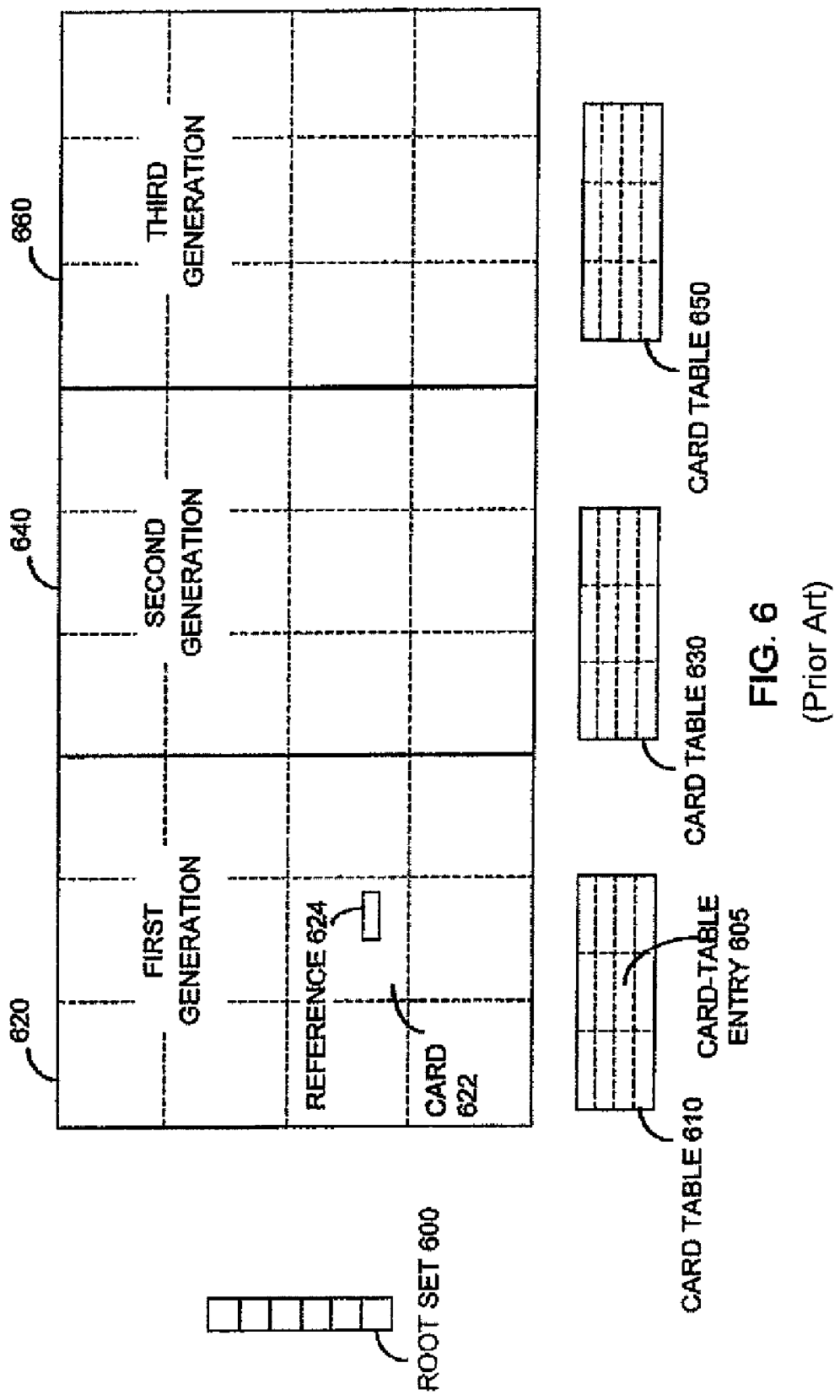
FIG. 6, previously discussed, is a schematic block diagram that illustrates a garbage collected heap's organization into generations.
Figure 8:
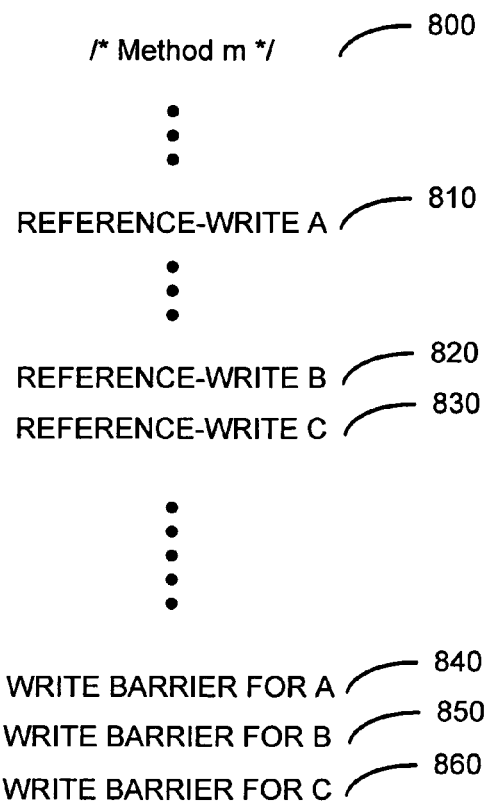
FIG. 8 is exemplary method code having deferred write barriers emitted at the end of the method.

FIG. 8 is an exemplary listing of pseudo-code 800 for a mutator method m. Among the method's instructions are reference-modifying instructions 810, 820, and 830 (labeled A, B, C, respectively). A compiler that compiles the exemplary method m for a garbage-collected system would conventionally emit write-barrier code immediately after emitting each reference-modifying instruction. That is, a write barrier 840 would conventionally be emitted immediately after instruction 810, a write barrier 850 would be emitted immediately after instruction 820 and a write barrier 860 would be emitted immediately after instruction 830. However, as shown in FIG. 8, the compiler in the illustrative embodiment does not immediately emit those write barriers after their corresponding reference-modifying mutator instructions. Rather, the compiler defers emission of the write barriers 840, 850, and 860 until a later point in the mutator code.

In general, the compiler converts source-code or byte-code representations of the mutator method m into machine-level instructions that may be executed by a processor. The compiler typically performs one or more data-flow analyses as it converts the received mutator code into machine-level instructions. As used herein, the mutator's data flow defines the logical progression that the compiled mutator instructions will be executed by the processor. Thus, the compiler's data-flow analyses may be used to determine an optimized sequence of instructions which may be emitted into the compiled mutator code. To that end, the compiler may perform one or more "passes" through the mutator code in order to analyze the code's data flow. At each pass, the compiler often "tracks" state information related to values and expressions that it manipulates when generating the optimized sequence of mutator instructions. This state information can be propagated among the various compilation passes to facilitate generation of the compiled mutator code.

Value numbers provide one mechanism the compiler may employ for tracking values and expressions in the compiled mutator code. The compiler assigns a unique value number to each abstract value or expression that it manipulates while compiling the mutator code. For example, different value numbers may be assigned to objects, arrays, reference values, etc. allocated by instructions in the mutator method m. In some cases, the compiler can identify a specific reference value in the heap solely based on the reference value's associated value number. However, more generally, the compiler identifies a reference value based on a value number in combination with other information. For instance, if a first value number is assigned to an object allocated in the method m, then the combination of the first value number with an offset value can specify a particular object-reference field in the object. Similarly, a second value number assigned to a reference array may be combined with a mathematical expression specifying a particular reference-array element. Value numbers and their uses are described in more detail in Chapter 12 of *Advanced Compiler Design and Implementation*, by Steven Muchnick, published 1997, which is hereby incorporated by reference as though fully set forth herein.

Although value numbers are symbolic representations of values and expressions manipulated by the compiler, the compiler does not emit mutator instructions in terms of its internal value numbers. Instead, the compiler converts the value numbers to equivalent run-time expressions that may be incorporated in the compiled mutator code. For instance, the compiler may maintain a table that associates value numbers of objects and arrays with the specific registers and/or stack-frame slots that store run-time memory locations of those objects and arrays. This table may be dynamically updated during the compilation process as the memory locations of objects and arrays are transferred among different registers and stack-frame slots.

For example, suppose an instruction in the mutator method m allocates an object o and the compiler assigns the object a value number equal to valnum_o. Further suppose that the instruction stores the memory location of the object o in the register register_o. In this case, the compiler refers to the object o as valnum_o in its (internal) intermediate representations of the compiled mutator code, even though the compiler explicitly emits mutator instructions for the object o in terms of register_o. Next, assume that at some later point in the mutator code the compiler emits instructions that copy the object o's memory location out of the register_o and into a stack-frame slot slot_o. Subsequently, the compiler continues to reference the object during its compilation processes as valnum_o, although compiled instructions referring to the object are now emitted in terms of slot_o (rather than in terms of register_o).

Figure 9:
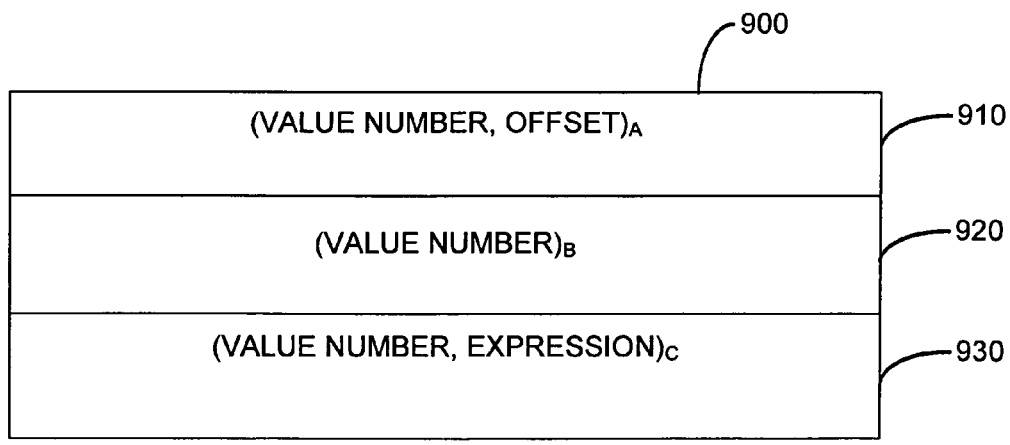
FIG. 9 is a schematic block diagram of a table that may store information that enables a compiler to generate the deferred write barriers in FIG. 8.

FIG. 9 illustrates a table 900 that may be used by the compiler to store a list of memory locations where FIG. 8's reference-modifying instructions A, B and C modify references in the heap. The list stored in table 900 includes entries 910, 920 and 930 indicating value-number expressions that respectively correspond to the reference values modified by the mutator instructions A, B and C. Illustratively, the entry 910 stores a value number and offset pair that collectively identify a reference value modified by the mutator instruction 810. The entry 920 stores a value number corresponding to the reference value modified by the instruction 820. And the entry 930 stores a value number and a mathematical expression that collectively identify the reference value modified by the instruction 830. Advantageously, the compiler emitting FIG. 8's mutator code dynamically updates the table 900 as it compiles the mutator code.

Based on the table entries 910, 920 and 930, the compiler can emit the deferred write barriers 840-860, e.g., at the end of the method m. More specifically, the compiler uses the value-number expressions stored in the entries 910-930 to identify which reference values are modified in the mutator method m without emission of corresponding write-barrier code. For each value-number expression, the compiler first identifies a memory location associated with the object, array, etc. whose value number is stored in the value-number expression. To that end, the compiler may maintain a table (not shown) that maps the value number to a particular register or stack-frame slot accessible in the run-time system. The compiler then combines the value number's associated memory location (e.g., register or slot) with the remaining information in the value-number expression to generate and emit the appropriate write-barrier code 840-860.

For purposes of discussion, the deferred write-barrier code is emitted at the end of the method m 800. However, it is expressly contemplated that the compiler may emit the deferred write-barrier code at other locations in the emitted mutator code as well. That is, as more write barriers are deferred in the method 800, the compiler's table 900 may "grow" unreasonably large and consume an excessive amount of memory resources. Therefore, the compiler may periodically emit some (or all) of its deferred write-barrier code at locations prior to the last mutator instruction so as to conserve resources, such as memory usage, during its compilation process. As described in section II below, such periodic "winnowing" of entries in the table 900 enables the compiler to generate mutator code having certain run-time advantages as well.

Advantageously, deferring write-barrier emission at compile time, as illustrated in FIGS. 8 and 9, enables the compiler to eliminate unnecessary or redundant write-barrier code from the compiled mutator code, regardless of which type of write-barrier implementation is employed (e.g., sequential store buffers, precise card marking, imprecise card marking, etc.). As a result, the mutator may contain less write-barrier overhead and consequently execute faster and more efficiently at run time. Furthermore, by collocating deferred write barriers in the mutator code, the compiled mutator code can also exhibit improved cache performance at run time.

B. Combining Write Barriers in Compiled Code (i) Emitting a Single Write Barrier for Multiple Reference Modifications to the Same Memory Location When write-barrier emission has been deferred for multiple reference-modifying mutator instructions, the compiler may be able to determine that two or more of the deferred write barriers correspond to reference modifications made to the same memory location. In such a case, the compiler may be able to reduce the number of deferred write barriers emitted in the mutator code. Suppose, for example, that FIG. 8's instructions 810, 820, and 830 take the form of FIG. 10's reference-modifying instructions 1010, 1020, and 1030. For instance, instruction 1010 (o.f=a;) modifies a field f in an object o, instruction 1020 (o.f=b;) modifies the same field f in the object o and instruction 1030 (x.f=c;) modifies a field f in a different object x.

Figure 10:
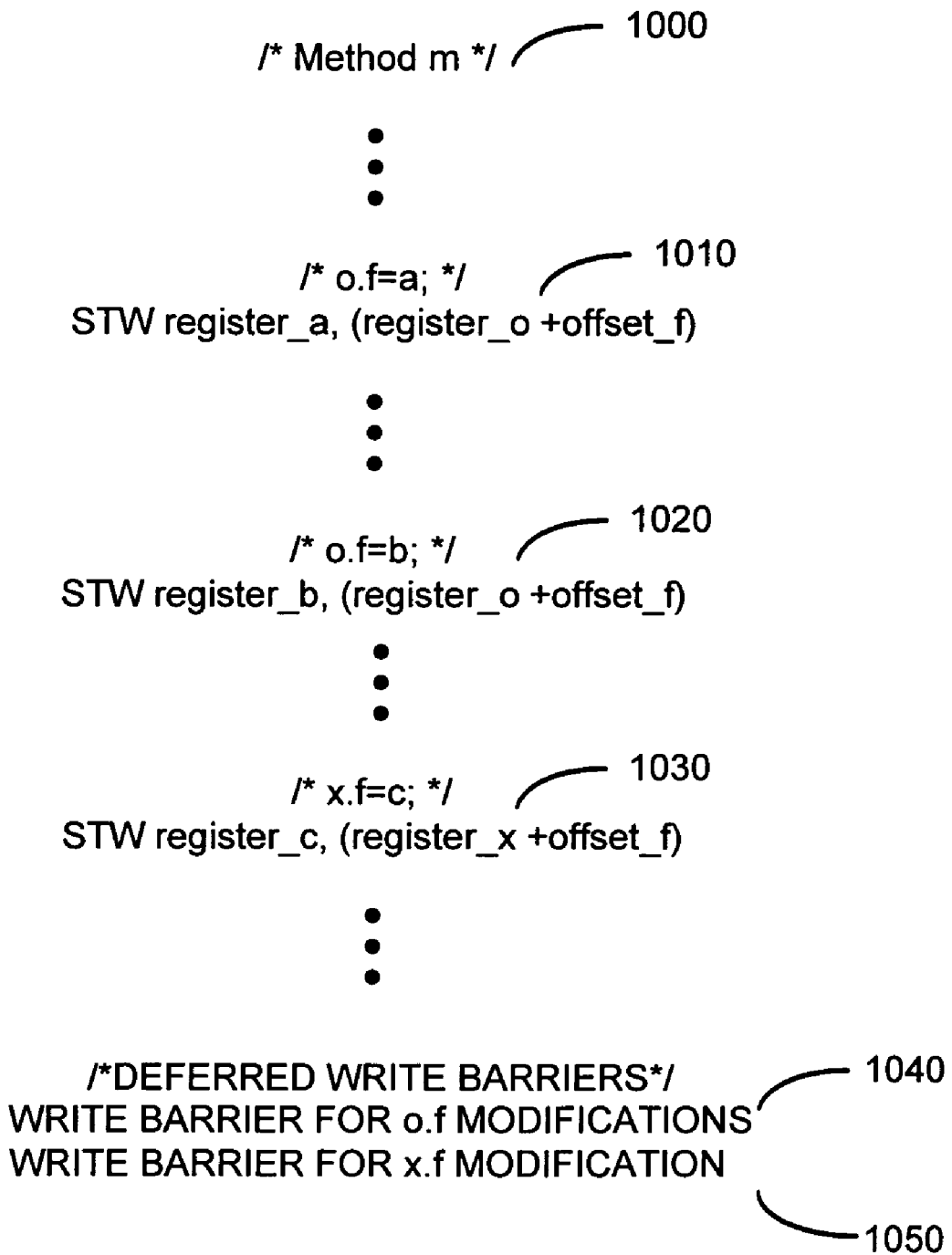
FIG. 10 is an exemplary method that includes deferred write-barrier code, where the method comprises two instructions that modify the same object reference field.
Figure 11:
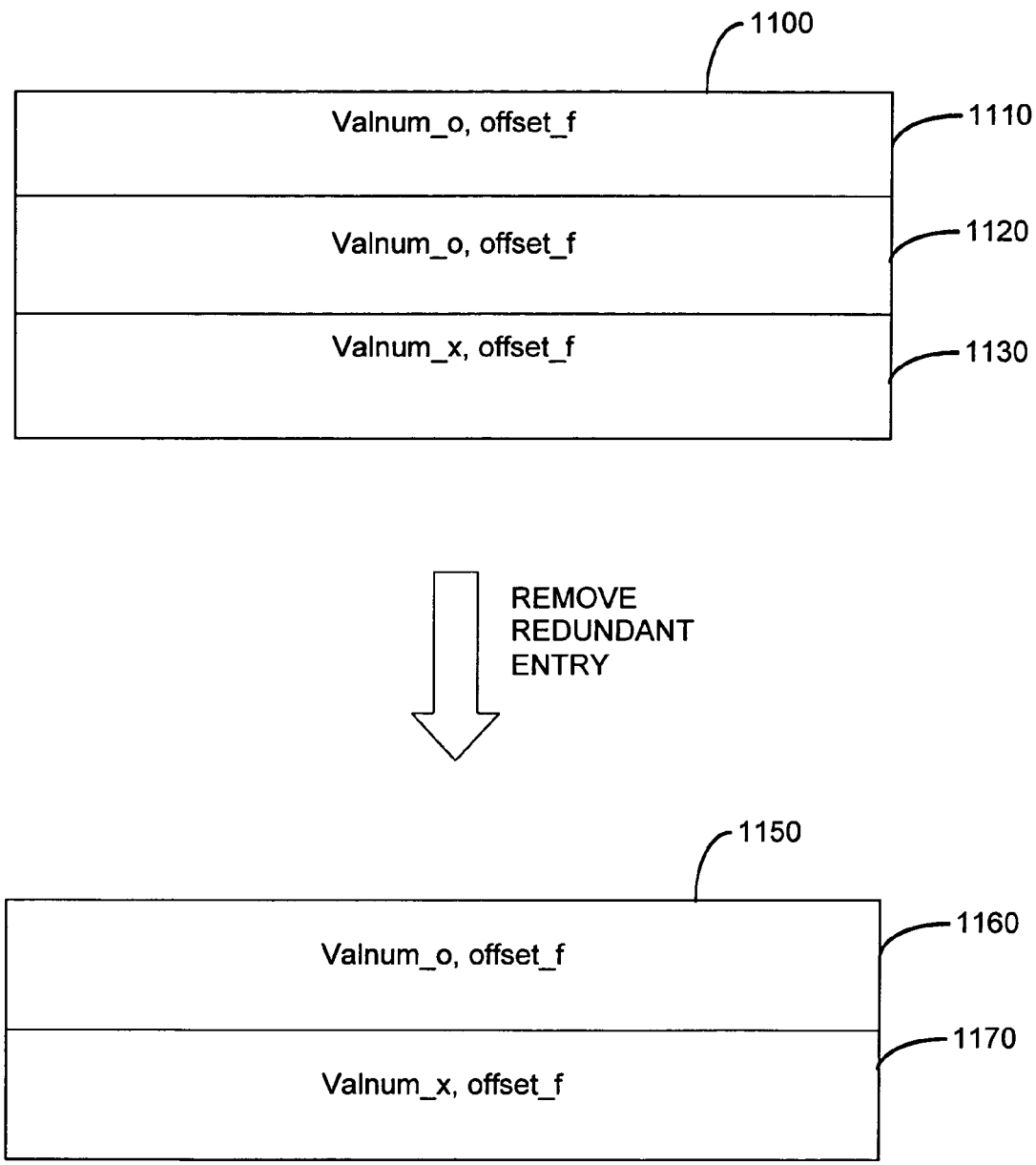
FIG. 11 is a schematic block diagram of a table having entries that may be combined or elided to generate a new, condensed table used to generate the deferred write barriers in FIG. 10.

Suppose further that, in deferring write-barrier emission for those reference modifications, the compiler has kept a list, e.g., in FIG. 11's table 1100, of where FIG. 10's reference-modifying instructions modify references in the heap without a corresponding write barrier. The table 1100 therefore contains three entries 1110, 1120 and 1130 respectively corresponding to the reference-modifying instructions 1010, 1020 and 1030. In this example, the value numbers valnum_o and valnum_x correspond to the memory locations of the objects o and x, respectively, and the offset value offset_f stores a relative offset of an object field f.

Because the value number and offset pairs stored in table entries 1110 and 1120 are identical, the compiler can conclude that the entries 1110 and 1120 correspond to reference-modifying instructions (e.g., instructions 1010 and 1020) modifying the same memory location. Consequently, the entries would result in the compiler generating identical deferred write-barrier code. In accordance with the illustrative embodiment, the compiler may remove one of the redundant entries 1110 or 1120 from the table 1100, thereby resulting in a condensed table 1150. Since the resultant table 1150 contains only two entries 1160 and 1170 corresponding to deferred write barriers, the compiler only emits two deferred write barriers 1040 and 1050, e.g., at the end of the mutator code 1000.

(ii) Combining Deferred Write Barriers that Correspond to Reference Modifications in the Same Object or Card As noted, the compiler may construct and manage a table with which it can generate and emit deferred write-barrier code at a predetermined point in a mutator code. While the compiler may elide identical table entries (as described in FIGS. 10 and 11), the compiler may also remove or combine table entries that may not be identical, but would generate the same write-barrier code. For example, two entries may correspond to reference-modifying mutator instructions that modify reference fields located in the same card. Assuming the garbage collector is configured in a precise card-marking scheme, the two entries provide the collector with the same information and therefore may be combined into a single table entry. Similarly, in an imprecise card-marking scheme, entries corresponding to reference modifications in the same object provide the collector with the same information and thus may be combined into a single entry.

Figure 12:
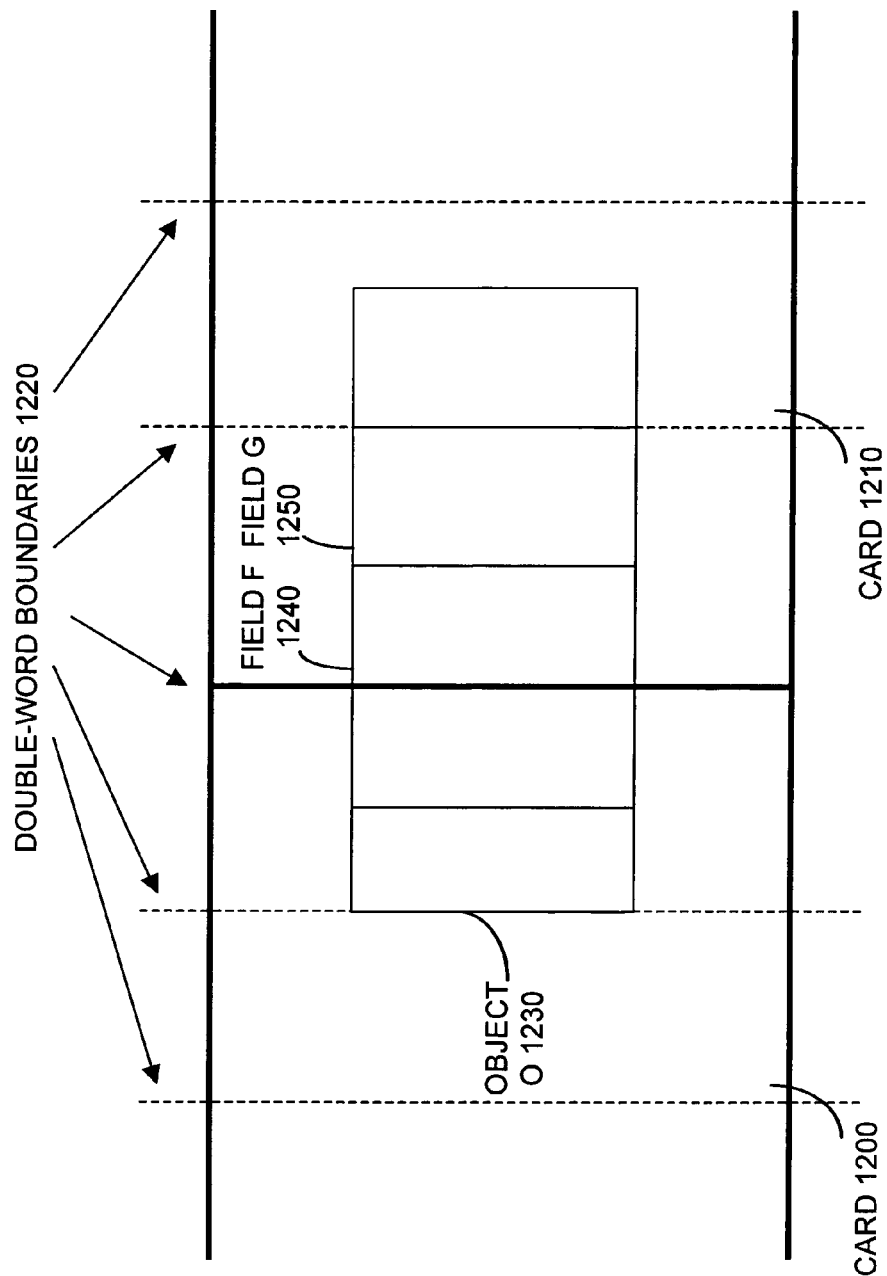
FIG. 12 is a schematic block diagram of an object aligned along double-word boundaries.

In practice, the compiler may determine two or more table entries correspond to reference modifications made in the same card based on a known alignment of objects or arrays within the card. For instance, FIG. 12 illustrates two cards 1200 and 1210 in which objects are aligned along double-word boundaries 1220. An exemplary object o (1230) begins along one of the double-word boundaries in card 1200. The object comprises a plurality of word-sized reference fields, such as adjacent fields f and g (1240 and 1250). Those skilled in the art will understand that the object 1230 is illustrated for exemplary purposes, and the technique of the present invention equally applies to objects and arrays having other known alignments and different object-field sizes than those depicted.

FIG. 13 illustrates pseudo-code of an exemplary method m 1300 comprising instructions 1310 and 1320 for modifying reference values stored in the object o 1230. The reference-modifying instruction 1310 modifies the field f (1240) located at an offset of 2 words from the beginning of the object; the instruction 1320 modifies the field g (1250) located at an offset of 3 words in the object. For the sake of explanation, it is assumed a and b are reference values that may be stored in an object's reference field, and the compiler has emitted mutator instructions that respectively store the reference values in the registers register_a and register_b. Furthermore, assume the compiler assigns the object to a value number equal to valnum_o.

Figure 14:
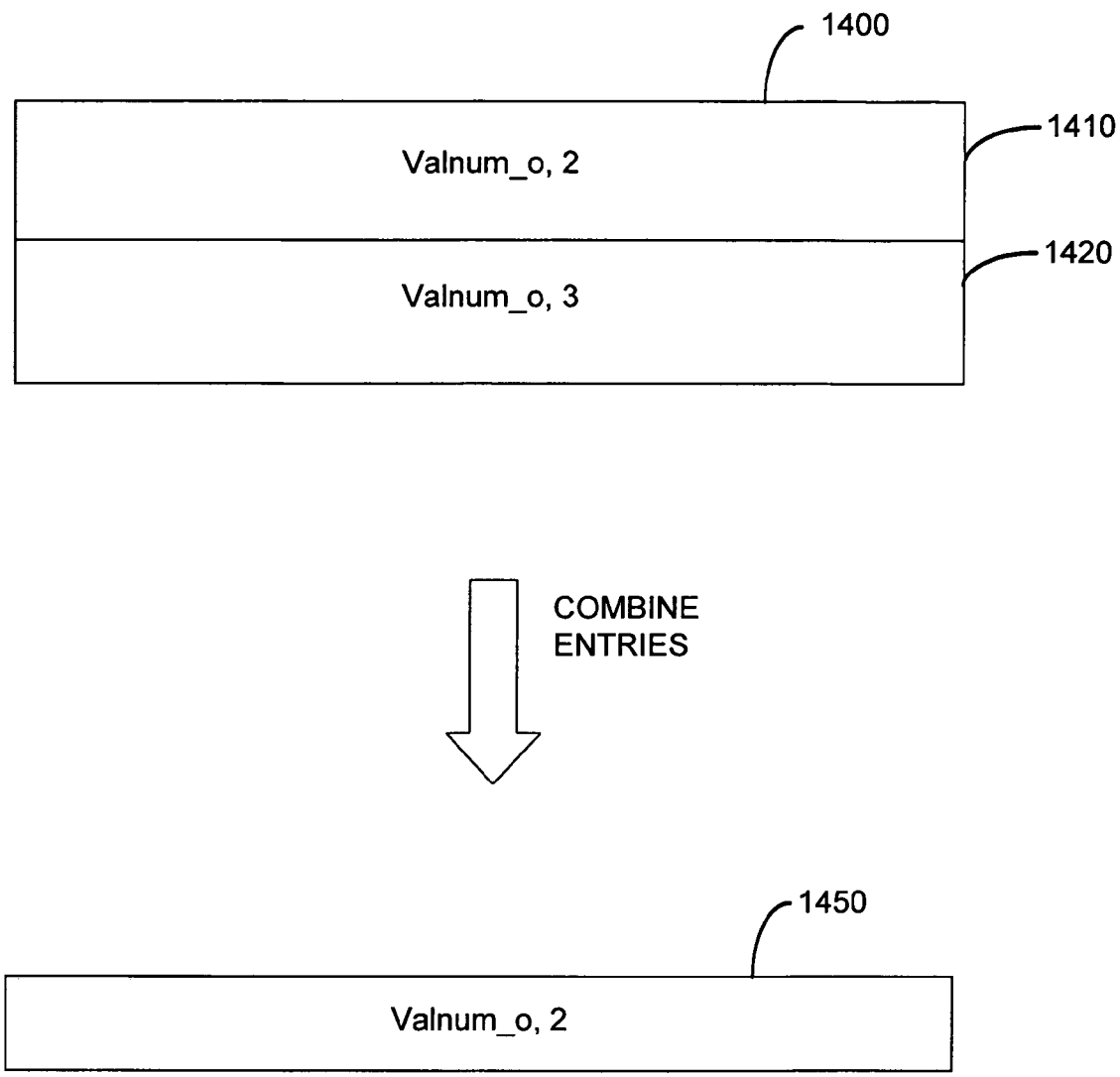
FIG. 14 is a schematic block diagram of a table having entries that may be combined or elided to generate a new, condensed table used to generate the deferred write barriers in FIG. 13.

FIG. 14 depicts a table 1400 having entries 1410 and 1420 respectively corresponding to the instructions 1310 and 1320. Each of the entries stores at least enough information for the compiler to generate and emit a write barrier, e.g., in accordance with a precise card-marking scheme. Specifically, each entry stores a pair of value number and offset values identifying a respective object-reference field in the object 1230 that is modified by instructions in the method 1300 without emission of write-barrier code. For example, the entry 1410 stores the object's value number valnum_o and an offset value equal to 2, e.g., measured in units of words, corresponding to the object-reference field f (1240) modified by the instruction 1310. Entry 1420 similarly stores a pair of values "valnum_o, 3" corresponding to the reference field g (1250) modified by the instruction 1320.

The compiler may combine entries in the table 1400 that generate the same write barrier code. In a precise card-marking scheme, the compiler may determine entries in the table 1400 generate the same write-barrier code if they correspond to reference modifications made in the same card. Assuming the compiler is aware that object 1230 is located in a region of memory where objects are aligned along double-word boundaries, the compiler can determine the entries 1410 and 1420 correspond to reference modifications located in the same double-word and therefore in the same card.

The compiler may therefore create a new, condensed table 1450 that either removes one of the entries 1410 or 1420 or combines them into a single entry. For purposes of discussion, the compiler in this example removes the entry 1420. Based on the contents of the remaining entry in the condensed table 1450, the compiler generates and emits only a single deferred write barrier 1330 at the end of the method 1300, even though write barriers were initially deferred for two reference-modifying instructions 1310 and 1320 in the mutator code.

(iii) Combining Deferred Write Barriers Corresponding to Reference Modifications Made within a Known Range of Memory Addresses When the compiler identifies first and second reference modifications made within a predetermined distance, such as a card-size, from each other, the compiler sometimes may elide deferred write barriers which correspond to other reference modifications made in-between the first and second modifications. For example, in a precise card-marking scheme, two reference modifications made within a card-length from each other must have occurred in the same or adjacent cards. Therefore, if the compiler emits a write barrier for each of these two modifications, write-barrier code corresponding to reference modifications made in-between the two modifications can not provide new information to the garbage collector.

Figure 15:
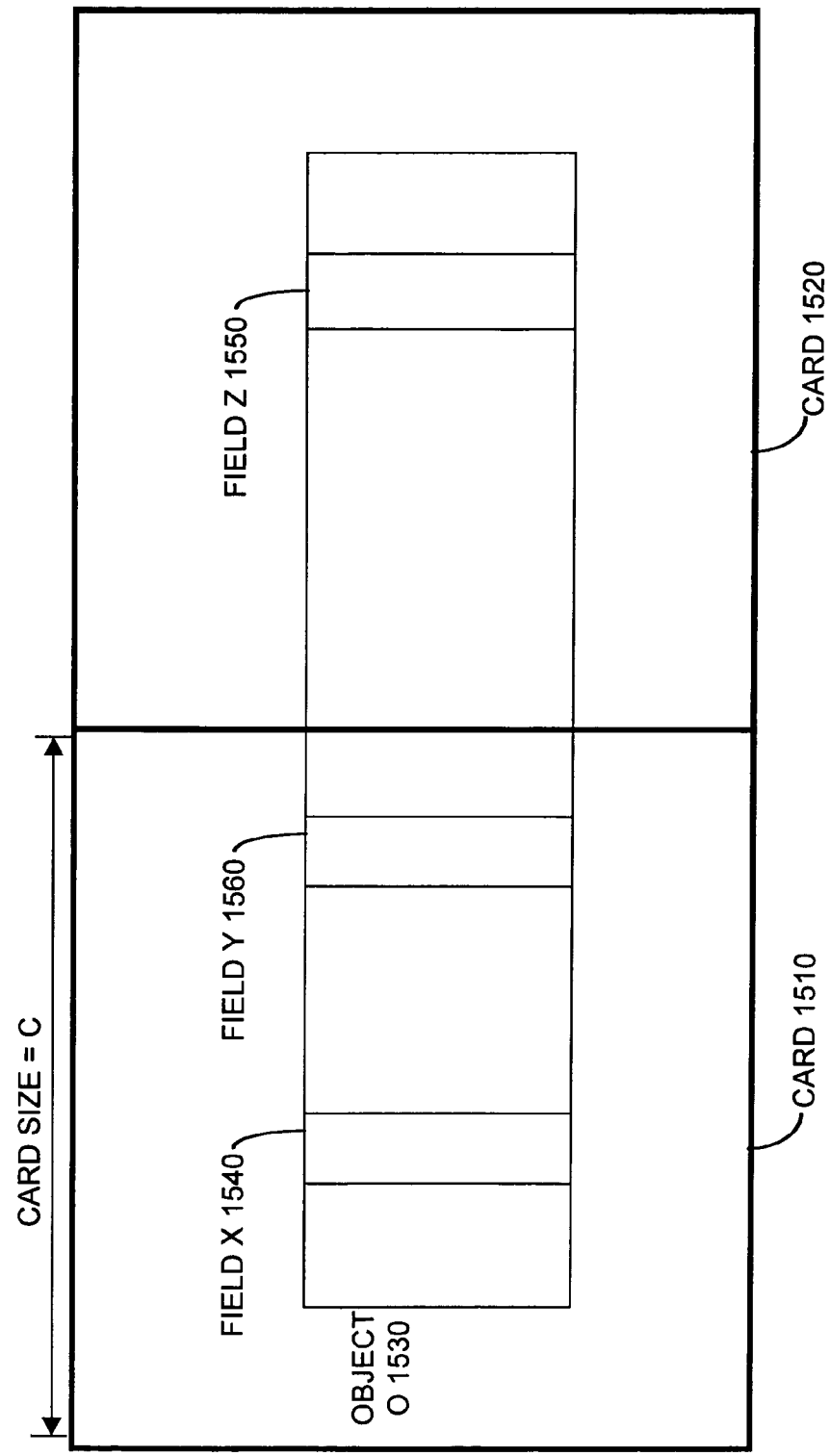
FIG. 15 is a schematic block diagram of an object having a plurality of object reference fields located within a distance of a card-length.

FIG. 15 illustrates two cards 1510 and 1520, each card having a card-size C, which may be measured in units of bytes, words, double-words, etc. An exemplary object o (1530) begins on card 1510 and spans both cards. The object comprises a plurality of reference fields, among which are field x (1540) and field y (1560) located in card 1510, and field z (1550) located in card 1520.

Figure 16:
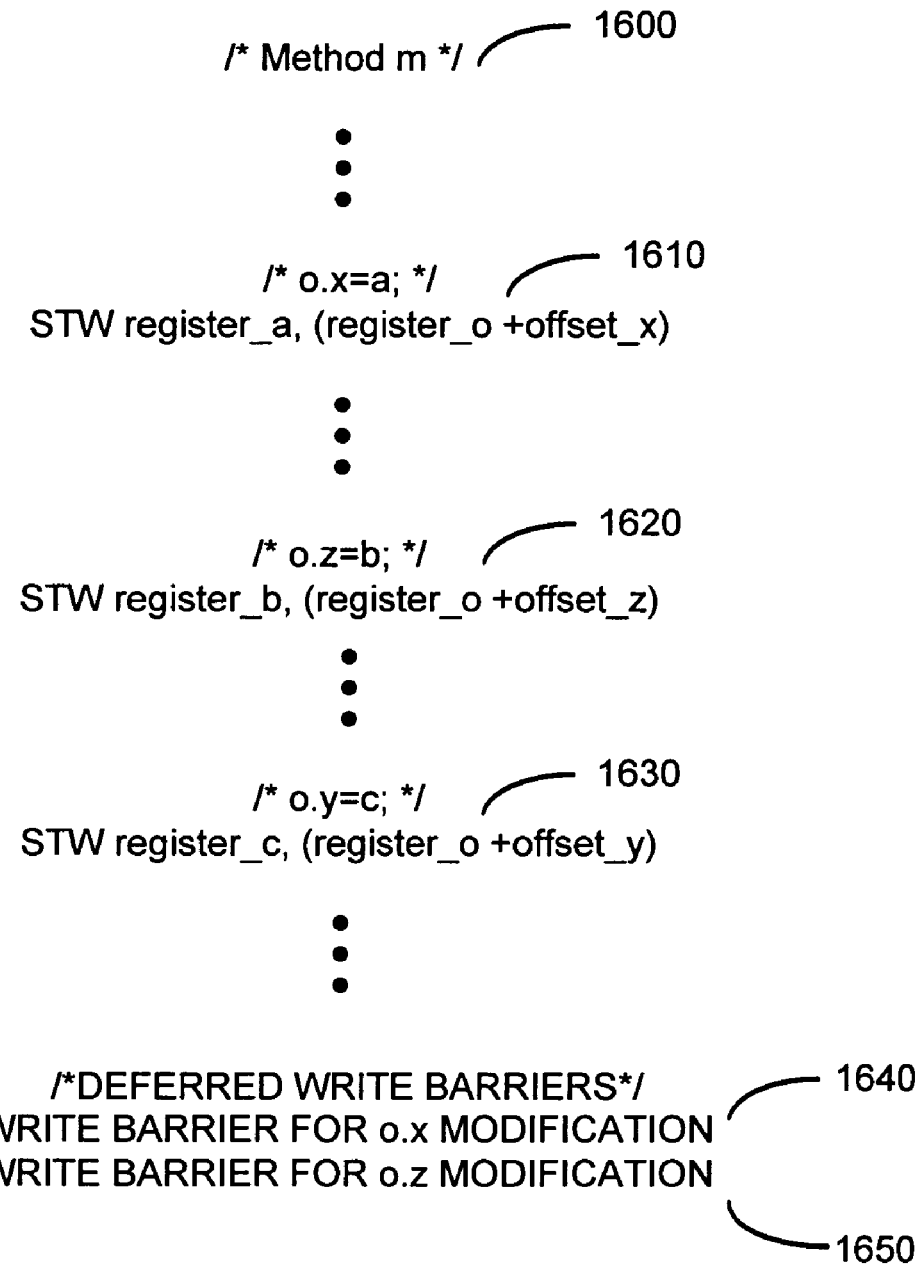
FIG. 16 is an exemplary method that includes deferred write-barrier code, where the method comprises instructions that modify object reference fields located within a known range of memory addresses.
Figure 17:
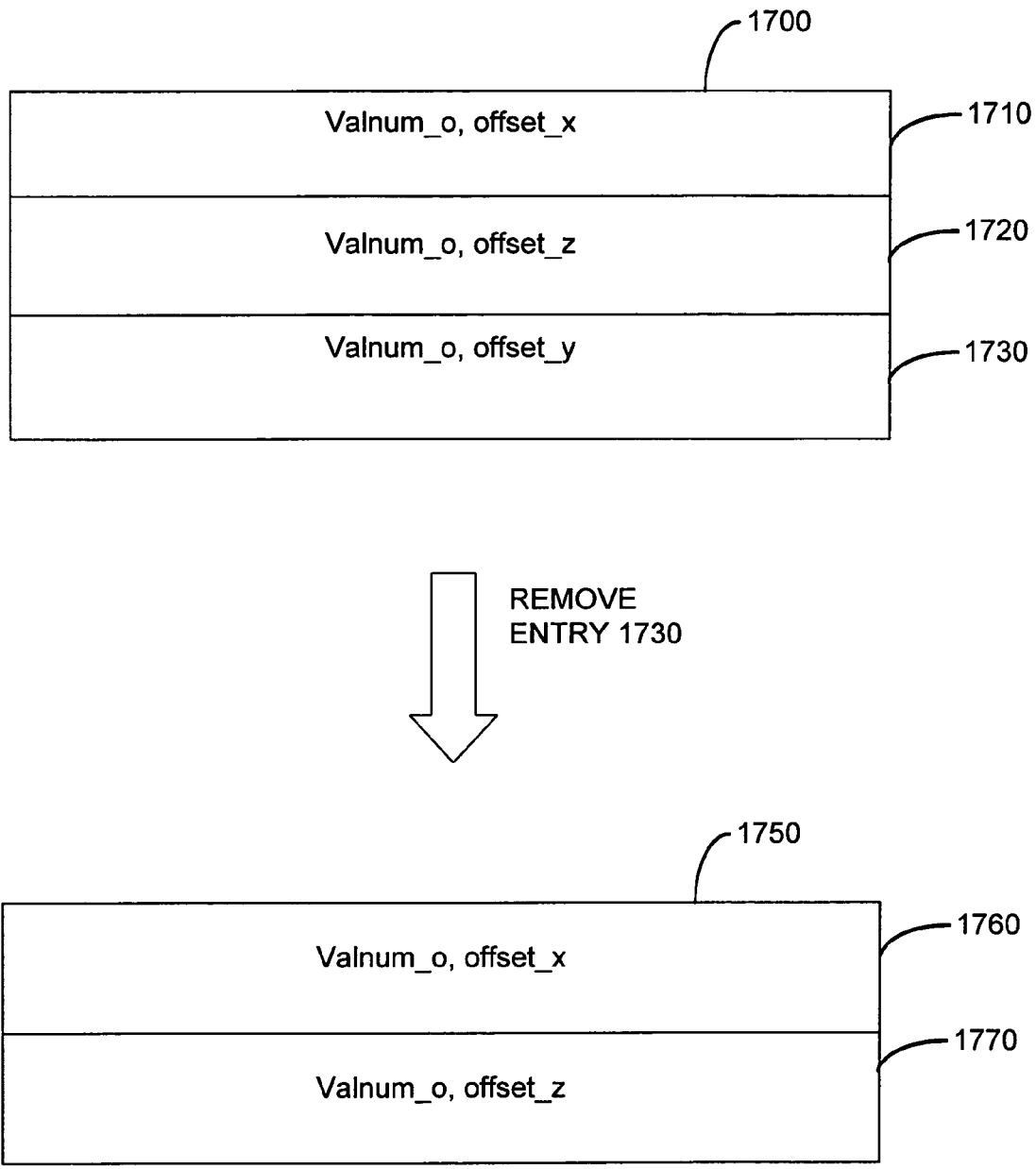
FIG. 17 is a schematic block diagram of a table having entries that may be combined or elided to generate a new, condensed table used to generate the deferred write barriers in FIG. 16.

FIG. 16 illustrates pseudo-code for an exemplary method m 1600 having reference-modifying instructions 1610, 1620 and 1630 that modify object 1530's reference fields x, z and y respectively. Here, it is assumed that the compiler has emitted instructions to store the reference values a, b and c respectively in the registers register_a, register_b and register_c. Further, it is assumed that the compiler has emitted a mutator instruction for storing the memory location of the object 1530 in the register register_o. The compiler may generate a data structure, such as FIG. 17's table 1700, to record information that the compiler may later use to generate deferred write-barrier code in the method 1600. The table 1700 comprises entries 1710, 1720 and 1730 corresponding to the reference-modifying instructions 1610, 1620 and 1630. As shown for a precise card marking implementation, each entry stores the value number valnum_o assigned to the object 1530 and an offset value corresponding to a modified reference field in the object 1530.

For purposes of explanation, assume the compiler determines the distance between field x (1540) and field z (1550) is less than or equal to the card size C, e.g., based on the information stored in table entries 1710 and 1720. The compiler may therefore determine the modification to field y (1560), which is located in-between fields x and z, corresponds to the same write-barrier code as either the modification to field x or the modification to field z, or both. For this reason, the compiler may eliminate the entry 1730 from table 1700, and create a new, condensed table 1750 having entries 1760 and 1770. Entry 1760 comprises the same information as 1710, and entry 1770 comprises the same information as 1720. The compiler relies on entries in the condensed table 1750 to generate the write-barrier code 1640 and 1650. Accordingly, the compiler emits write barriers 1640 and 1650, e.g., at the end of the mutator code, using information stored in the entries 1760 and 1770. In this manner, the redundant write-barrier code corresponding to the reference modification made in field y is not emitted into the compiled mutator code.

Similarly, if the method 1600 included other reference-modifying instructions in addition to those shown, the compiler may elide any other table entries corresponding to reference modifications made in-between the fields x and z. Further, when a plurality of reference modifications are all made within a range of memory addresses spanning a distance less than or equal to a card-length, the compiler may first identify, from the plurality of modified fields, the two fields located farthest apart and write barriers for modifications made in-between these two outer-most fields can be elided, as described above. Those skilled in the art will appreciate that combining deferred write barriers for reference-writes made across several cards also may be handled in a similar fashion as that described above.

C. Combining Deferred Write Barriers in Extended Basic Blocks

Up to this point, the techniques of the present invention have been discussed in regards to combining or eliding deferred write barriers for a sequence of compiled mutator instructions in a basic block. As used herein, a basic block is defined as a linear sequence of instructions terminating with a call or branch instruction, such that no instruction in the basic block other than the first is a target of a branch or call instruction. Thus, a basic block has a single entry point and a single exit point. For example, methods 800, 1000, 1300 and 1600 illustrate exemplary mutator methods implemented as basic blocks. However, the data flow of mutator code is often more complex than a single basic block.

For instance, the mutator may comprise a plurality of basic blocks that are interconnected to form an extended basic block. As used herein, an extended basic block is an arrangement of basic blocks having a single entry point and possibly multiple exit points. An extended basic block therefore may be thought of as a hierarchical arrangement of basic block nodes having no "joins" or "loops" among the nodes. More generally, extended basic blocks are described in more detail in Chapter 7 of the reference book entitled *Advanced Compiler Design and Implementation*, by Steven Muchnick, published 1997, which is hereby incorporated by reference as though fully set forth herein.

Figure 18:
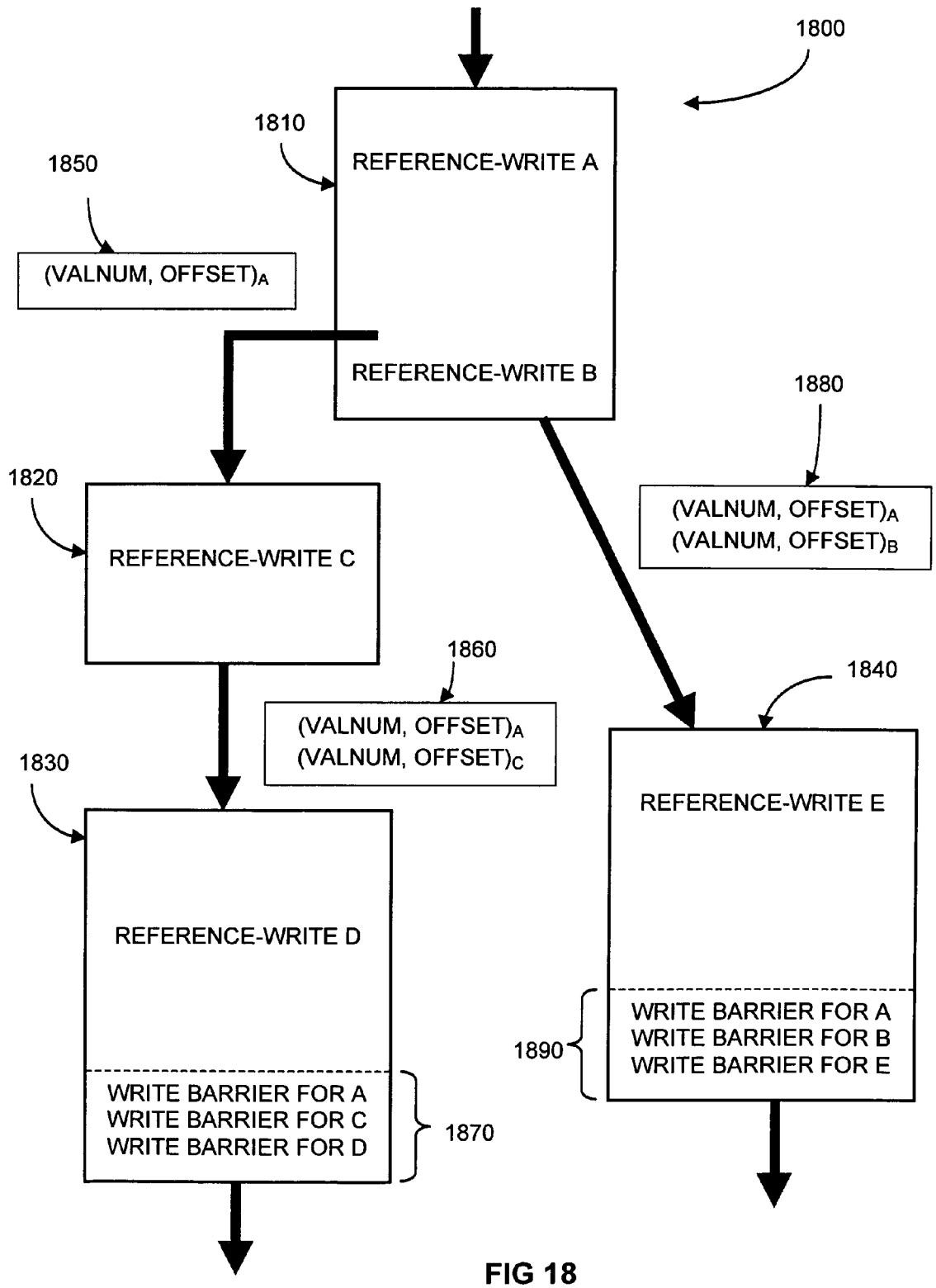
FIG. 18 is a schematic block diagram of an exemplary extended basic block and its associated compiler-generated data structures that may be used by a compiler to generate deferred write barriers.

In accordance with the illustrative embodiment, the compiler may defer emission of write barriers across one or more of the basic blocks in an extended basic block. For instance, FIG. 18 illustrates an extended basic block 1800 which contains a plurality of interconnected basic blocks (e.g., methods) 1810, 1820, 1830 and 1840. Here, the illustrated extended basic block 1800 has a single entry point into the basic block 1810 and two possible exit points out of basic blocks 1830 and 1840. Each of the basic blocks 1810-1840 contains a linear sequence of mutator instructions.

Advantageously, for every basic block in the extended basic block 1800, the compiler may generate a corresponding list indicating where references are modified in the heap by mutator instructions whose write barriers are deferred before the mutator's data flow enters the basic block. For example, when the mutator's data flow exits the basic block 1810 and continues at the start of the basic block 1820, only one write barrier is deferred, e.g., for the reference-modifying instruction A, in this "branch" of the mutator's data flow. Consequently, the compiler may generate a table 1850 containing a single entry that indicates that the instruction 1810's deferred write barrier is "inherited" by the basic block 1820. By way of example, the table 1850 stores a pair of value number and offset values that collectively identify to the compiler where the reference-modifying instruction A modified a reference in the heap. In this example, the compiler can also identify the memory locations of each of the other reference-modifying instructions B-E in the extended basic block 1800 by a corresponding pair of value number and offset values.

Because the basic block 1820 contains one reference-modifying instruction C, the list of deferred write barriers is augmented, as shown by the two entries in the table 1860, and passed to the next basic block 1830 in this branch of the extended basic block's data flow. The compiler may then emit the branch's deferred write barriers 1870, including any write barriers that are deferred in the basic block 1830, at a predetermined point in the extended basic block, such as at the end of the basic block 1830. Further to the illustrative embodiment, the compiler may combine or elide table entries, as previously described in sections B(i)-(iii) of this disclosure, to reduce the number of deferred write barriers emitted at the end of the basic block 1830.

Here, it is noted that write-barrier code deferred in a first basic block may be inherited by a second basic block only for reference modifications made to memory locations that are stored in register and/or stack-frame slots available in both the first and second basic blocks. For example, if the reference-modifying instruction C in basic block 1820 modifies a reference value stored in an object whose memory location is accessible only in the block 1820, then the deferred write barrier for this reference modification may not be inherited by the basic block 1830. Instead, the deferred write barrier for this reference modification may be emitted at a predetermined point in the block 1820, e.g., at the end of the basic block 1820.

In the other branch of the extended basic block, the mutator's data flow passes from the end of the basic block 1810 to the beginning of the basic block 1840. In this branch, the compiler defers emission of write-barrier code for the reference-modifying instructions A and B in the basic block 1810. Thus, the compiler may generate a table 1880 indicating that these write barriers are deferred before the mutator's data flow passes from the basic block 1810 to the basic block 1840. Accordingly, the compiler may emit the deferred write-barrier code 1890, corresponding to reference-modifying instructions in the basic blocks 1810 and 1840, at a predetermined point in the basic block 1840. The compiler may combine and elide table entries to reduce the number of deferred write barriers 1890, as previously described herein. Again, it is noted that write-barrier code for the reference-modifying instructions A and B may only be deferred from the basic block 1810 to the basic block 1840 when their modified reference locations are stored in registers and/or stack-frame slots available in both basic blocks. Accordingly, the compiler may emit deferred write-barrier code for modified reference locations that are only accessible in the basic block 1810 at a predetermined point in the block 1810.

Figure 19:
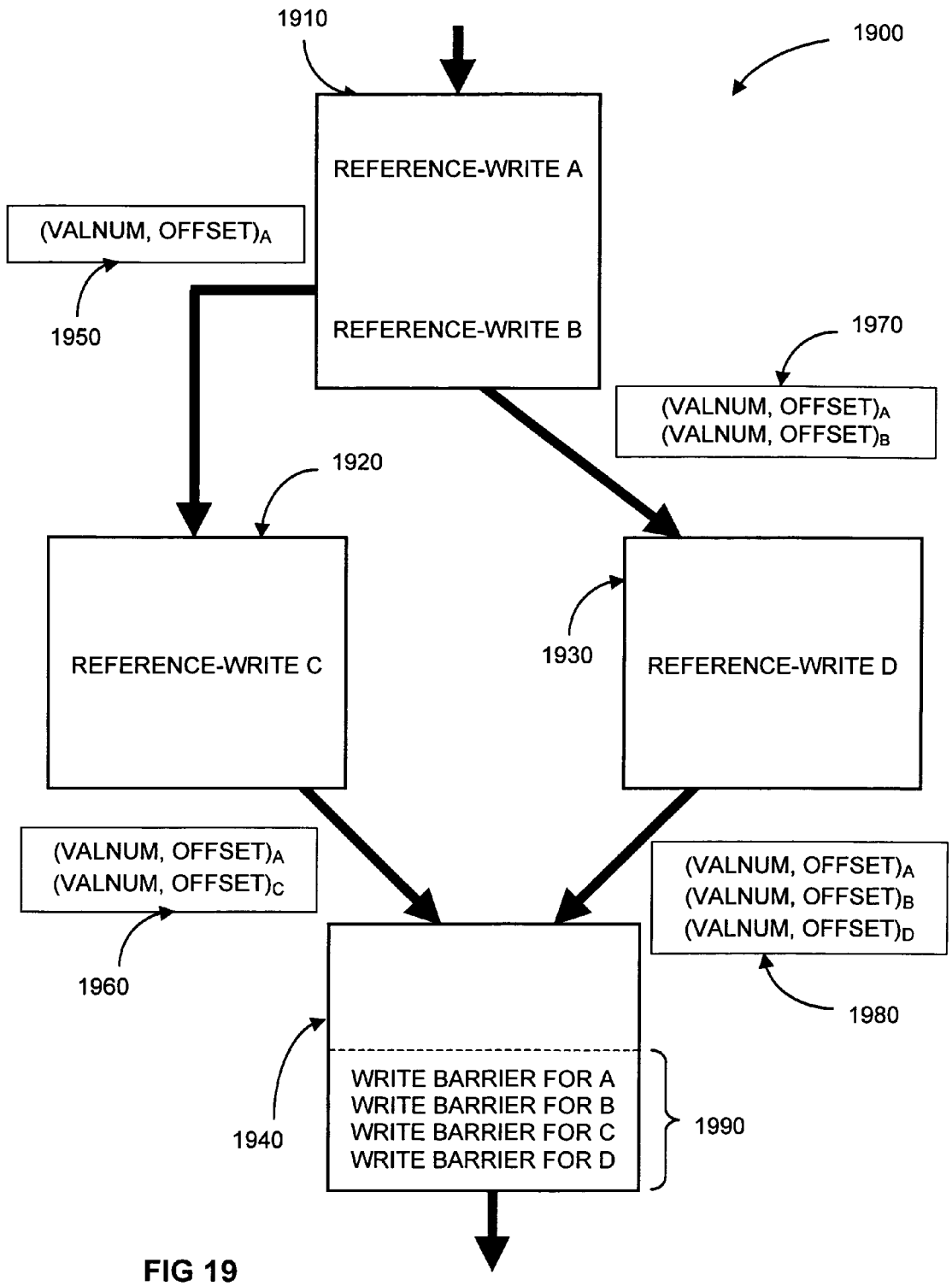
FIG. 19 is a schematic block diagram depicting an exemplary mutator code's control flow through a plurality of basic blocks, one of which is a "join" node, and the mutator's associated data structures that may be used by a compiler to generate deferred write barriers in the mutator.

The compiler may employ a similar technique for deferring write barriers in mutator data flows having one or more "join" nodes. FIG. 19 illustrates a mutator 1900's flow diagram having a plurality of basic blocks 1910, 1920, 1930 and 1940. Although the mutator's execution has a single entry point (at the beginning of 1910) and a single exit point (at the end of 1940), the mutator's data flow can pass through two different "branches" that join at the beginning of basic block 1940. Like FIG. 18's extended basic block 1800, the compiler may generate tables 1950, 1960, 1970 and 1980 to indicate which deferred write barriers are inherited by each of the mutator's basic blocks. For instance, the table 1950 indicates that emission of the write barrier for reference-write A is deferred before the mutator reaches the entry point to basic block 1920. Similarly, the table 1960 augments the previous table to indicate that emission of the write barriers corresponding to reference-writes A and C are deferred before the mutator's data flow enters basic block 1940.

Looking at the other branch in the mutator's data flow, the table 1970 indicates that emission of the write barrier for the reference-writes A and B are deferred before the mutator's data flow reaches the entry point to basic block 1930. The table 1980 indicates the write barriers corresponding to reference-writes A, B and D are deferred before the mutator's data flow enters basic block 1940. Since the compiler has access to more than one list of deferred write barriers at the join node (1940), the compiler may concatenate the lists and combine and elide write barriers, as previously described by the techniques set forth herein in sections B(i)-(iii). The resulting deferred write barriers 1990, e.g., which were not determined to provide redundant or unnecessary information to the collector, are emitted at a predetermined point in the mutator, such as at the end of the basic block 1940. In this example, it is assumed that the reference values modified by the reference-write instructions A-D are stored in registers and/or slots available in the basic block 1940, so the compiler can emit the deferred write-barrier code 1990.

D. Combining Deferred Write Barriers in the Presence of Calls

In accordance with an illustrative embodiment, write-barrier code may be deferred across conventional "call" instructions emitted in the mutator code. As understood in the art, a call instruction in a first extended basic block directs the mutator's data flow to a predetermined instruction, e.g., the first instruction, in a second extended basic block. Typically, the second extended basic block includes a "return" instruction, e.g., its last instruction, that redirects the mutator's data flow to the next logical instruction in the first extended basic block following the call instruction.

When the compiler defers emission of write-barrier code "across" a call instruction, the deferred write barriers may correspond to reference-modifying instructions in the first and second extended basic blocks that were emitted without corresponding write-barrier code and whose modified memory locations are available in both the first and second extended basic blocks. For example, write-barrier actions may be deferred across the call for reference modifications made to objects passed as arguments to the call (i.e., the receiver object, "this"). Similarly, write barriers may be deferred for reference modifications made in any objects returned to the first extended basic block as a result of the call to the second extended basic block. Advantageously, the compiler may combine or elide the write barriers deferred across the call instruction and emit the remaining, uncombined write barriers at a predetermined location in the first extended basic block.

Figure 20:
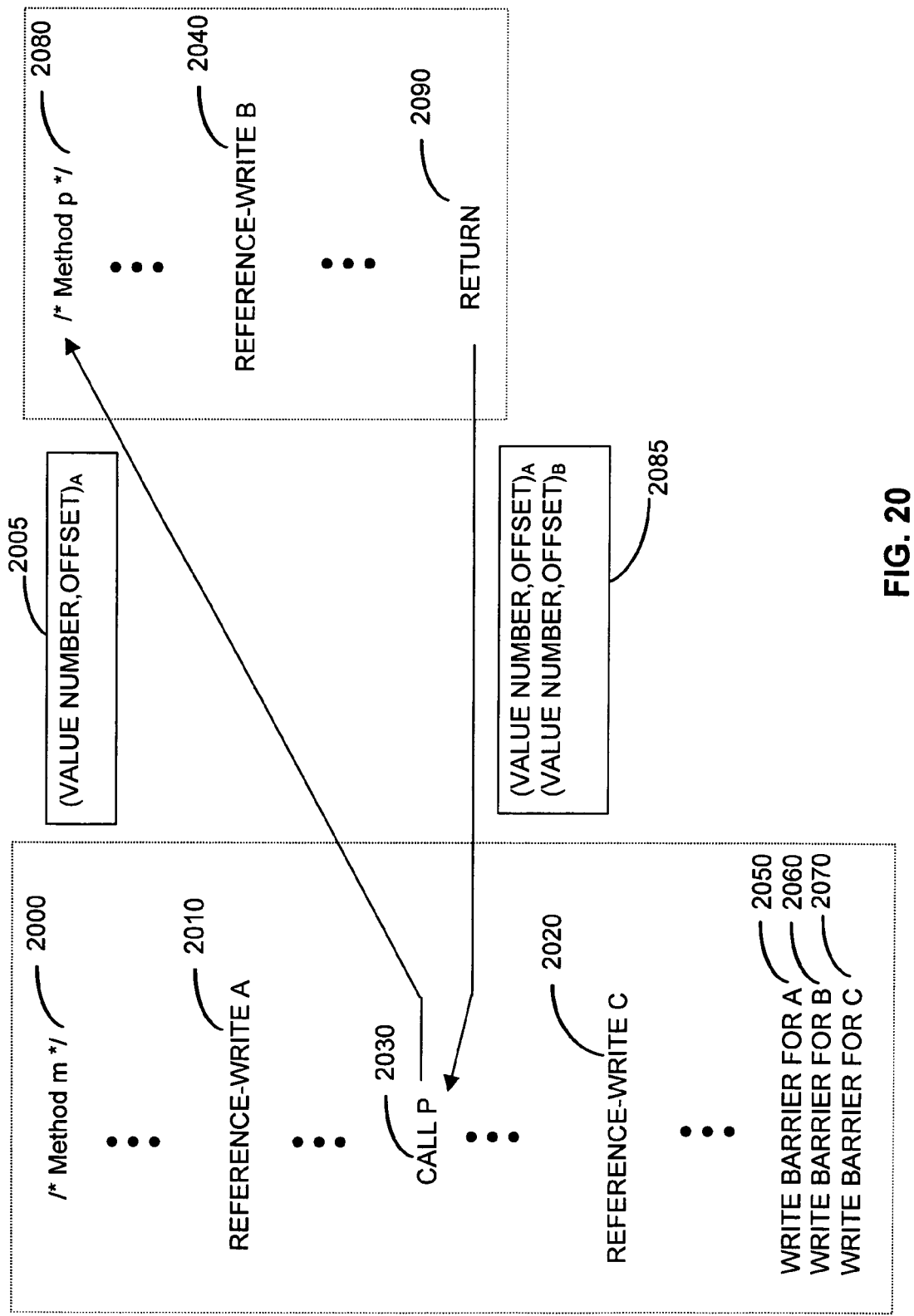
FIG. 20 is an exemplary method whose write barriers are deferred across a call instruction to another method.

FIG. 20 illustrates an exemplary call instruction 2030 in a first method m 2000 that initiates execution of a second method p 2080. For reasons of simplicity, only one call instruction is shown in FIG. 20, although those skilled in the art will appreciate that multiple calls may span more than two methods. The method m includes reference-modifying instructions 2010 and 2020 (labeled A and C) as well as the call instruction 2030 to the method p. The method p includes reference-modifying instruction 2040 (labeled B). The mutator's data flow starts with the first instruction in the method m and progresses until it reaches the instruction 2030, at which point it is directed to the first instruction in the method p. At the last instruction 2090 in method p, the mutator's data flow returns to the next logical instruction following the call instruction 2030 in the method m.

In accordance with the illustrative embodiment, emission of write-barrier code in the method p may be deferred across the call until a predetermined location, e.g., the last instruction, in the method m. To that end, the compiler maintains a table 2005 that records where the mutator instructions modify references in the method m prior to the call instruction 2030 without emission of corresponding write-barrier code. For instance, the table 2005 includes a pair of value number and offset values that correspond to the memory location of a reference that is modified by the instruction 2010 without corresponding write-barrier code. The compiler adds a new entry to the table 2005 for the reference-modifying instruction 2040 that is emitted in the method p without corresponding write-barrier code. Thus, the resultant table 2085 includes entries for the instructions 2010 and 2040 whose write barriers are deferred. Lastly, entries are added to the table 2085 for any instructions, such as the instruction 2020, that are emitted without corresponding write-barrier code and located after the call instruction 2030 but before the deferred write barriers 2050, 2060 and 2070 are emitted in the method m. Advantageously, the compiler can combine or elide entries in the table 2085, as described in section B(i)-(iii), before emitting their corresponding deferred write-barrier code.

E. Emitting Deferred Write Barriers when Registers' Contents are Spilled

In general, compiled mutator code sometimes includes instructions for storing more values, such as memory reference values, than there are available hardware registers to store those values. When this occurs, the compiler may emit instructions to copy ("spill") data out of one or more hardware registers so the registers can be reused to store new values. Accordingly, the compiler may emit instructions into the mutator code to copy the contents of a spilled register into a predetermined memory location, such as a stack-frame slot, associated with the compiled mutator code.

FIG. 21 illustrates an exemplary sequence of compiled mutator code, i.e., method m 2100. In this example, assume four hardware registers are available to the compiler for storing the memory locations of objects instantiated by instructions in the method m. The method comprises instructions 2110, 2120, 2130 and 2140 that instantiate four objects (e.g., objects a, b, c and d) such that the memory location of each object is stored in one of the available hardware registers. The method also includes reference-modifying instructions 2150, 2160 and 2180 that respectively modify a reference field x in the object a (a.x=q;), a reference field x in the object b (b.x=r;) and a reference field y in the object b (b.y=p;). Here, it is assumed the values p, q and r are reference values that may be stored in an object reference field, and the memory locations of the objects a and b are respectively stored in the registers register_a and register_b. Although object-reference fields are modified in this example, those skilled in the art will appreciate that the instructions 2150, 2160 and 2180 may alternatively modify other reference values, e.g., array-reference values, etc.

Figure 22:
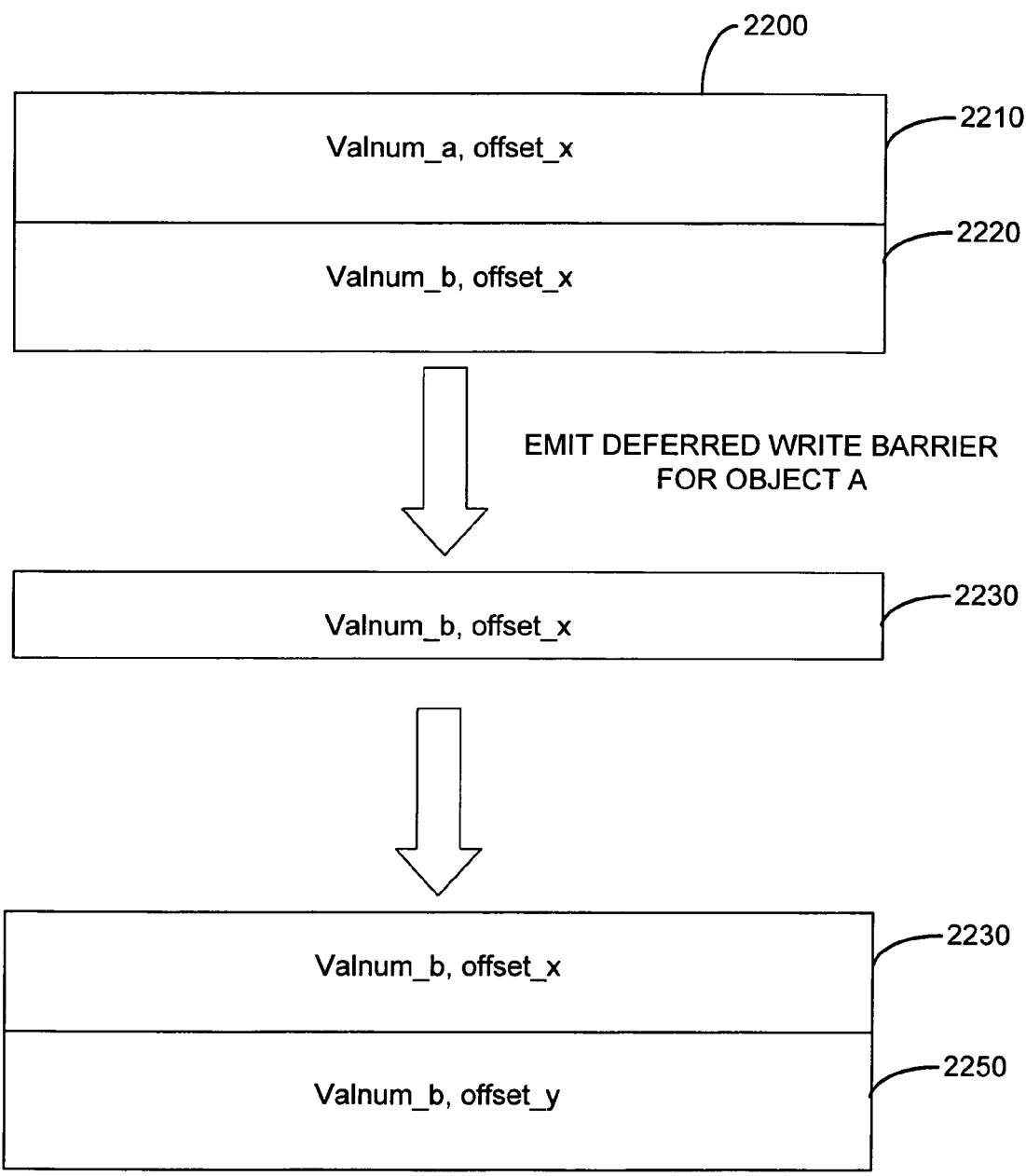
FIG. 22 is a schematic block diagram of a table having entries that may be used to generate the deferred write barriers emitted in the method shown in FIG. 21.

According to embodiments described herein, when write barriers are deferred for reference-modifying instructions in a method, the compiler may create a data structure, such as a table, that stores information enabling the compiler to later generate the deferred write-barrier code. FIG. 22 illustrates a table 2200 in which the compiler records information used to generate deferred write barriers for the method 2100. After the compiler emits the instruction 2160, the table comprises two entries 2210 and 2220 corresponding to the reference-modifying instructions 2150 and 2160. As shown for a precise card-marking scheme, each of the entries stores a value number assigned to an object and an offset of a reference field in the object. Thus, the entry 2210 stores the value number assigned to the object a (i.e., valnum_a) and the offset of the reference field x (i.e., offset_x) modified by the instruction 2150. Likewise, the entry 2220 stores the value number assigned to the object b (i.e., valnum_b) and the offset of the reference field x (i.e., offset_x) modified by the instruction 2160. Those skilled in the art will understand that when different write-barrier schemes are implemented, the information stored in entries of the illustrative table 2200 may include alternate or additional information.

At some point after the compiler emits the instruction 2160, the compiler emits the instructions 2165 and 2170 that instantiate two new objects e and f. When the compiler reaches these instructions, each of the four available registers is already committed to storing one of the memory locations of objects a-d, so the mutator must reuse two of the registers to ensure that there are enough registers available to store the newly instantiated objects' memory locations. To that end, the compiler may emit instructions to copy ("spill") the contents of two hardware registers, e.g., into a stack frame associated with the method 2100, thereby "saving" the contents of the spilt registers and "freeing" the registers so they may be reused to store the memory locations of the objects e and f. Alternatively, if the compiler determines that the contents of one or more of the registers will not subsequently be used by instructions in the method 2100, then the compiler need not spill the registers' contents before emitting the instructions 2165 and 2170. That is, if the registers' contents are not subsequently used, they may be safely overwritten by the instructions 2165 and 2170. However, in this case, before the compiler emits the instructions 2165 and 2170, the compiler emits any deferred write-barrier code associated with the registers whose contents will be overwritten.

Operationally, when the compiler emits an instruction to reuse a hardware register, the compiler may have to adjust the data structure, e.g., table 2200, with which it records where references are modified by mutator instructions without emission of corresponding write-barrier code. The compiler may determine whether the contents of the register is associated with a value number that (i) equals the value number assigned to the contents of another register, (ii) equals the value number assigned to the contents of a stack-frame slot or (iii) can be recomputed from other available value numbers. If any of these conditions is satisfied, the compiler does not modify the table 2200. Further, if the compiler spills the contents of the register, e.g., to a stack-frame slot, then the compiler can associate the value number of the spilled contents with the stack-frame slot instead of the register, and the table 2200 may remain unchanged. However, if the compiler determines that the contents of the reused register will not be subsequently used in the mutator code, the compiler may emit deferred write-barrier code associated with the register's value number, combining and eliding the deferred write-barrier code as appropriate. As a result, the compiler "winnows" (i.e., removes) entries in the table 2200 corresponding to the emitted deferred write-barrier code.

For example, suppose the compiler chooses to reuse the registers register_a and register_b in order to store the memory locations of the objects e and f instantiated by the instructions 2165 and 2170. The compiler may assign new value numbers to the reused registers register_a and register_b, e.g., changing their value numbers from valnum_a and valnum_b to valnum_e and valnum_f, respectively. However, before the instructions 2165 and 2170 are emitted and the new value numbers are assigned to the registers register_a and register_b, the compiler may be configured to determine whether the objects a and b are associated with any deferred write barriers recorded in the table 2200. In this case, the table entries 2210 and 2220 indicate that the objects' respective value numbers valnum_a and valnum_b are each associated with a deferred write barrier.

Because no subsequent mutator instructions modify references in the object a, the compiler may emit the deferred write barriers for the object a, e.g., based on the contents of the entry 2210, before the instructions 2165 and 2170 are emitted into the mutator code. Broadly stated, the compiler may combine and elide entries in the table 2200, where possible, that contain the value number valnum_a, then the compiler emits write-barrier code corresponding to any remaining table entries containing valnum_a. Since the table 2200 comprises only a single entry 2210 storing the value number valnum_a, the compiler generates and emits one deferred write barrier 2175 based on the contents of the entry 2210. Upon emitting the deferred write barrier, the compiler removes the entry from the table and creates a new, condensed table 2230.

In contrast, the compiler determines that another reference modification will be made to the object b, e.g., at instruction 2180, after the instructions 2160 and 2175 are emitted. Therefore, the compiler may be configured to continue deferring write barriers for the object b. To that end, the compiler emits an instruction 2195 in the mutator code to spill the contents of the register_b into a stack-frame slot slot_b associated with the method m 2100. After emitting the instruction to spill the contents of the register register_b into the stack-frame slot slot_b, the compiler then associates the object b's assigned value number valnum_b with slot_b, rather than with register_b. In this manner, the compiler can continue to record object b's deferred write barrier in terms of its value number valnum_b, even though the memory location of the object b has been spilled from the register register_b. To continue deferring write-barrier code associated with the object b, the compiler copies the contents of the table entry 2220 into the condensed table 2230.

After the compiler emits the instruction 2180, a new entry 2250 is added to the condensed table 2230 corresponding to the object-reference field in the object b (i.e., locates at an offset offset_y) whose value is modified by the instruction 2180 without a corresponding write barrier. When the compiler reaches a predetermined point in the mutator code, such as the last instruction in method 2100, the compiler combines and elides the remaining entries 2240 and 2250, if possible. As shown, it is assumed the entries cannot be combined or elided and the compiler emits the deferred write barriers 2185 and 2190 based on these entries.

F. Super Objects

Grouping a plurality of instantiated objects into logical "super objects" may reduce the number of times registers' contents are spilled in a method. As used herein, a super object comprises a plurality of individual objects located adjacent or at known offsets from one another in memory. Since a compiler configured to group objects into super objects may store a single memory address for the plurality of objects, the compiler is less likely to run out of available registers than a compiler that is not configured to use super objects. Thus, super-objects may prevent a compiler from having to emit excessive amounts of "spilling" instructions into the mutator code, thereby enabling the mutator code to execute more efficiently at run time.

G. Emitting Guard-Code Instructions for One or More Deferred Write Barriers

In accordance with an illustrative embodiment, the compiler may record information in a data structure, such as a table, to identify where in the heap references are modified by reference-modifying mutator instructions whose write barriers are deferred. Further, the compiler may examine the information stored in the data structure to prevent itself from emitting write-barrier code corresponding to reference modifications made in areas of memory where the garbage collector does not rely on write barriers, such as in areas that are, e.g., always or never garbage collected.

However, there may be times when the compiler can not determine whether the modified reference will be located in an area of memory where the garbage collector does not rely on write barriers. For example, a reference modification may be made to an object whose location is not known within the scope of a compiled method. When one or more reference modifications are made to an object whose location in memory can not be determined at compile time, the compiler may emit a sequence of one or more instructions for performing one or more "guarding" tests that together determine whether the object is located in a memory region where the collector relies on write barriers. Such a sequence of instructions will be referred to herein as guard instructions. If the object resides in an area of memory where the collector does not rely on write barriers, then the guard instructions prevent the mutator, at run time, from executing write-barrier code corresponding to reference modifications made in the object.

Figure 24:
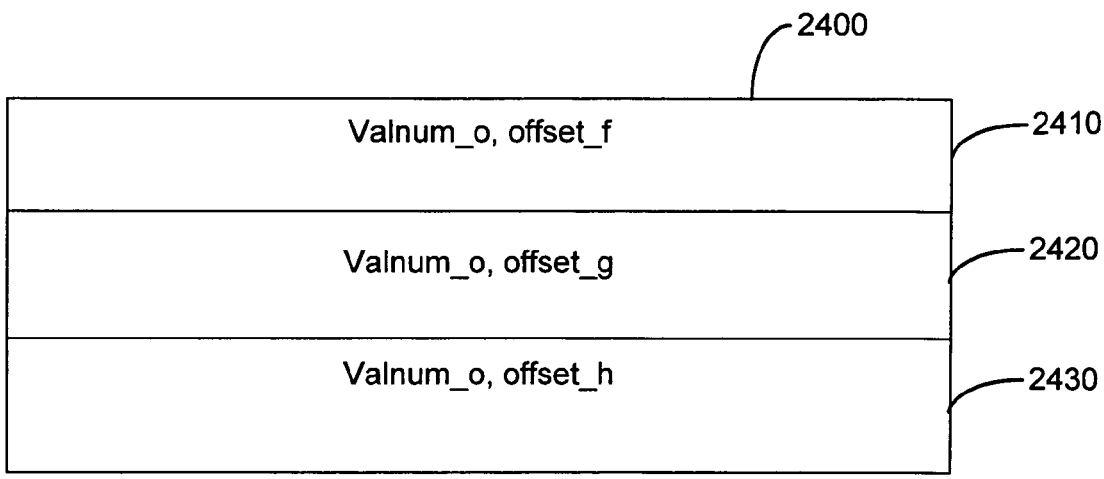
FIG. 24 is a schematic block diagram of a table having entries that may be used to generate the deferred write barriers in FIG. 23.

FIG. 23 illustrates an exemplary method 2300 having reference-modifying instructions 2310, 2320 and 2330, which respectively modify the reference fields f, g and h in an object o. For purposes of explanation, assume the memory location of the object o is stored in the register register_o, and the values a, b and c are reference values. The compiler defers emitting write-barrier code 2350 for the instructions 2310-2330 until it reaches the end of the method. A data structure, such as FIG. 24's table 2400, may be used by the compiler to store information that enables the compiler to generate the deferred write barriers. As shown, the table 2400 comprises entries 2410, 2420 and 2430 that identify a value number valnum_o assigned to the object o. The entries also store the relative offsets of reference fields, within the object o, that are modified by the instructions 2310-2330. The table's entries may be combined or elided using the techniques set forth herein. The remaining, uncombined entries may be used by the compiler to emit the entries' corresponding deferred write barriers, which are preferably emitted sequentially at a predetermined location in the mutator code.

Because each of the entries 2410-2430 corresponds to a reference modification made in the same object, the compiler emits guard instructions 2340 that determine whether the object resides in an area of memory where the garbage collector relies on write barriers. In the example shown, it is assumed that the collector does not rely on write barriers for objects located at a memory address less than the memory-address value stored in register_1. Specifically, the first instruction in the guard code subtracts the memory address of object o from the value stored in register_1 and sets a "condition code" (i.e., a status bit) if the result is negative. If the result of the subtraction does not set the negative condition code, the guard code determines the object o is located in an area of memory where the collector relies on write barriers and therefore directs the mutator's data flow to the deferred write barriers 2350. On the other hand, if the negative condition code is set, the guard code directs the mutator's data flow to the end of the mutator code, thereby by-passing the deferred write barriers 2350. As a consequence, the amount of write barrier overhead executed by the mutator at run time may be reduced.

While the guard code 2340 compares the memory address of the object o to a known value (e.g., stored in register_1) to determine whether the object is located in an area of memory where the collector relies on write barriers, those skilled in the art will appreciate the guard code could implement other tests to discern the same information. For instance, the test could have been based on a flag or field value stored in object o, a header pattern or value stored in object o's near-class, the memory address of object o's near-class, and so forth. The use of guard code is also generally described in commonly assigned application Ser. No. 10/464,371, entitled Specializing Write Barriers for Objects in a Garbage Collector Supporting Copying Collection by Alexander T. Garthwaite et al. which is expressly incorporated herein by reference as though fully set forth herein. Notably, we may further simplify the implementation described in the above-noted patent application since there is no need for nr_maps when the guard code "protects" collocated deferred write barriers.

II. Garbage-Collecting Mutator Code Containing Deferred Write-Barrier Code

A. Combining Deferred Write Barriers During a Garbage Collection Interval

At run time, garbage-collection intervals are usually performed at logical stopping points or safe points in the mutator code, where the compiler has provided stack maps by which the collector can locate references in the heap. Possible safe points are generally chosen by the compiler based on points in the mutator code where stack maps can be easily created, such as at backwards-branching instructions, call instructions, instructions that generate exceptions, instructions that begin loops, etc. As used herein, a stack map is a data structure created by the compiler for recording where reference values are located in the call stack and registers. Therefore, a stack map associated with a possible safe point indicates which registers and stack-frame slots store reference values (i.e., including a root set) at that possible safe point.

While the stack map informs the garbage collector where reference values are located at a possible safe point, the collector relies on other mechanisms, such as write barriers, to identify which of those references values have been modified or may have been modified since the last collection interval. Operationally, the mutator sequentially executes machine-level instructions emitted by the compiler, among which are write-barrier instructions that communicate to the collector where in the heap references have been modified. For instance, the executed write barriers may notify the collector of a reference modification by marking an appropriate card in a card table, adding a memory address to a sequential store buffer, and so forth.

When emission of write-barrier code has been deferred in the compiled mutator code, as described in Section I above, some of the deferred write barriers may not have been executed before the collector interrupted the mutator's execution. In this case, the collector may have to be apprised of where these unrecorded reference modifications occurred prior to the collection interval. In accordance with an illustrative embodiment, the collector can ascertain the same information it would have received had the deferred write barriers been executed by accessing a compiler-generated data structure, such as a table, associated with the possible safe point at which it interrupted the mutator's execution.

Figure 25:
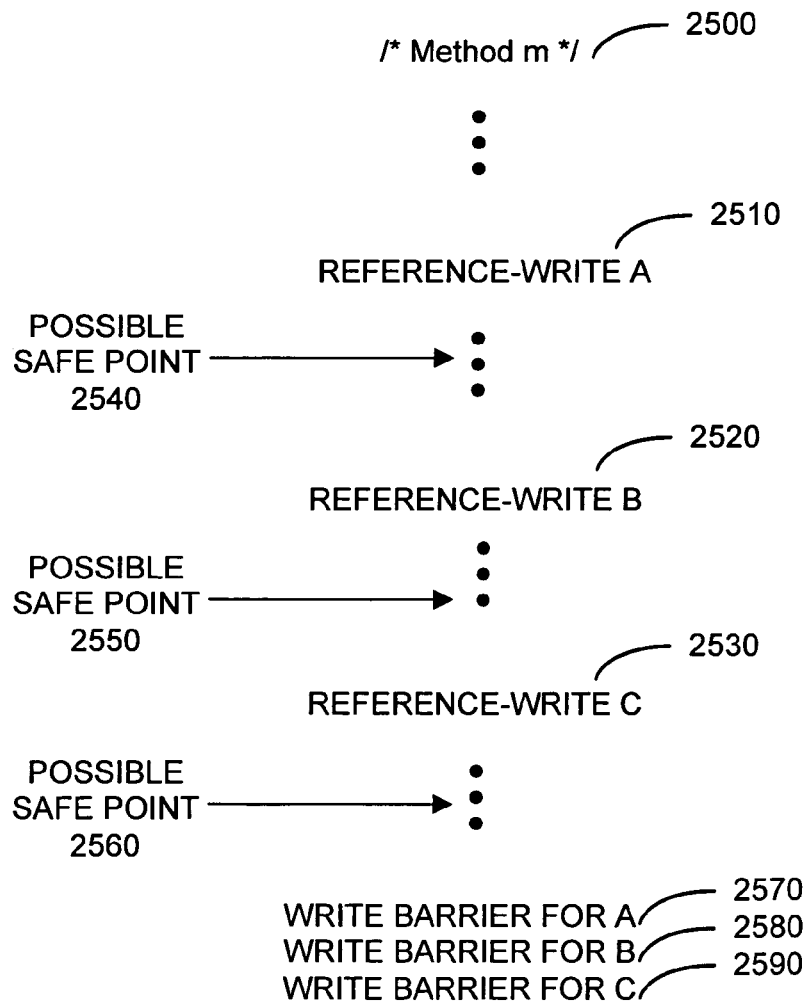
FIG. 25 is an exemplary method that includes deferred write-barrier code, where the method comprises a plurality of possible safe points.

FIG. 25 illustrates exemplary pseudo-code for a mutator method m 2500 having reference-modifying instructions 2510, 2520 and 2540 (labeled A, B and C) and deferred write barriers 2570, 2580 and 2590, e.g., emitted at the end of the method. By way of example, the method 2500 comprises three possible safe points 2540, 2550 and 2560. Each of the possible safe points corresponds to an instruction in the mutator code where a garbage-collection interval may occur.

Figure 26:
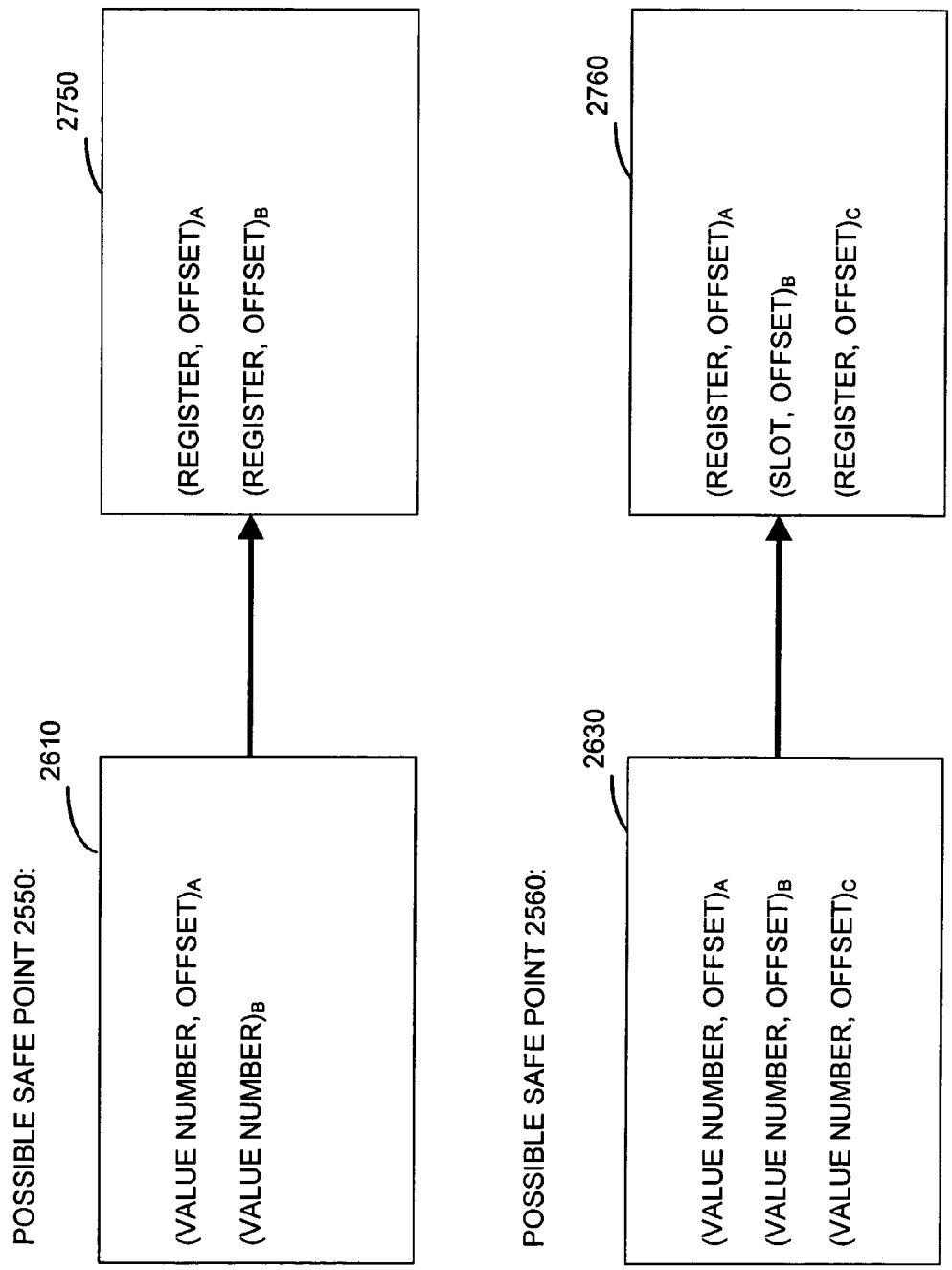
FIG. 26 is a schematic block diagram illustrating exemplary mappings between the "internal" tables the compiler uses to record where references are modified without corresponding write-barrier code and their corresponding run-time tables generated by the compiler at two illustrative possible safe points.

FIG. 26 illustrates the illustrative compiler-generated tables 2750 and 2760 that may be respectively associated with the possible safe points 2550 and 2560. The tables 2750 and 2760 may be derived from one or more of the compiler's "internal" data structures, such as the tables 2610 and 2630. As previously described in Section I, these data structures may contain value-number expressions that identify where references are modified in the heap without corresponding write-barrier code. For example, the compiler's table 2610 includes value number and offset values pairs corresponding to the reference modifying instructions 2510 and 2520 emitted prior to the possible safe point 2550 without corresponding write-barrier code. Similarly, the table 2630 contains entries for the instructions 2510, 2520 and 2530 that are emitted in the mutator prior to the possible safe point 2560 without write-barrier code. Although the tables 2610 and 2630 illustratively identify the reference values modified by the instructions 2510-2530 as pairs of value numbers and offset values, those skilled in the art will understand that these value-number expressions may be represented in other ways consistent with the compiler's configuration.

In general, the compiler dynamically updates its internal tables, e.g., tables 2610 and 2630, as it emits instructions into the compiled mutator code. Therefore, at each possible safe point in the mutator code, the compiler can access an up-to-date list of where references are modified by mutator instructions without corresponding write-barrier code prior to the possible safe point. The compiler may convert the contents of these lists into a format that may be made accessible to the garbage collector at run time. Accordingly, the collector can use these compiler-generated tables to locate modified references whose write barriers were deferred prior to its collection interval. Because the collector is not aware of the compiler's internal value-number expressions, the compiler converts its value-number expressions to run-time memory locations that are "understandable" to the collector.

For example, the compiler generates the table 2750 associated with the possible safe point 2550 by converting pairs of value numbers and offset values in the compiler's internal table 2610 to equivalent run-time information, e.g., pairs of register and offset values. The compiler similarly generates the table 2760 associated with the possible safe point 2560 by converting value number and offset value pairs in the table 2630 to equivalent run-time memory locations. As shown in the tables 2610 and 2630, the compiler's value number and offset values corresponding to the instructions 2510 and 2520 are the same at the possible safe points 2550 and 2560. In contrast, the instructions' run-time representations in the tables 2610 and 2630 may be different at the possible safe points 2550 and 2560. For instance, the run-time location of the reference value modified is by the instruction (B) 2520 changes from a register at possible safe point 2550 to a stack-frame slot at possible safe point 2560. The collector can therefore locate the reference value modified by the instruction (B) 2520 at different run-time locations, depending at which of the possible safe points 2550 and 2560 the collector performs its collection interval.

Figure 27:
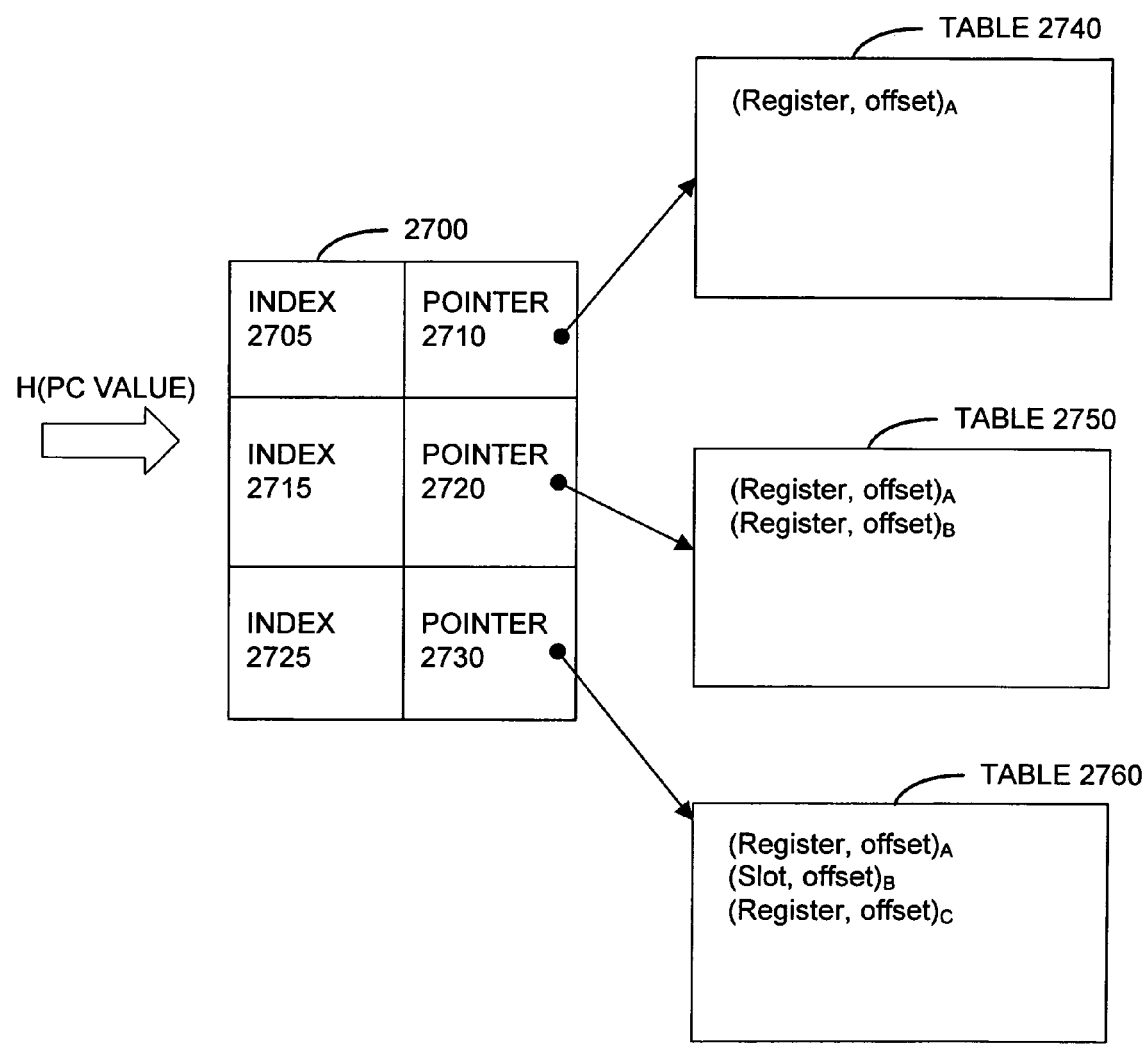
FIG. 27 is a schematic block diagram of a pointer table and its set of associated tables storing information that may be used by a compiler to generate the deferred write barriers in FIG. 25.

FIG. 27 illustrates a set of compiler-generated tables 2740, 2750 and 2760 that are respectively associated with the possible safe points 2540, 2550 and 2560. Each table contains a list of one or more entries that store run-time information enabling the garbage collector to locate where mutator instructions modified references in the heap without execution of corresponding write-barrier code before the mutator's execution reached the table's associated possible safe point. For example, table 2740 stores information that indicates the instruction A is the only reference-modifying mutator instruction executed in the method 2500 without a corresponding write barrier before the mutator's execution reaches the possible safe point 2540. Table 2750 indicates that both instructions A and B are executed without corresponding write barriers before the mutator reaches the possible safe point 2550. Likewise, table 2760 indicates instructions A, B and C are executed without corresponding write barriers before the mutator reaches the possible safe point 2560.

When the garbage collector performs a collection interval at one of the possible safe points, a pointer table 2700 generated by the compiler may be used by the collector to access an appropriate one of the tables 2740-2760. The table 2700 may be stored, e.g., in the meta-data data structure associated with the method 2500. The pointer table comprises an indexed set of pointers, each of which stores the memory location of one of the tables 2740-2760. As shown, the pointer 2710 references the table 2740, the pointer 2720 references the table 2750 and the pointer 2730 references the table 2760. The collector locates a pointer in the table 2700 through one of the indexes 2705, 2715 and 2725. In the illustrative embodiment, each index is related to a program counter (pc) value of a possible safe point in the mutator code. For instance, the table 2700 may be organized as a hash table where each index corresponds to the pc value of a possible safe point. More specifically, as shown in FIG. 27, the result of applying a hash function H to the pc value of a possible safe point (e.g., H(pc value)) may be used as an index into the table 2700.

Illustratively, the collector (i) suspends the mutator's execution at one of the mutator's possible safe points, (ii) hashes the safe point's corresponding pc value to generate an index into the table 2700, (iii) locates a pointer at the indexed entry in the table 2700 and (iv) accesses a table referenced by the pointer, the table containing a list of reference modifications whose write barriers were not executed prior to the possible safe point. In accordance with an illustrative embodiment, the collector may combine or elide entries in the located table using the techniques described in sections B(i)-(iii) herein. Then, the collector performs its garbage-collection operations based on the remaining, uncombined table entries and the results of write barriers previously executed in the mutator code.

The same tables, e.g., tables 2740-2760, that enable the collector to locate where references modifications occur without write barriers at possible safe points may also be employed to apprise the collector of deferred write barriers when an "exception" is handled by the mutator code. An exception is typically the result of a program error, such as a divide-by-zero instruction, or may be an error-producing instruction explicitly inserted in the mutator code, e.g., for debugging purposes. To handle an exception, the thread executing the mutator "unwinds" its call stack into a context in which it can handle that exception. However, this unwinding process needs to include the effects of performing any deferred write-barrier code, or these deferred actions will be lost. Therefore, when handling such an exception, the deferred write-barrier operations may be performed based on the contents of the compiler-generated tables used by the collector at the possible safe points. Furthermore, entries in these tables may be combined or elided during the exception-handling procedure, as previously described herein.

Here, it is noted that the compiler may "winnow" the contents of its internal tables, such as the tables 2610 and 2630, by occasionally emitting some (or all) of the deferred write-barrier code into the mutator code. As a result, the number of write barriers deferred in the mutator code is decreased, and thus the amount of memory resources required to store the run-time tables, such as the tables 2740-2760, may be reduced. A further advantage of periodically emitting the deferred write barriers may be that the collector does not as often have to perform the same deferred write-barrier actions at consecutive collection intervals. Of course, the compiler weighs the possible benefits of occasionally winnowing its internal tables and emitting deferred write-barrier code with the run-time advantages that may be realized by deferring the write barriers for longer periods of time. That is, by deferring emission of write-barrier code over longer durations, the compiler is more likely to be able to combine or elide the deferred write-barrier code, as set forth in the illustrative embodiments herein, thereby reducing the amount of redundant or unnecessary write-barrier code in the compiled mutator code.

Figure 28:
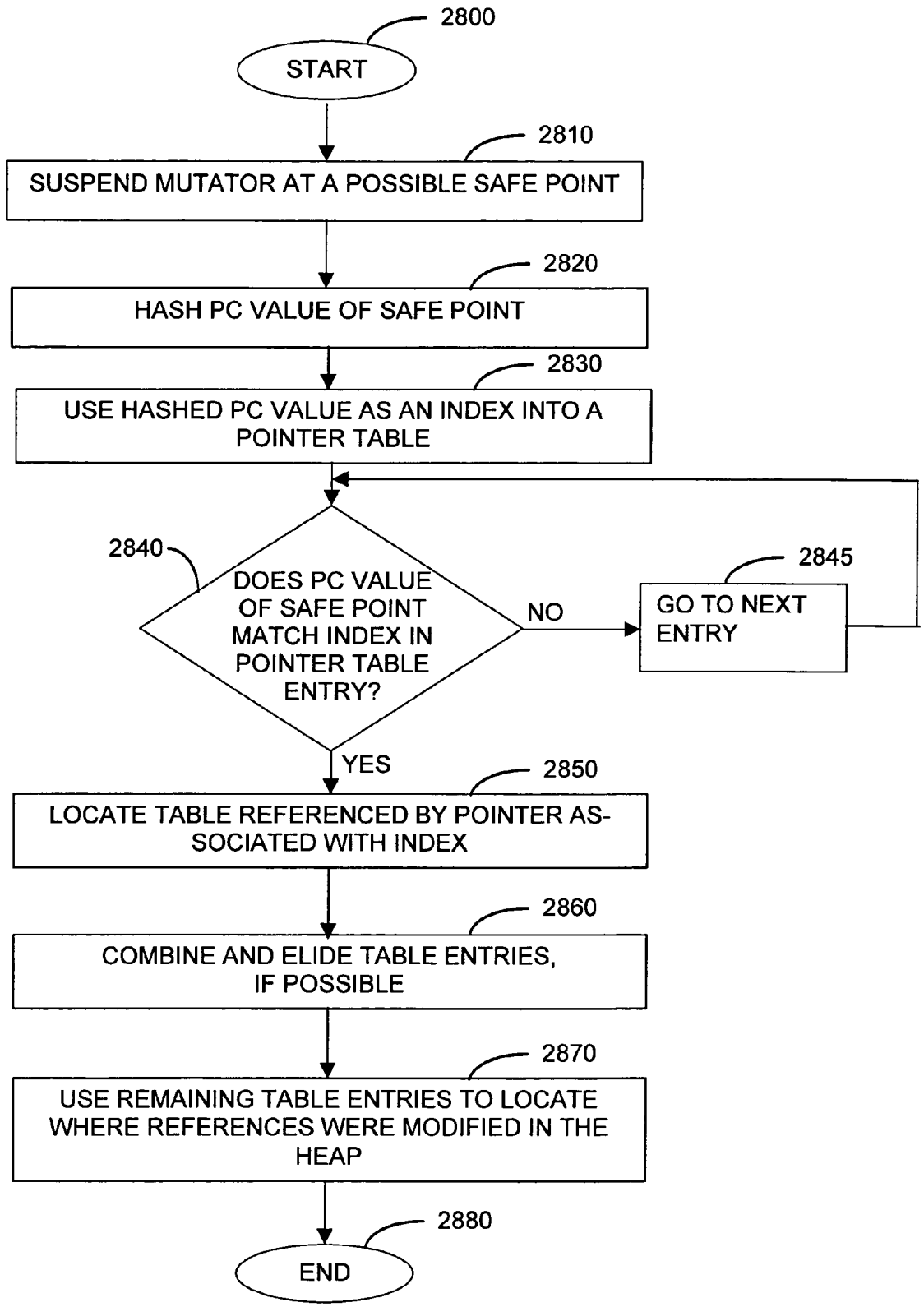
FIG. 28 is a flowchart illustrating a sequence of steps a garbage collector may perform to locate where references were modified by a mutator without execution of corresponding write-barrier code.

FIG. 28 illustrates an exemplary sequence of steps a garbage collector may perform during a collection interval to locate where references were modified by a mutator without execution of corresponding write-barrier code. The sequence starts at step 2800 and proceeds to step 2810 where the collector suspends the mutator's execution at a possible safe point. At step 2820, the collector applies a hash function to the pc value corresponding to the safe point at which it suspended the mutator. Next, at step 2830, the generated hash value is used as an index into a pointer table associated with the mutator code.

At step 2840, if the pc value does not match the entry in the pointer table, the collector goes to the next entry in the table, at step 2845, then returns to step 2830 so the pc value may be compared to next pointer-table entry. When a "matching" entry is located in the pointer table, at step 2850, the collector uses the value of the pointer-table entry's storing pointer to locate a compiler-generated table comprising information indicating where reference-modifying mutator instructions having deferred write barriers modified references before the collector interrupted execution of the mutator.

Having located an appropriate table, at step 2860, the compiler may further combine or remove entries in the accessed table so as to reduce the number of references it must trace into the heap. That is, the collector may use any of the techniques described herein to combine or remove table entries associated with reference-modifying mutator instructions that would generate the same write-barrier code. For example, two table entries may be identical, and therefore the collector may elide one of the repetitive entries (e.g., see FIGS. 10-11). The collector may also combine entries associated with reference modifications made in the same region of memory, e.g., based on a known alignment of objects (e.g., see FIGS. 12-14). Further, the collector may elide entries that are within a known range of memory addresses (e.g., see FIGS. 15-17).

Once the collector has combined and elided table entries, at step 2870, the collector performs its collection interval at the safe point by locating references in the heap based on the contents of the remaining, uncombined table entries in combination with the results of any write-barrier code that was executed in the mutator. The sequence ends at step 2880.

B. Garbage Collecting Deferred Write Barriers in the Presence of Calls

As shown in FIG. 25, a garbage collector may perform a collection interval at any of a plurality of possible safe points in a mutator method m 2500. However, mutator code often includes more than one method. For example, the mutator code may include a conventional "call" instruction that suspends execution in a first method and directs the mutator execution to an instruction in a second method.

Figure 29:
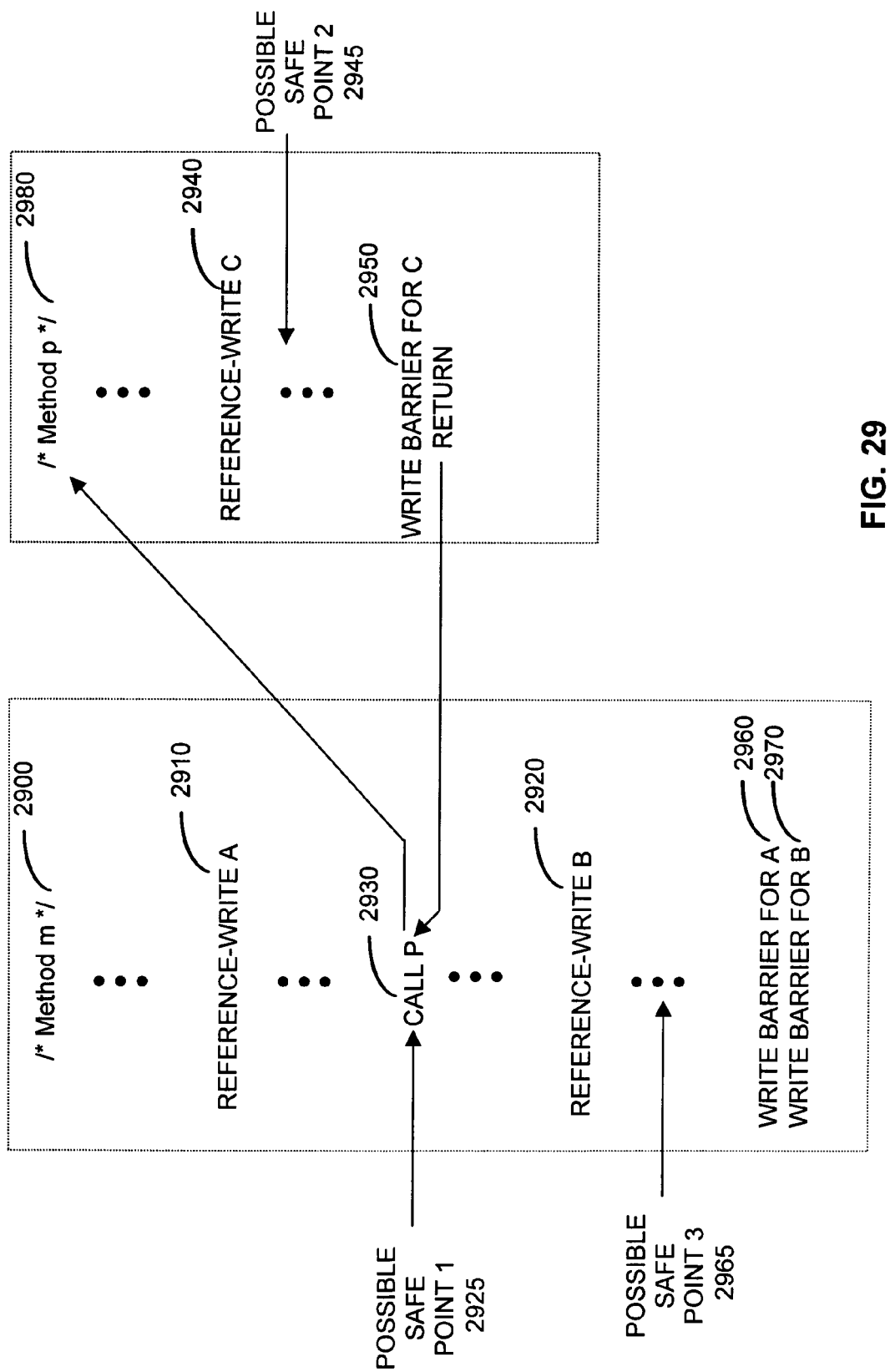
FIG. 29 is an exemplary extended basic block having a plurality of possible safe points, where write-barrier code in the extended basic block is deferred across a call instruction.

FIG. 29 illustrates an exemplary call instruction 2930 in a first method m 2900 that initiates execution of a second method p 2980. For reasons of simplicity, only one call instruction is shown in FIG. 29, although those skilled in the art will appreciate that multiple calls may span more than two methods. The method m includes reference-modifying instructions 2910 and 2920 (labeled A and B) as well as the call instruction 2930 to the method p. The method p includes reference-modifying instruction 2940 (labeled C). The mutator starts its execution at the beginning of method m and sequentially progresses until it reaches the instruction 2930, at which point it suspends execution of the method m and begins executing code in the method p. Upon executing the last instruction in method p, the mutator may return and resume execution in the method m.

In the illustrated call from method m to method p, there are three possible safe points 2925, 2945 and 2965 where the garbage collector may interrupt the mutator to perform a collection interval. The first possible safe point 2925 is located in the method m at the call instruction 2930, the second possible safe point 2945 is located in the method p, and the third possible safe point 2965 is located after the mutator resumes execution in the method m. In this example, when a garbage-collection interval takes place at any of these possible safe points, execution of at least one write barrier has been deferred. Therefore, during the collection interval, the collector may be configured to access one or more data structures that enable it to locate reference modifications whose corresponding write barriers have not yet been executed.

Figure 30:
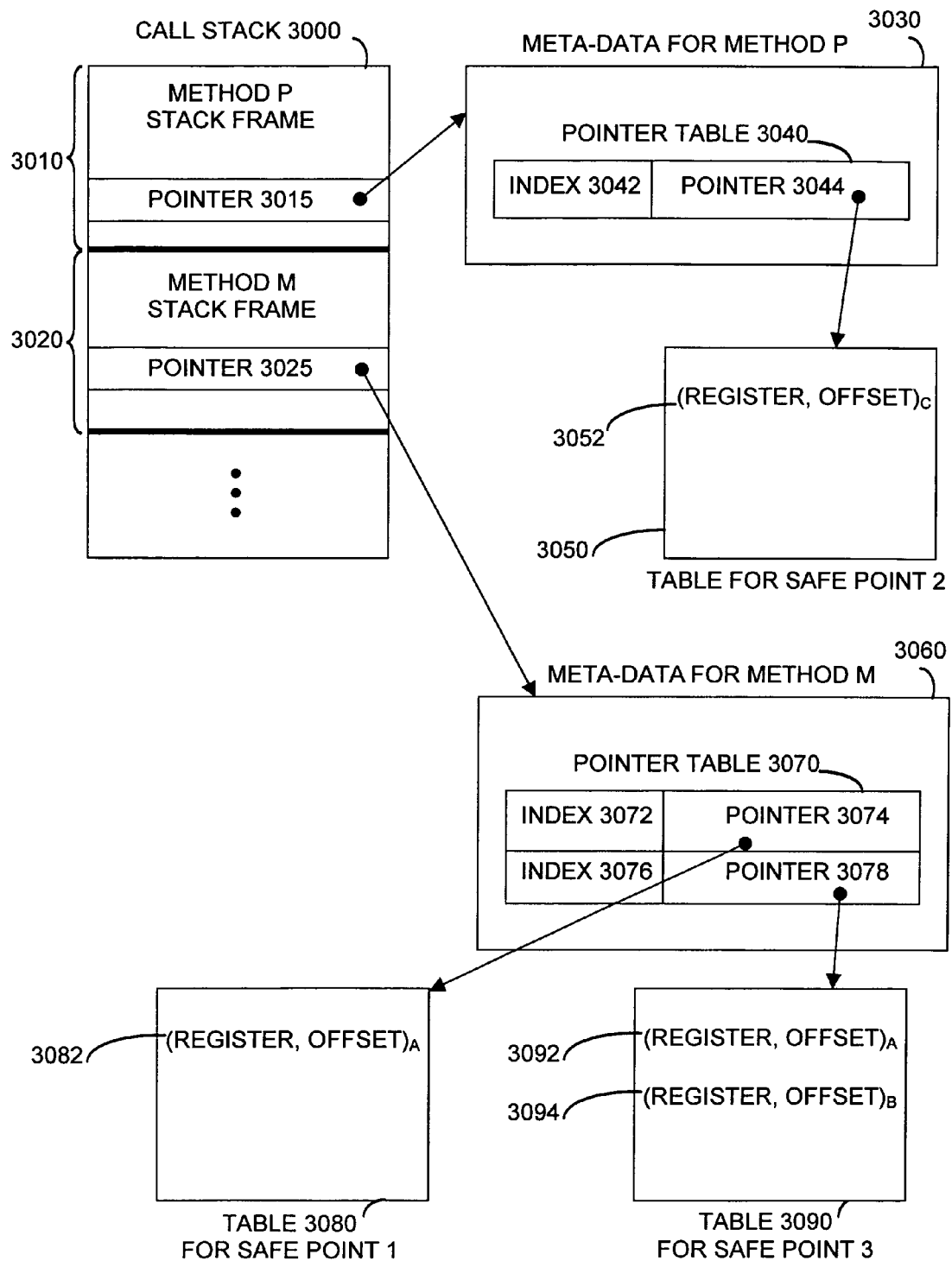
FIG. 30 is a schematic block diagram of an exemplary call stack a garbage collector may use to locate where references were modified in an extended basic block without execution of corresponding write-barrier code.

FIG. 30 illustrates an exemplary call stack 3000 comprising stack frames 3010 and 3020 corresponding to FIG. 29's methods p and m. The garbage collector may be configured to locate pointers, e.g., located at known offsets in the call-stack frames, that store the memory locations of one or more meta-data data structures associated with the stack frames' corresponding methods. Each meta-data data structure stores, inter alia, a pointer table through which the collector may identify one or more tables (or other data structures) that indicate where the meta-data data structure's associated method executed reference-modifying instructions having deferred write-barrier code.

For example, a pointer 3025, located in a predetermined position in the stack frame 3020, stores the memory address of a meta-data data structure 3060 associated with FIG. 29's method m. The data structure 3060 includes a pointer table 3070 comprising an indexed set of pointers, each corresponding to a possible safe point in the method. Thus, the table 3070 comprises two pointers 3074 and 3078 respectively corresponding to the possible safe points 2925 and 2965 in the method m. The pointers 3074 and 3078 are locatable via their corresponding indexes 3072 and 3076, which may be derived, e.g., from the pc values of the pointers' corresponding possible safe points. For instance, the pointer table may be organized as a hash table where the pc value of a possible safe point in the method m is used as the key value for indexing the hash table.

The pointers 3074 and 3078 store the locations of the tables 3080 and 3090, respectively. The table 3080 comprises an entry 3082 corresponding to the reference-modifying instruction 2910, which is executed without a corresponding write barrier before the mutator reaches the safe point 2925. As shown with regards to a precise card-marking scheme, the entry 3082 stores information that identifies a register storing the memory address of an object and an offset of a reference field within the object that was modified by the mutator instruction 2910 (reference-write A). Those skilled in the art will understand the entry may store alternate or additional information, depending on the garbage collector implementation. The table 3090 comprises entries 3092 and 3094 corresponding to the reference-modifying instructions 2910 and 2920 (reference-writes A and B) whose corresponding write barriers are not executed before the mutator reaches the possible safe point 2965. Advantageously, the collector can reduce the number of references it traces into the heap during a collection interval by combining or removing the entries in the tables 3080 and 3090 using the techniques previously described herein.

Further to the exemplary call stack 3000, stack frame 3010 comprises a pointer 3015 that references a meta-data data structure 3030 associated with FIG. 29's method p. The meta-data data structure 3030 includes, inter alia, a pointer table 3040 comprising a pointer 3044 and its associated index 3042. The pointer 3044 corresponds to the one possible safe point 2945 in the method p, and stores the memory location of a table 3050 associated with the safe point. An entry 3052 in the table 3050 identifies a register and offset pair indicating where the mutator instruction 2940 (reference-write C) modifies a reference without a corresponding write barrier before the mutator reaches the possible safe point 2945.

Figure 31A:
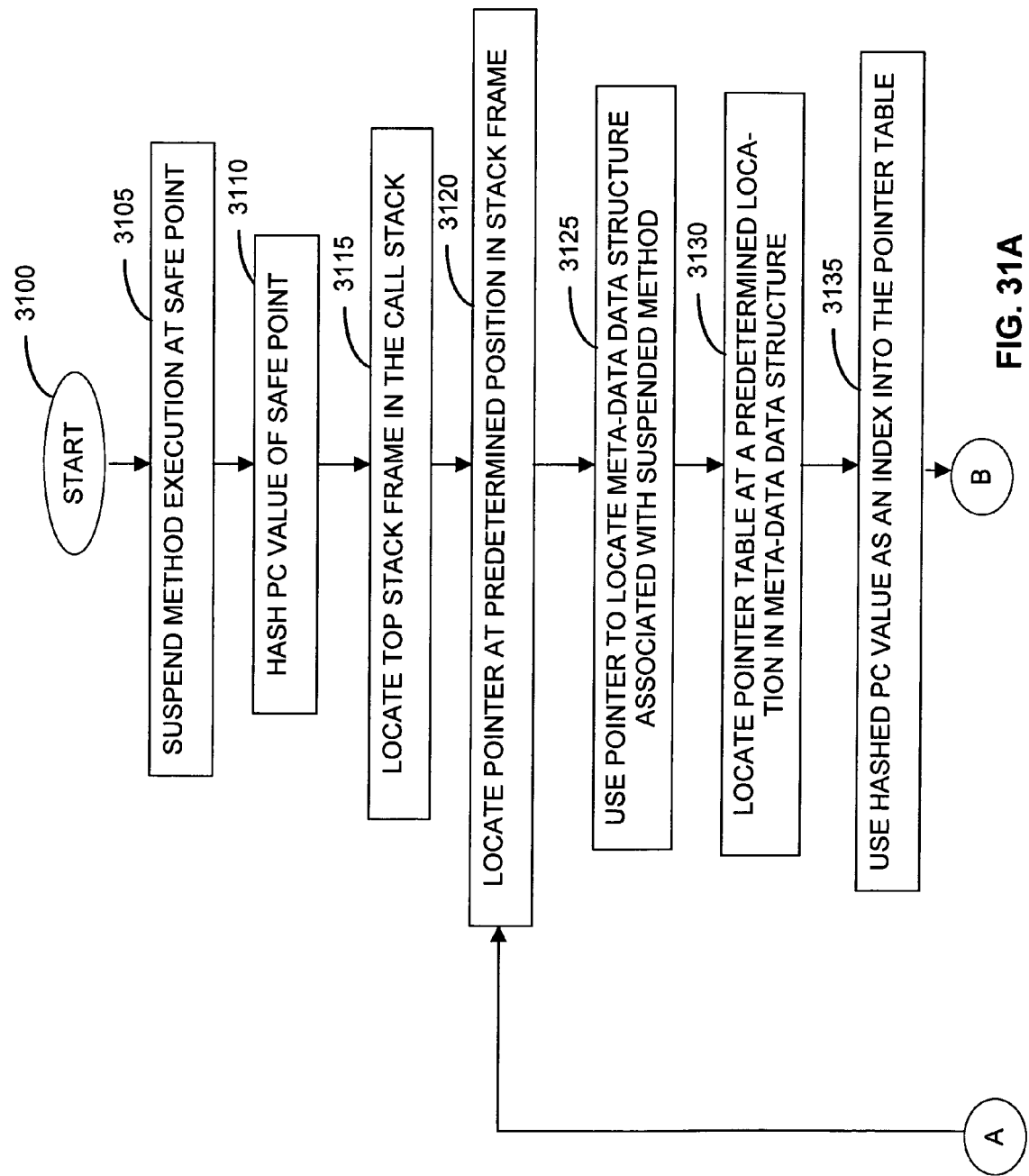
FIGS. 31A-B are a flowchart illustrating a sequence of steps a garbage collector may perform to locate where, in an extended basic block, references were modified without execution of corresponding write-barrier code.
Figure 31B:
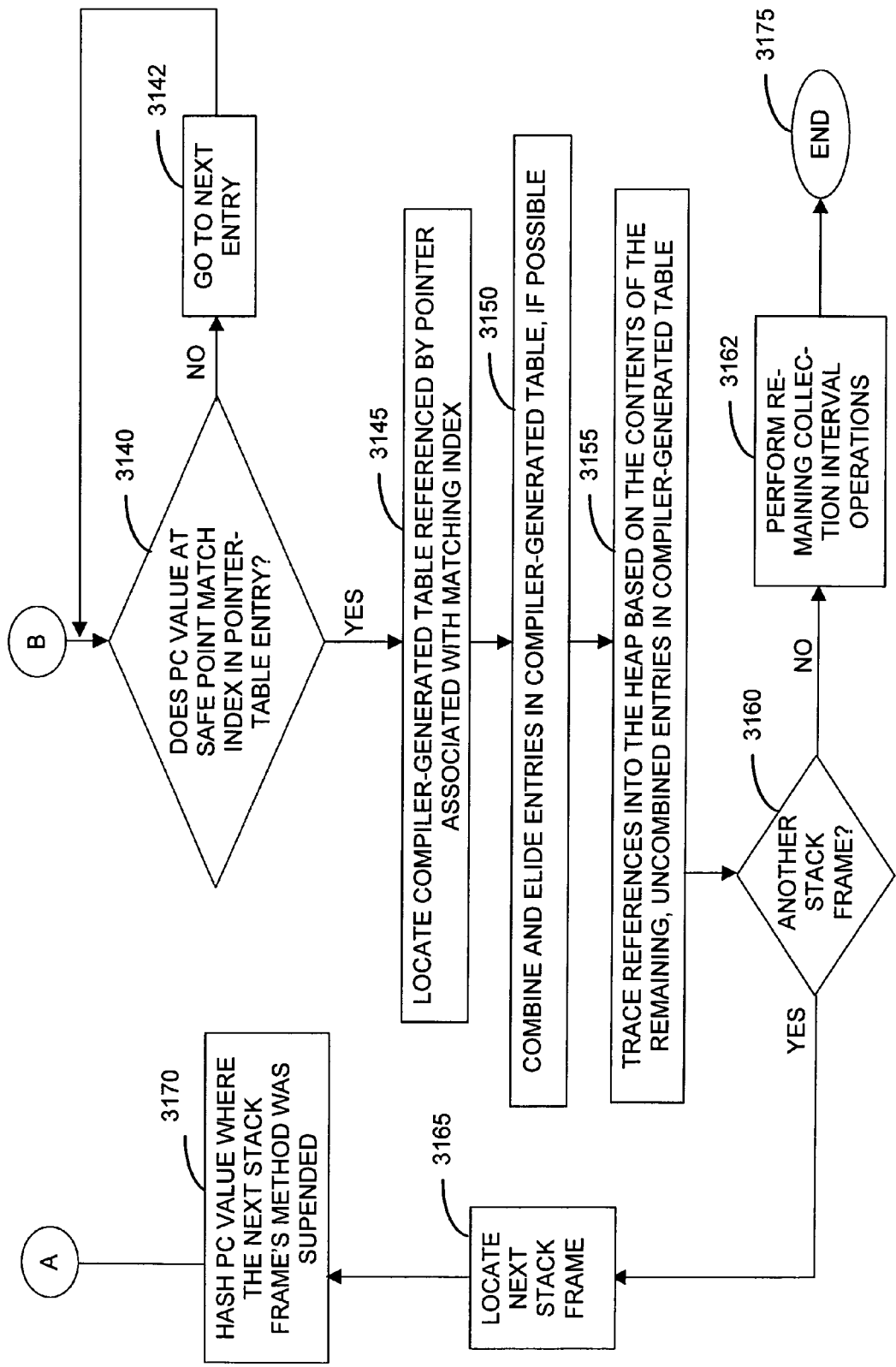

FIGS. 31A-B illustrate an exemplary sequence of steps a garbage collector may perform to locate where references are modified having deferred write barriers. The sequence starts at step 3100 and proceeds to step 3105 where the collector interrupts the execution of a method at one of the method's possible safe points. Next, at step 3110, the collector applies a hash function to the safe point's program counter (pc) value. Then, at step 3115, the collector locates the "top" of the mutator's associated call stack, e.g., using a stack-pointer value stored in a predetermined register. At step 3120, the collector locates a pointer at a predetermined position in the top (i.e., most-recently added) stack frame. The pointer's value directs the collector to the memory address of a meta-data data structure associated with the method for this stack frame, at step 3125.

Next, at step 3130, the collector locates a pointer table, e.g., stored at a predetermined offset within the meta-data data structure. At step 3135, the collector uses the hashed pc value as an index into the pointer table and compares the pc value to an index value stored in the pointer-table entry, at step 3140. If the pc value matches the index, then the sequence proceeds to step 3145, else the collector moves to the next pointer-table entry, at step 3142, and compares the pc value to the index value in the next entry. The collector may repeat steps 3140 and 3142 until it finds a table entry having an index that matches the pc value.

The pointer-table entry matching the pc value corresponds to a pointer in the pointer table whose value locates a table, e.g., previously generated by a compiler. The table identifies references that were modified in the suspended method, without execution of corresponding write barriers, before the method was suspended. Once the garbage collector locates the appropriate table, at step 3145, the collector may combine and elide table entries, at step 3150, using techniques previously described herein. At step 3155, the remaining entries are used by the collector to find modified references and take the appropriate action in response, such as recording their locations against the regions that contain the objects to which they refer. In addition, the collector may trace other references into the heap, e.g., as identified by write barriers whose execution was not deferred before the collection interval.

At step 3160, the collector determines whether the stack frame corresponding to the suspended method is the "bottom" (i.e., least-recently added) frame in the call stack. If so, the collector performs any remaining collection interval operations, at step 3162, and the sequence ends at step 3175. However, if there are additional frames in the call stack corresponding to other suspended methods, then the collector proceeds to step 3165 where it identifies the stack frame associated with the next method whose stack frame it has not scanned for deferred write barriers. At step 3170, the collector applies a hash function to the pc value where the method was suspended. This pc value may be retrieved from a slot in the stack frame, derived from a return pC value stored in the stack frame, or acquired by other techniques known in the art. For each remaining stack frame, the collector repeats steps 3120-3170 until it has "walked" each frame of the stack during the collection interval.

C. Trampoline Code

Because some methods may remain suspended over the course of multiple collection intervals, it may be redundant for a garbage collector to scan every frame in a call stack every collection interval to locate where reference modifications occurred without execution of corresponding write-barrier code. That is, if a method remains suspended from one collection interval to another, the method could not have executed new reference-modifying instructions since the last collection interval. Therefore, it is unnecessary for the collector to scan the method's stack frame to locate where new reference modifications occurred having deferred write barriers since the last collection interval.

Figure 32:
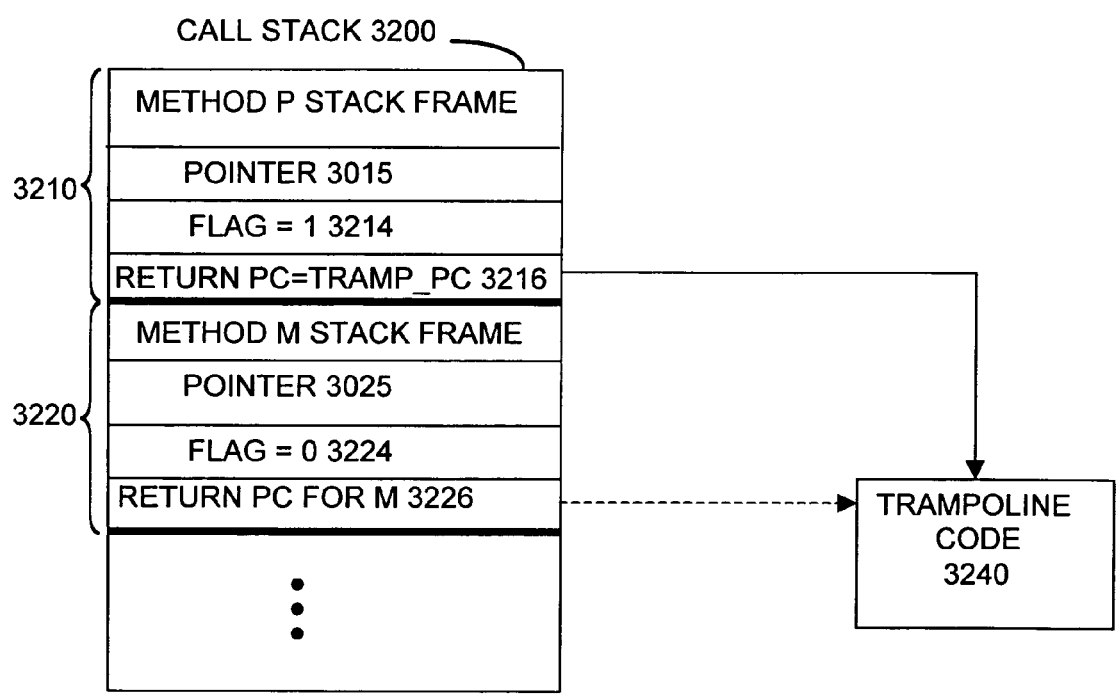
FIG. 32 is a schematic block diagram of an exemplary call stack that relies on a block of "trampoline" code to record which stack frames should be scanned by the collector as the collector locates write barriers whose execution was deferred at the time of its collection interval.

FIG. 32 illustrates an illustrative call stack 3200 where each stack frame includes a flag value indicating whether the frame's associated method executed any instructions since the last collection interval. The exemplary call stack comprises a "top" frame 3210 and multiple "lower" frames, including frame 3220. The top frame corresponds to the method whose execution was most recently suspended by the mutator, and each lower frame corresponds to a previously suspended method, in the order in which they were suspended. In other words, methods whose corresponding stack frames are closer to the top of the call stack were suspended more recently than frames having their corresponding stack frames lower in the call stack.

Each of the stack frames in the call stack 3200 comprises a pointer referencing a meta-data data structure associated with the frame's corresponding method. For example, a pointer 3015 stores the location of a meta-data data structure (not shown) associated with the method p, and a pointer 3025 stores the location of a data structure (not shown) associated with the method m. Each frame also includes a return program-counter (pc) value, such as pc values 3216 and 3226, indicating which instruction the mutator will execute when the frame's corresponding method resumes.

Illustratively, each stack frame comprises a flag value that equals a first value (e.g., "1") if mutator instructions have been executed in the frame's corresponding method since the last garbage collection interval, and equals a second value (e.g., "0") otherwise. Thus, new frames are "pushed" onto the top frame of the call stack having a flag value equal to "1." The collector sets a frame's flag value to "0" only after it performs a collection interval that determines whether the frame's corresponding method executed reference-modifying instructions whose write barriers were deferred. While flag values of "0" and "1" are shown in the exemplary call stack, those skilled in the art will understand other indicators, such as other types of boolean values, may be equivalently used.

Frames closer to the top stack frame are more likely to have executed mutator instructions since the last collection interval since they are suspended more recently than lower frames in the call stack. In fact, there may be a "boundary" frame in the call stack where all frames above, and including, the boundary frame are associated with methods that executed mutator instructions since the last collection interval and all frames below are associated with methods that remained suspended since the last collection interval. For example, the frame 3210 is a boundary frame since its flag value 3214 equals "1," and the flag values of frames below it (e.g., flag value 3224) equal "0."

In accordance with the illustrative embodiment, during a garbage-collection interval, the collector sets the flag value in each call-stack frame it scans for deferred write barriers equal to "0" and modifies the return pc value of a boundary frame, if one exists, to direct the mutator to a special block of code, hereinafter "trampoline code." The trampoline code is configured to update the flag values in the stack frames to ensure that the location of the boundary frame is properly adjusted as the mutator executes. In those cases where the collector scans every frame, the next frame pushed onto the call stack after the mutator code execution resumes becomes a new boundary frame (e.g., its flag value equals "1"), and its return pc value is modified to store the memory address of the trampoline code.

As shown in FIG. 32, the return pc field 3216 in boundary frame 3210 is modified to equal to the memory address tramp_pc of the trampoline code 3240. Thus, when execution of the method p resumes, the mutator is directed to execute the trampoline code. The trampoline code, in turn, selects a new boundary frame for the collector and sets the appropriate flag values in the call stack 3200, e.g., equal to "1," to reflect the location of the new boundary frame. Notably, the new boundary frame may be selected as the $N^{th}$ frame below the current boundary frame (if one exists), where N equals 1, 2, 3, etc. The trampoline code then sets the return pc value in the new boundary frame equal to the tramp_pc value. In this manner, the $N^{th}$ frame below the current boundary frame will become the new boundary frame when execution of the method associated with the current boundary frame is resumed. For purposes of explanation, in FIG. 32 the value of N is arbitrarily set equal to one. When the mutator code resumes execution in the method p, the mutator is directed by the return pc value 3216 to execute the trampoline code 3240. Upon its execution, the trampoline code sets the flag 3224 to equal "1" and also modifies the return pc value 3226 in method m's stack frame to equal tramp_pc (as indicated by the dotted line).

Figure 33:
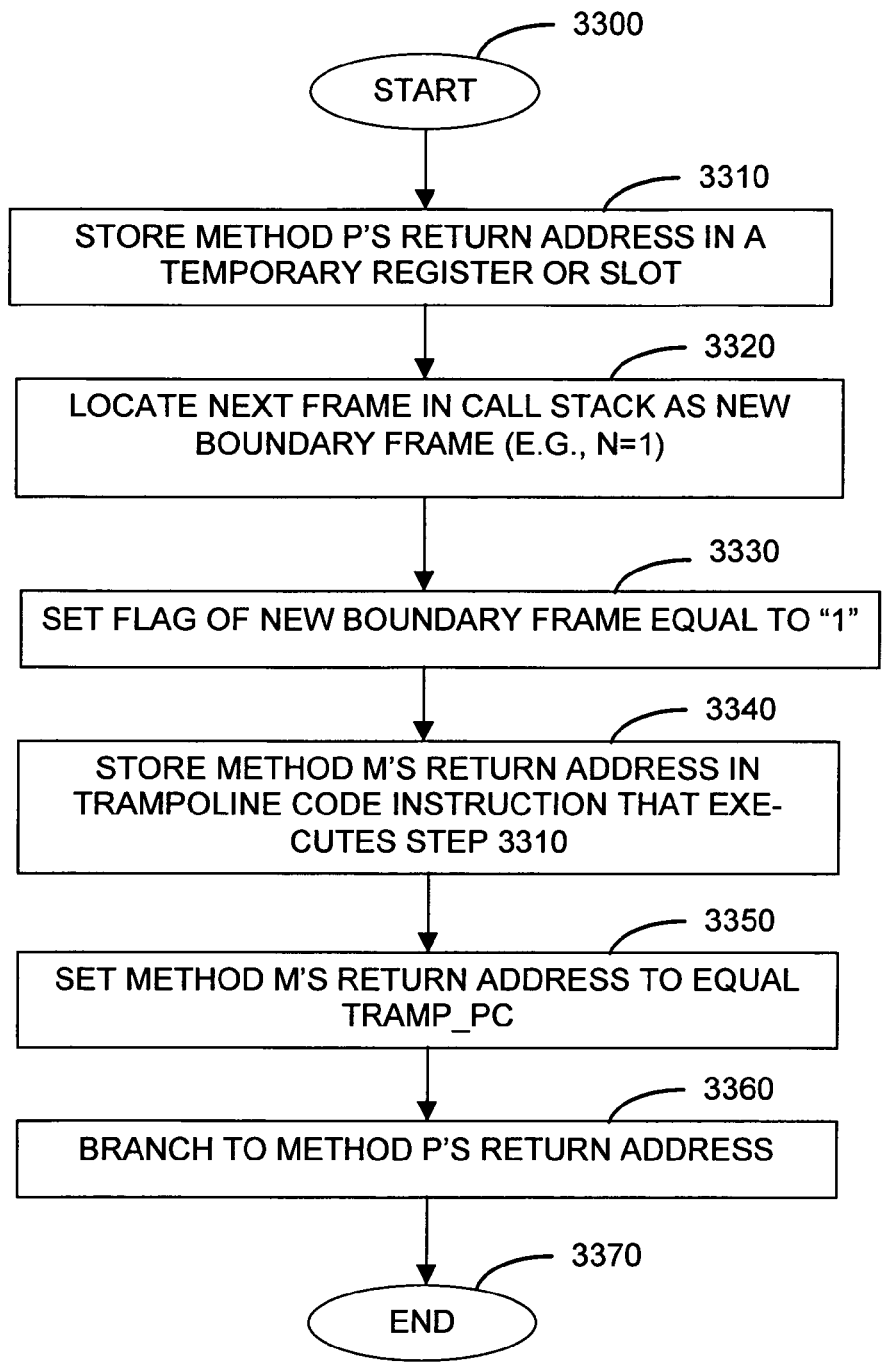
FIG. 33 is a flowchart illustrating a sequence of steps that may be executed by the trampoline code in FIG. 32.

FIG. 33 illustrates an exemplary sequence of steps that may be performed by the trampoline code in FIG. 32. The sequence starts at step 3300 and proceeds to step 3310 where a first instruction in the trampoline code stores method p's return pc address in a temporary register or stack-frame slot. At step 3320, the trampoline code locates a stack pointer, e.g., stored in a designated register, that enables the trampoline code to locate the frame 3220 located directly below the frame 3210 through which the trampoline code was called. Alternatively, the trampoline code may locate the $N^{th}$ frame below the frame 3210, where N may be greater than one. Next, at step 3330, the trampoline code sets the flag value 3224 in method m's stack frame 3220 equal to "1" to reflect that the frame 3220 becomes the new boundary frame. At step 3340, the trampoline code extracts method m's return address from the stack frame 3220 and then modifies the first instruction in the trampoline code so it will store method m's return pc address in the temporary register or stack-frame slot next time the trampoline code is called. Or put another way, the return pc address of method p is overwritten and replaced with method m's return pc address in the first instruction of the trampoline code. At step 3350, method m's return pc value is then modified to equal tramp_pc. At step 3360, the trampoline code branches to the method p's return pc address stored in the temporary register or stack-frame slot. The sequence ends at step 3370.

III. Conclusion

The foregoing has been a detailed description of an illustrative embodiment of the invention. Various modifications and additions can be made without departing from the spirit and scope of the invention. For example, although the compiler's "internal" tables described in the illustrative embodiments contain pairs of value numbers and offset values for identifying modified references in the heap, those skilled in the art will understand that the format and contents of the tables may differ depending on the compiler's configuration. For example, rather than indicate memory locations based on value-number expressions, the compiler's internal tables may instead record other types of data-flow information, run-time information, etc. Moreover, while the illustrative embodiments are described for exemplary mutator data flows, such as basic blocks, extended basic blocks, etc., the invention is generally applicable for deferring write barriers in mutator code having any arbitrary data flow.

In general, write barriers may be deferred in an arbitrary data flow so long as their corresponding reference modifications are made to memory locations that are recoverable, e.g., from the compiler's value-number and register/frame-slot assignments. We have already described one case wherein deferred write barriers are merged at "join" nodes. Such a more generalized data flow analysis will require an analysis to ensure that no write barriers depending on recoverable memory addresses abstractly represented by their value numbers are deferred past the instructions whose abstract interpretation by the compiler generated those value numbers. Chapters 8 and 12 of *Advanced Compiler Design and Implementation*, by Steven Muchnick, published 1997, which is hereby incorporated by reference as though fully set forth herein, describe several forms of such analysis and value numbering to support them.

While some of the illustrative embodiments have described reference modifications made to values stored in object-reference fields, the teachings set forth herein equally apply to reference modifications made to array elements. For instance, where register_a was previously used to denote the register storing the memory address of an object a, it could alternatively store the memory address of an array a. In this case, the compiler in the illustrative embodiments may identify the array based on a value number assigned to the array. Further, in a precise card-marking scheme, the compiler may identify a particular element in the array using various value-number expressions, such as by a combination of the array's value number and an appropriate offset in the array.

It is expressly contemplated that the teachings of this invention can be implemented as software, including a computer-readable medium having program instructions executing on a computer, hardware, firmware, or any combination thereof. Accordingly this description is meant to be taken only by way of example and not to otherwise limit the scope of the invention.

What is claimed is:

1. For employing a computer system to compile source code that specifies operation of a mutator, which includes at least one reference-modifying instruction, together with a garbage collector that relies on the mutator's execution of write-barrier code to keep track of at least some reference modifications, a method comprising:
   (A) deferring emission of write-barrier code corresponding to at least one reference-modifying instruction in the mutator by recording in a list a separate entry for each reference-modifying instruction whose write barrier emission has been deferred, wherein each list entry stores at least enough information to enable a write barrier to be generated for the entry's corresponding reference-modifying instruction;
   (B) combining or eliding one or more entries in the list if the one or more entries satisfy any elision criterion in a set of at least one elision criterion, each criterion being satisfied if the one or more entries correspond to reference-modifying instructions whose deferred write barriers, if executed, would provide unnecessary or redundant information to the garbage collector; and
   (C) emitting, at a predetermined point in the mutator, at least one deferred write barrier corresponding to a list entry that was not combined or elided.

2. The method according to claim 1, wherein each elision criterion in said set of at least one elision criterion determines whether two or more deferred write barriers, if executed, would provide unnecessary or redundant information to a garbage collector.

3. The method according to claim 2, wherein one criterion in said set of at least one elision criterion determines whether the two or more deferred write barriers correspond to reference-modifying instructions that modify the same memory location.

4. The method according to claim 2, wherein one criterion in said set of at least one elision criterion determines whether the two or more deferred write barriers correspond to reference-modifying instructions that modify reference values located in the same object or card.

5. The method according to claim 2, wherein one criterion in said set of at least one elision criterion determines whether the two or more deferred write barriers correspond to reference-modifying instructions that modify reference values located within a known range of memory addresses.

6. The method according to claim 1, wherein the remaining deferred write barriers are emitted at successive locations in the mutator.

7. The method according to claim 1, further comprising:
   emitting a guard-code instruction preceding the emission of one or more of the deferred write barriers, wherein the guard-code instruction, when executed, determines whether the one or more deferred write barriers following the guard-code instruction will be executed.

8. The method according to claim 1, wherein the predetermined point in the mutator is located after the last instruction in the mutator.

9. The method according to claim 1, wherein at least one of the deferred write barriers is deferred across a call instruction in the mutator.

10. The method according to claim 1, wherein at least one of the deferred write barriers is deferred from a first basic block to a second basic block in an extended basic block.

11. The method according to claim 1, further comprising:
emitting one or more of the deferred write barriers before the predetermined point in the mutator if a spilling instruction is about to be emitted in the mutator that will spill a register's contents to a stack frame and the spilled register stores a value corresponding to a memory location that is not modified by reference-modifying mutator instructions located subsequent to the spilling instruction.

12. The method according to claim 1, further comprising:
recording in a list a separate entry for each reference-modifying instruction whose write barrier emission has been deferred, wherein each list entry stores at least enough information to enable a write barrier to be generated for the entry's corresponding reference-modifying instruction.

13. The method according to claim 12, wherein each list entry stores at least a value number indicating a memory location of a reference value that is modified by the entry's corresponding reference-modifying instruction.

14. The method according to claim 13, wherein the value number corresponds to the memory location of an object.

15. The method according to claim 13, wherein the value number corresponds to the memory location of an array.

16. The method according to claim 1, wherein at least one reference-modifying instruction in the mutator modifies a reference value stored in a super object.

17. For employing a computer system to compile source code that specifies operation of a mutator, which includes at least one reference-modifying instruction, together with a garbage collector that relies on the mutator's execution of write-barrier code to keep track of at least some reference modifications, a method comprising:
(A) suspending execution of the mutator at a possible safe point in the mutator;
(B) locating, while the mutator is suspended, a list containing a separate entry for each reference-modifying instruction in the mutator that was executed without corresponding write-barrier code before the mutator was suspended, each list entry containing enough information to inform the garbage collector of the same information that the garbage collector would have received if a write barrier had been executed for the entry's corresponding reference-modifying instruction;
(C) combining or eliding, while the mutator is suspended, one or more entries in the list if the one or more entries satisfy any elision criterion in a set of at least one elision criterion, each criterion being satisfied if the one or more list entries correspond to reference-modifying instructions whose deferred write barriers, if executed, would provide unnecessary or redundant information to the garbage collector; and
(D) performing garbage-collection operations based on the contents of the remaining list entries that are not combined or elided.

18. The method according to claim 17, wherein one criterion in said set of at least one elision criterion tests whether two or more entries in the list are identical.

19. The method according to claim 17, wherein one criterion in said set of at least one elision criterion tests whether two or more entries in the list correspond to reference-modifying instructions that modify reference values located in the same object or card.

20. The method according to claim 17, wherein one criterion in said set of at least one elision criterion tests whether two or more entries in the list correspond to reference-modifying instructions that modify reference values located within a known range of memory addresses.

21. The method according to claim 17, wherein each possible safe point in the mutator is associated with a list containing a separate entry for each reference-modifying instruction in the mutator that was executed without corresponding write-barrier code before the mutator's execution reaches the possible safe point.

22. The method according to claim 21, wherein two or more possible safe points in the mutator are associated with the same list.

23. The method according to claim 21, wherein each list associated with a possible safe point is generated by a compiler at compile time.

24. The method according to claim 17, wherein the garbage collector accesses the list through a pointer located in a frame of a call stack associated with the mutator.

25. The method according to claim 24, wherein a trampoline code sets a value in a boundary frame of the call stack to notify the garbage collector of a set of lists to scan for deferred write barriers during a collection interval.

26. A computer system for reducing the amount of write-barrier code emitted in a mutator containing at least one reference-modifying instruction, the computer system comprising:
a processor; and
a computer-readable memory, to which the processor is responsive, that stores instructions executable by the processor for:
(A) deferring emission of write-barrier code corresponding to at least one reference-modifying instruction in the mutator by recording in a list a separate entry for each reference-modifying instruction whose write barrier emission has been deferred, wherein each list entry stores at least enough information to enable a write barrier to be generated for the entry's corresponding reference-modifying instruction;
(B) combining or eliding one or more entries in the list if the one or more entries satisfy any elision criterion in a set of at least one elision criterion, each criterion being satisfied if the one or more entries correspond to reference-modifying instructions whose deferred write barriers, if executed, would provide unnecessary or redundant information to the garbage collector; and
(C) emitting, at a predetermined point in the mutator, at least one deferred write barrier corresponding to a list entry that was not combined or elided.

27. The computer system according to claim 26, wherein each elision criterion in said set of at least one elision criterion determines whether two or more deferred write barriers, if executed, would provide unnecessary or redundant information to a garbage collector.

28. The computer system according to claim 27, wherein one criterion in said set of at least one elision criterion determines whether the two or more deferred write barriers correspond to reference-modifying instructions that modify the same memory location.

29. The computer system according to claim 27, wherein one criterion in said set of at least one elision criterion determines whether the two or more deferred write barriers correspond to reference-modifying instructions that modify reference values located in the same object or card.

30. The computer system according to claim 27, wherein one criterion in said set of at least one elision criterion determines whether the two or more deferred write barriers correspond to reference-modifying instructions that modify reference values located within a known range of memory addresses.

31. A computer system to compile source code that specifies operation of a mutator, which includes at least one reference-modifying instruction, together with a garbage collector that relies on the mutator's execution of write-barrier code to keep track of at least some reference modifications, the computer system comprising:
 a processor; and
 a computer-readable memory, to which the processor is responsive, that stores instructions executable by the processor for:
 suspending execution of the mutator at a possible safe point in the mutator;
 locating a list, while the mutator is suspended, containing a separate entry for each reference-modifying instruction in the mutator that was executed without corresponding write-barrier code before the mutator was suspended, each list entry containing enough information to inform the garbage collector of the same information that the garbage collector would have received if a write barrier had been executed for the entry's corresponding reference modifying instruction;
 combining or eliding, while the mutator is suspended, one or more entries in the list if the one or more entries satisfy any elision criterion in a set of at least one elision criterion, each criterion being satisfied if the one or more list entries correspond to reference-modifying instructions whose deferred write barriers, if executed, would provide unnecessary or redundant information to the garbage collector; and
 performing garbage-collection operations based on the contents of the remaining list entries that are not combined or elided.

32. The computer system according to claim 31, wherein one criterion in said set of at least one elision criterion tests whether two or more entries in the list are identical.

33. The computer system according to claim 31, wherein one criterion in said set of at least one elision criterion tests whether two or more entries in the list correspond to reference-modifying instructions that modify reference values located in the same object or card.

34. The computer system according to claim 31, wherein one criterion in said set of at least one elision criterion tests whether two or more entries in the list correspond to reference-modifying instructions that modify reference values located within a known range of memory addresses.

35. A computer readable medium comprising program instructions stored therein for execution on a processor for the practice of a method for reducing the amount of write-barrier code emitted in a mutator containing at least one reference-modifying instruction, the method comprising:
 (A) deferring emission of write-barrier code corresponding to at least one reference-modifying instruction in the mutator by recording in a list a separate entry for each reference-modifying instruction whose write barrier emission has been deferred, wherein each list entry stores at least enough information to enable a write barrier to be generated for the entry's corresponding reference-modifying instruction;
 (B) combining or eliding one or more entries in the list if the one or more entries satisfy any elision criterion in a set of at least one elision criterion, each criterion being satisfied if the one or more entries correspond to reference-modifying instructions whose deferred write barriers, if executed, would provide unnecessary or redundant information to the garbage collector; and
 (C) emitting, at a predetermined point in the mutator, at least one deferred write barrier corresponding to a list entry that was not combined or elided.

36. A computer readable medium comprising program instructions stored therein for execution on a processor for the practice of a method for employing a computer system to compile source code that specifies operation of a mutator, which includes at least one reference-modifying instruction, together with a garbage collector that relies on the mutator's execution of write-barrier code to keep track of at least some reference modifications, the method comprising:
 (A) suspending execution of the mutator at a possible safe point in the mutator;
 (B) locating, while the mutator is suspended, a list containing a separate entry for each reference-modifying instruction in the imitator that was executed without corresponding write-barrier code before the mutator was suspended, each list entry containing enough information to inform the garbage collector of the same information that the garbage collector would have received if a write barrier had been executed for the entry's corresponding reference-modifying instruction;
 (C) combining or eliding, while the mutator is suspended, one or more entries in the list if the one or more entries satisfy any elision criterion in a set of at least one elision criterion, each criterion being satisfied if the one or more list entries correspond to reference-modifying instructions whose deferred write barriers, if executed, would provide unnecessary or redundant information to the garbage collector; and
 (D) performing garbage-collection operations based on the contents of the remaining list entries that are not combined or elided.

* * * * *